United States Patent
Anderson

(10) Patent No.: US 12,364,181 B2
(45) Date of Patent: Jul. 22, 2025

(54) AGRICULTURAL CHARACTERISTIC CONFIDENCE AND CONTROL

(71) Applicant: Deere & Company, Moline, IL (US)

(72) Inventor: Noel W. Anderson, Fargo, ND (US)

(73) Assignee: Deere & Company, Moline, IL (US)

( * ) Notice: Subject to any disclaimer, the term of this patent is extended or adjusted under 35 U.S.C. 154(b) by 83 days.

(21) Appl. No.: 17/346,993

(22) Filed: Jun. 14, 2021

(65) Prior Publication Data

US 2022/0132723 A1 May 5, 2022

Related U.S. Application Data

(63) Continuation-in-part of application No. 17/086,756, filed on Nov. 2, 2020.

(51) Int. Cl.
*A01B 79/00* (2006.01)
*A01C 21/00* (2006.01)
(Continued)

(52) U.S. Cl.
CPC .......... *A01B 79/005* (2013.01); *B60W 10/04* (2013.01); *B60W 10/20* (2013.01); *B60W 10/30* (2013.01);
(Continued)

(58) Field of Classification Search
CPC .... A01B 79/005; A01B 69/008; B60W 10/04; B60W 10/20; B60W 10/30; B60W 50/14;
(Continued)

(56) References Cited

U.S. PATENT DOCUMENTS 2,020,027 A * 11/1935 Gore ..................... B65B 57/08
270/56
7,266,477 B2    9/2007 Foessel
(Continued)

FOREIGN PATENT DOCUMENTS

BR    102020024925 A2    2/2022
BR    102020026350 A2    7/2022
(Continued)

OTHER PUBLICATIONS

U.S. Appl. No. 17/086,756 Office Action dated Aug. 30, 2022, 13 pages.
(Continued)

*Primary Examiner* — Russell Frejd
(74) *Attorney, Agent, or Firm* — Joseph R. Kelly; KELLY, HOLT & CHRISTENSON, P.L.L.C.

(57) ABSTRACT

A mobile agricultural machine obtains an agricultural characteristic map indicative of agricultural characteristics of a field, wherein the agricultural characteristic map is based on data collected at or prior to a first time. The mobile agricultural machine obtains supplemental data indicative of characteristics relative to the worksite, the supplemental data collected after the first time. An agricultural characteristic confidence output, indicative of a confidence level in the agricultural characteristics indicated by the agricultural characteristic map, is generated based on the agricultural characteristic map and the supplemental data. In some examples, an action signal is generated to control an action of the mobile agricultural machine based on the agricultural characteristic confidence output.

21 Claims, 25 Drawing Sheets

(51) Int. Cl.
| | |
|---|---|
| *A01D 41/127* | (2006.01) |
| *A01M 7/00* | (2006.01) |
| *B60W 10/04* | (2006.01) |
| *B60W 10/20* | (2006.01) |
| *B60W 10/30* | (2006.01) |
| *B60W 50/14* | (2020.01) |
| *G01C 21/00* | (2006.01) |
| *G05D 1/221* | (2024.01) |
| *G05D 101/00* | (2024.01) |
| *G05D 107/20* | (2024.01) |

(52) U.S. Cl.
CPC ............. *B60W 50/14* (2013.01); *G05D 1/221* (2024.01); *A01C 21/005* (2013.01); *A01D 41/127* (2013.01); *A01M 7/0089* (2013.01); *B60W 2050/146* (2013.01); *B60W 2300/15* (2013.01); *B60W 2556/50* (2020.02); *B60W 2710/20* (2013.01); *B60W 2710/30* (2013.01); *B60W 2720/10* (2013.01); *B60W 2720/12* (2013.01); *G01C 21/3807* (2020.08); *G05D 2101/00* (2024.01); *G05D 2107/21* (2024.01)

(58) Field of Classification Search
CPC ....... B60W 2050/146; B60W 2300/15; B60W 2556/50; B60W 2710/20; B60W 2710/30; B60W 2720/10; B60W 2720/12; B60W 60/0011; A01C 21/005; A01C 21/007; A01D 41/127; A01M 7/0089; G01C 21/3807; G01C 21/20; G01C 21/3826; G05D 1/0274; G05D 2201/0201; G05D 1/0011; G05D 1/0088; G05D 1/0219; G05D 1/0276; G05D 1/221; G05D 2101/00; G05D 2107/21; B65G 43/00; G01N 33/24; G01S 13/58; G01S 13/865; G01S 13/867; G01S 13/88; G01S 13/89; G01S 17/58; G01S 17/86; G01S 17/89; G01S 33/24; G01W 1/02; G06Q 50/02
USPC ......................................................... 701/25
See application file for complete search history.

(56) References Cited

U.S. PATENT DOCUMENTS

| | | | |
|---|---|---|---|
| 7,272,474 B1 | 9/2007 | Stentz et al. | |
| 7,822,266 B2 | 10/2010 | Wellington et al. | |
| 7,995,837 B2 | 8/2011 | Wellington et al. | |
| 8,364,366 B2 | 1/2013 | Foessel et al. | |
| 8,768,667 B2 | 7/2014 | Lindores | |
| 9,009,087 B1 | 4/2015 | Mewes et al. | |
| 9,076,118 B1 | 7/2015 | Mewes et al. | |
| 9,087,312 B1 | 7/2015 | Mewes et al. | |
| 9,113,590 B2 | 8/2015 | Johnson | |
| 9,140,824 B1 | 9/2015 | Mewes et al. | |
| 9,226,449 B2 | 1/2016 | Bischoff | |
| 9,292,796 B1 | 3/2016 | Mewes et al. | |
| 9,311,605 B1 | 4/2016 | Mewes et al. | |
| 9,336,492 B1 | 5/2016 | Mewes et al. | |
| 9,518,753 B2 | 12/2016 | Mewes et al. | |
| 9,554,098 B2 | 1/2017 | Casper et al. | |
| 9,585,309 B2 | 3/2017 | Posselius et al. | |
| 9,615,501 B2 | 4/2017 | Pickett et al. | |
| 9,872,433 B2 | 1/2018 | Acheson et al. | |
| 9,881,497 B2 | 1/2018 | Chen | |
| 10,524,409 B2 | 1/2020 | Posselius et al. | |
| 10,761,544 B2 | 9/2020 | Anderson et al. | |
| 10,829,033 B1 | 11/2020 | McKinney et al. | |
| 11,222,299 B1* | 1/2022 | Baalke ............... | G01C 21/3691 |
| 2007/0156318 A1 | 7/2007 | Anderson et al. | |
| 2008/0059015 A1 | 3/2008 | Whittaker et al. | |
| 2008/0140431 A1 | 6/2008 | Anderson et al. | |
| 2008/0177449 A1* | 7/2008 | Pickett ................. | A01D 41/141 |
| | | | 701/50 |
| 2011/0153172 A1 | 6/2011 | Anderson | |
| 2015/0302305 A1* | 10/2015 | Rupp ..................... | G06N 7/06 |
| | | | 706/46 |
| 2016/0078570 A1 | 3/2016 | Ethington | |
| 2016/0202679 A1 | 7/2016 | Bermudez Rodriguez | |
| 2016/0215994 A1 | 7/2016 | Mewes et al. | |
| 2017/0061050 A1 | 3/2017 | Mewes et al. | |
| 2017/0061299 A1 | 3/2017 | Mewes et al. | |
| 2017/0127606 A1 | 5/2017 | Horton | |
| 2017/0258005 A1 | 9/2017 | Cutter | |
| 2018/0139898 A1 | 5/2018 | Shearer | |
| 2018/0239991 A1 | 8/2018 | Weller | |
| 2018/0325015 A1 | 11/2018 | Wolters | |
| 2019/0009905 A1 | 1/2019 | Kaechi | |
| 2019/0050948 A1* | 2/2019 | Perry ..................... | G06F 30/27 |
| 2019/0155275 A1* | 5/2019 | Akamatsu ............ | G05D 1/0274 |
| 2019/0307070 A1 | 10/2019 | Dima et al. | |
| 2019/0335661 A1 | 11/2019 | Seiders | |
| 2019/0392263 A1 | 12/2019 | Ferrari et al. | |
| 2020/0012415 A1 | 1/2020 | Miller | |
| 2020/0128734 A1 | 4/2020 | Brammeier et al. | |
| 2020/0184214 A1* | 6/2020 | Casas ................... | A01C 21/007 |
| 2020/0236853 A1 | 7/2020 | Trowbridge | |
| 2020/0271458 A1* | 8/2020 | Berry ..................... | G01C 21/34 |
| 2020/0326727 A1 | 10/2020 | Palla et al. | |
| 2020/0337240 A1 | 10/2020 | Brimeyer et al. | |
| 2020/0359562 A1 | 11/2020 | Hunt et al. | |
| 2020/0375107 A1 | 12/2020 | Duerksen et al. | |
| 2020/0390035 A1 | 12/2020 | Hunt et al. | |
| 2021/0034867 A1 | 2/2021 | Ferrari et al. | |
| 2021/0049901 A1* | 2/2021 | Young ................... | H04W 4/46 |
| 2021/0059117 A1 | 3/2021 | Hunt | |
| 2021/0079627 A1 | 3/2021 | Subramanian | |
| 2021/0102713 A1 | 4/2021 | Kageyama et al. | |
| 2021/0120738 A1 | 4/2021 | Ricketts et al. | |
| 2021/0176916 A1* | 6/2021 | Sidon ................... | G06F 18/2321 |
| 2021/0185877 A1 | 6/2021 | Hunt et al. | |
| 2021/0185879 A1 | 6/2021 | Hunt et al. | |
| 2021/0185880 A1 | 6/2021 | Martin et al. | |
| 2021/0185916 A1 | 6/2021 | Hunt | |
| 2021/0185917 A1 | 6/2021 | Hunt et al. | |
| 2021/0185919 A1 | 6/2021 | Hunt | |
| 2021/0212248 A1 | 7/2021 | Kong et al. | |
| 2021/0212254 A1 | 7/2021 | Thomas et al. | |
| 2021/0235622 A1 | 8/2021 | Baumgarten et al. | |
| 2021/0237982 A1 | 8/2021 | Trowbridge et al. | |
| 2021/0272255 A1 | 9/2021 | Barrick et al. | |
| 2021/0289702 A1 | 9/2021 | Jung et al. | |
| 2021/0289703 A1 | 9/2021 | Hunt et al. | |
| 2021/0302969 A1* | 9/2021 | Palla ..................... | G06F 3/04817 |
| 2021/0307234 A1 | 10/2021 | Jongmans et al. | |
| 2021/0307235 A1 | 10/2021 | Jongmans et al. | |
| 2021/0307248 A1 | 10/2021 | Missotten et al. | |
| 2021/0307249 A1 | 10/2021 | Jongmans et al. | |
| 2021/0329837 A1 | 10/2021 | Schnalder et al. | |
| 2021/0392814 A1 | 12/2021 | Verhoef et al. | |
| 2021/0404829 A1* | 12/2021 | St. Romain .......... | G08G 1/0129 |
| 2022/0000023 A1 | 1/2022 | Du et al. | |
| 2022/0000024 A1 | 1/2022 | Zielke et al. | |
| 2022/0053693 A1 | 2/2022 | Gahres et al. | |
| 2022/0061218 A1 | 3/2022 | Karst | |
| 2022/0071093 A1 | 3/2022 | Risius | |
| 2022/0087101 A1 | 3/2022 | Hunt et al. | |
| 2022/0117143 A1 | 4/2022 | Kraus et al. | |
| 2022/0132722 A1* | 5/2022 | Bomleny ............. | G05D 1/0223 |
| | | | 701/41 |
| 2022/0167556 A1 | 6/2022 | Peters | |
| 2022/0183229 A1 | 6/2022 | Hunt | |
| 2022/0225569 A1 | 7/2022 | Zielke et al. | |
| 2022/0232770 A1 | 7/2022 | Yanke et al. | |
| 2022/0240446 A1 | 8/2022 | Martin | |
| 2022/0264798 A1 | 8/2022 | Martin et al. | |
| 2022/0304228 A1 | 9/2022 | Hunt et al. | |
| 2022/0312676 A1 | 10/2022 | Reubens et al. | |
| 2022/0338416 A1 | 10/2022 | Racchella et al. | |
| 2022/0354056 A1 | 11/2022 | Hunt et al. | |
| 2022/0369556 A1 | 11/2022 | Yanke et al. | |

(56) References Cited

U.S. PATENT DOCUMENTS

| | | |
|---|---|---|
| 2022/0369557 A1 | 11/2022 | Hunt et al. |
| 2022/0369558 A1 | 11/2022 | Scharmann et al. |
| 2022/0377978 A1 | 12/2022 | Laugen et al. |
| 2022/0394927 A1 | 12/2022 | Seiders |
| 2022/0394928 A1 | 12/2022 | Seiders |
| 2022/0400611 A1 | 12/2022 | Missotten et al. |

FOREIGN PATENT DOCUMENTS

| | | |
|---|---|---|
| CA | 3075884 A1 | 4/2019 |
| CA | 3079392 A1 | 11/2020 |
| CN | 106461807 B | 10/2019 |
| CN | 111226603 A | 6/2020 |
| CN | 111436276 A | 7/2020 |
| CN | 111819993 A | 10/2020 |
| CN | 111903317 A | 11/2020 |
| CN | 111990062 A | 11/2020 |
| CN | 212413857 U | 1/2021 |
| CN | 212589003 U | 2/2021 |
| CN | 112690089 A | 4/2021 |
| CN | 113016358 A | 6/2021 |
| CN | 113099836 A | 7/2021 |
| CN | 113228939 A | 8/2021 |
| CN | 113243194 A | 8/2021 |
| CN | 113607096 A | 11/2021 |
| CN | 113661827 A | 11/2021 |
| CN | 214902224 U | 11/2021 |
| CN | 113966667 A | 1/2022 |
| CN | 114187353 A | 3/2022 |
| CN | 114223386 A | 3/2022 |
| CN | 114303621 A | 4/2022 |
| CN | 114342665 A | 4/2022 |
| CN | 114467504 A | 5/2022 |
| CN | 114631426 A | 6/2022 |
| CN | 216930906 U | 7/2022 |
| CN | 114916306 A | 8/2022 |
| CN | 115067062 A | 9/2022 |
| EP | 2169507 81 | 11/2015 |
| EP | 3643159 A1 | 4/2020 |
| EP | 3885870 A1 | 9/2021 |
| EP | 3900512 A1 | 10/2021 |
| IN | 202021036612 A | 4/2022 |
| WO | 2016090212 A1 | 6/2016 |
| WO | 16118684 A1 | 7/2016 |
| WO | 16118685 A1 | 7/2016 |
| WO | 16118686 A1 | 7/2016 |
| WO | 2021062552 A1 | 4/2021 |
| WO | 2021123963 A1 | 6/2021 |
| WO | 2021133756 A1 | 7/2021 |
| WO | 2021217112 A1 | 10/2021 |
| WO | 2021222592 A1 | 11/2021 |
| WO | 2021242867 A1 | 12/2021 |
| WO | 2022003457 A1 | 1/2022 |
| WO | 2022040765 A1 | 3/2022 |
| WO | 2022040769 A1 | 3/2022 |
| WO | 2022077122 A1 | 4/2022 |
| WO | 2022147601 A1 | 7/2022 |
| WO | 2022212355 A2 | 10/2022 |
| WO | 2022232244 A1 | 11/2022 |
| WO | 2023278658 A1 | 1/2023 |

OTHER PUBLICATIONS

Renschler and Harbor. "Soil erosion assessment tools from point to regional scales—the role of geomorphologists in land management research and implementation", Geomorphology 47 (2002) 21 pages.
Gelder et al. "The Daily Erosion Project—daily estimates of water runoff, soil detachment, and erosion". Earth Surface Processes and Landforms 43 (Apr. 2018) 13 pages.
https://en.wikipedia.org/wiki/Soil_erosion, accessed on Oct. 29, 2020, 20 pages.
U.S. Appl. No. 17/086,756, filed Nov. 2, 2020, Application and Drawings, 80 pages.
U.S. Appl. No. 17/086,756 Non Final Office Action dated Dec. 22, 2022, 17 pages.
U.S. Appl. No. 17/086,756 Final Office Action dated Feb. 21, 2023, 16 pages.
U.S. Appl. No. 17/086,756 Non Final Office Action dated Jun. 13, 2023, 15 pages.
Non Final Office Action for U.S. Appl. No. 17/086,756 dated Nov. 1, 2023, 16 pages.
Extended European Search Report and Written Opinion issued in European Patent Application No. 23161583.2, dated Oct. 16, 2023, in 08 pages.
Overheu et al. Water erosion in the agricultural region of Western Australia, last updated Feb. 18, 2019 [retrieved on Aug. 27, 2024] 10 pages. Retrieved from the Internet <https://web.archive.org/web/20200413233055/https://www.agric.wa.gov.au/water-erosion/water-erosion-agricultural-region-western australia>.

* cited by examiner

AGRICULTURAL CHARACTERISTIC CONFIDENCE AND CONTROL

CROSS-REFERENCE TO RELATED APPLICATION

The present application is a continuation-in-part of and claims priority of U.S. patent application Ser. No. 17/086,756, filed Nov. 2, 2020, the content of which is hereby incorporated by reference.

FIELD OF THE DESCRIPTION

The present description generally relates to the use of a wide variety of different mobile work machines in a variety of operations. More specifically, the present description relates to the use of computing systems in improving control and performance of the various different work machines in the various operations.

BACKGROUND

There is a wide variety of different types of machines, such as agricultural machines, forestry machines, and construction machines. These types of machines are often operated by an operator and have sensors that generate information during operation. Additionally, the operators of these types of machines can rely on various data relative to a worksite for the control and operation of the various types of machines, for example, a characteristic map of the worksite.

Agricultural machines can include a wide variety of machines such as harvesters, sprayers, planters, cultivators, among others. Agricultural machines can be operated by an operator and have many different mechanisms that are controlled by the operator. The machines may have multiple different mechanical, electrical, hydraulic, pneumatic, electromechanical (and other) subsystems, some or all of which can be controlled, at least to some extent, by the operator. Some or all of these subsystems may communicate information that is obtained from sensors on the machine (and from other inputs). Additionally, the operator may rely on the information communicated by the subsystems as well as various types of other information, such as agricultural characteristic data, for the control of the various subsystems. For example, an operator may rely on agricultural characteristic information, such as an agricultural characteristic map of a field, for setting or controlling various parameters of various subsystems of the agricultural machine. In other examples, the agricultural machine may have a level of autonomy such that the operator plays a supervisory role in machine operation.

The accuracy and freshness of the information provided to the operator can be important to ensure that the operational parameters of the machines are set to desired levels. Current systems can experience difficulty in providing accurate and fresh information to the operator for the purpose of controlling machines settings.

The discussion above is merely provided for general background information and is not intended to be used as an aid in determining the scope of the claimed subject matter.

SUMMARY

A mobile agricultural machine obtains an agricultural characteristic map indicative of agricultural characteristics of a field, wherein the agricultural characteristic map is based on data collected at or prior to a first time. The mobile agricultural machine obtains supplemental data indicative of characteristics relative to the worksite, the supplemental data collected after the first time. An agricultural characteristic confidence output, indicative of a confidence level in the agricultural characteristics indicated by the agricultural characteristic map, is generated based on the agricultural characteristic map and the supplemental data. In some examples, an action signal is generated to control an action of the mobile agricultural machine based on the agricultural characteristic confidence output.

Example 1 is a method of controlling a mobile agricultural machine, comprising:
  obtaining an agricultural characteristic map of a worksite indicative of an agricultural characteristic of the worksite, wherein the agricultural characteristic map is based on data collected at or prior to a first time;
  obtaining supplemental data indicative of a characteristic relative to the worksite, the supplemental data collected after the first time;
  generating an agricultural characteristic confidence output indicative of a confidence level in the agricultural characteristic of the worksite as indicated by the agricultural characteristic map, based on the agricultural characteristic map and the supplemental data; and
  generating an action signal to control an action of the mobile agricultural machine based on the agricultural characteristic confidence output.

Example 2 is the method of any or all previous examples, wherein generating the agricultural characteristic confidence output further comprises:
  determining the confidence level, wherein the confidence level is indicative of a likelihood that the agricultural characteristic of the worksite, as indicated by the agricultural characteristic map, has changed; and
  generating a representation of the confidence level.

Example 3 is the method of any or all previous examples, wherein generating the agricultural characteristic confidence output comprises:
  generating a map of the worksite that includes an indication of the confidence level.

Example 4 is the method of any or all previous examples, wherein generating the agricultural characteristic confidence output comprises:
  determining a plurality of confidence levels, wherein each one of the plurality of confidence levels is indicative of a likelihood that the agricultural characteristic of a corresponding one of a plurality of geographic locations within the worksite, as indicated by the agricultural characteristic map, has changed.

Example 5 is the method of any or all previous examples, and further comprising:
  determining a plurality of confidence zones, each one of the plurality of confidence zones corresponding to a respective one of the plurality of confidence levels, wherein an operation of the mobile agricultural machine is based on a presence of the mobile agricultural machine in one of the plurality of confidence zones.

Example 6 is the method of any or all previous examples, wherein generating an action signal to control an action of the mobile agricultural machine comprises:
  controlling the mobile agricultural machine to collect additional data corresponding to the worksite.

Example 7 is the method of any or all previous examples, wherein generating an action signal to control an action of the mobile agricultural machine comprises:

controlling an actuator of the mobile agricultural machine to drive movement of a component of the mobile agricultural machine to change a position of the component relative to a surface of the worksite.

Example 8 is the method of any or all previous examples, wherein generating an action signal to control an action of the mobile agricultural machine comprises:

controlling a propulsion subsystem of the mobile agricultural machine to control a speed at which the mobile agricultural machine travels over the worksite.

Example 9 is the method of any or all previous examples, wherein generating an action signal to control an action of the mobile agricultural machine comprises:

controlling a steering subsystem of the mobile agricultural machine to control a heading of the mobile agricultural machine as it travels over the worksite.

Example 10 is the method of any or all previous examples, wherein generating an action signal to control an action of the mobile agricultural machine comprises:

controlling an interface mechanism communicably coupled to the mobile agricultural machine to provide an indication of the agricultural characteristic confidence output.

Example 11 is a mobile agricultural machine comprising: control system comprising:

an agricultural characteristic confidence system configured to:

obtain an agricultural characteristic map of a worksite that indicates an agricultural characteristic of the worksite, wherein the agricultural characteristic map is based on data collected at or prior to a first time;

obtain supplemental data indicative of characteristics relative to the worksite, the supplemental data collected after the first time; and generate an agricultural characteristic confidence output indicative of a confidence level in the agricultural characteristic of the worksite as indicated by the agricultural characteristic map, based on the agricultural characteristic map and the supplemental data; and an action signal generator configured to generate an action signal based on the agricultural characteristic confidence output.

Example 12 is the mobile agricultural machine of any or all previous examples, wherein the agricultural characteristic confidence system further comprises:

an agricultural characteristic change detector that determines a likelihood that the agricultural characteristic of the worksite, as indicated by the agricultural characteristic map, has changed based on the supplemental data; and an agricultural characteristic confidence analyzer that determines the agricultural characteristic confidence level based on the likelihood that the agricultural characteristic of the worksite, as indicated by the agricultural characteristic map, has changed.

Example 13 is the mobile agricultural machine of any or all previous examples, wherein the agricultural characteristic confidence output includes a representation of the agricultural characteristic confidence level.

Example 14 is the mobile agricultural machine of any or all previous examples, wherein the agricultural characteristic confidence system further comprises:

a map generator that generates a map of the worksite that includes an indication of the agricultural characteristic confidence level.

Example 15 is the mobile agricultural machine of any or all previous examples, wherein the action signal is provided to an actuator of the mobile agricultural machine to drive movement of a component of the mobile agricultural machine to change a position of the component relative to a surface of the worksite.

Example 16 is the mobile agricultural machine of any or all previous examples, wherein the action signal is provided to a propulsion subsystem of the mobile agricultural machine to control a speed at which the mobile agricultural machine travels over the worksite.

Example 17 is the mobile agricultural machine of any or all previous examples, wherein the action signal is provided to a steering subsystem of the mobile agricultural machine to control a heading of the mobile agricultural machine as the mobile agricultural machine travels over the worksite.

Example 18 is the mobile agricultural machine of any or all previous examples, wherein the action signal is provided to an interface mechanism communicably coupled to the mobile agricultural machine to generate an interface display indicative of the agricultural characteristic confidence output.

Example 19 is the mobile agricultural machine of any or all previous examples, wherein the action signal is provided to an interface mechanism to provide an indication that directs a human to collect additional data corresponding to the worksite.

Example 20 is a method of controlling a mobile agricultural machine comprising:

obtaining an agricultural characteristic map of a worksite indicative of values of an agricultural characteristic of the worksite, wherein the agricultural characteristic map is based on data collected at or prior to a first time;

obtaining supplemental data indicative of characteristics relative to the worksite, the supplemental data collected after the first time;

generating an agricultural characteristic confidence level for each of a plurality of geographic locations within the worksite, the agricultural characteristic confidence level indicative of a likelihood that one or more of the values of the agricultural characteristic at each of the plurality of geographic locations within the worksite, as indicated by the agricultural characteristic map, have changed, based on the supplemental data;

generating an agricultural characteristic confidence map of the worksite that indicates the corresponding agricultural characteristic confidence level at each of the plurality of geographic locations within the worksite;

generating an action signal to control an action of the mobile agricultural machine based on a location of the mobile agricultural machine relative to one of the plurality of geographic locations indicated on the agricultural characteristic confidence map.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
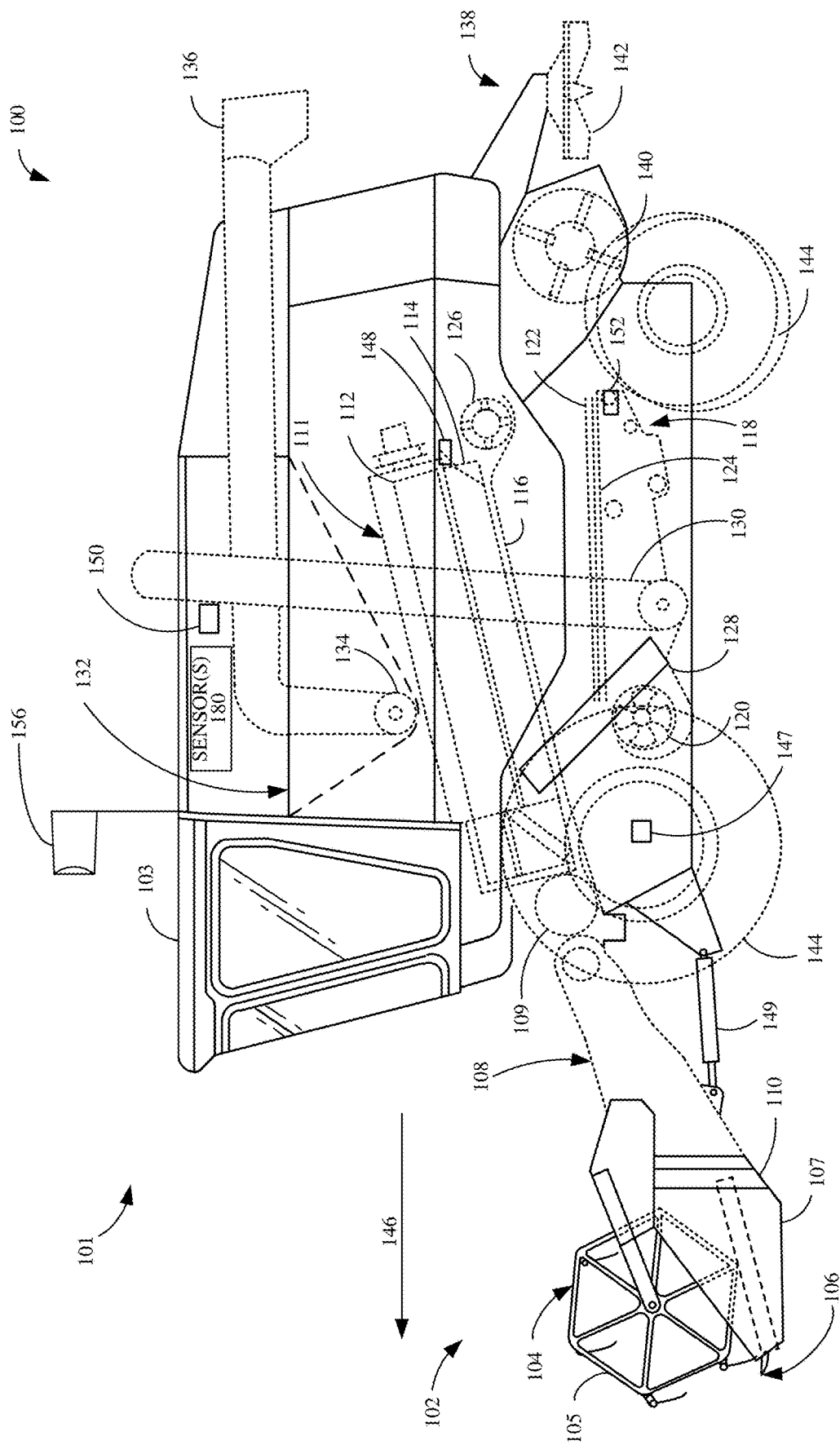
FIG. 1 is a partial pictorial, partial schematic illustration showing one example of a mobile agricultural machine.

In current agricultural systems, the autonomous controls and human operators of various agricultural machines can rely on agricultural characteristic maps of the worksite (e.g., field) upon which they operate for the purpose of controlling machine settings and various other operating parameters. These agricultural characteristic maps can include representations, such as values (e.g., predictive values, estimated values, measured values, etc.), of various different agricultural characteristics, for instance crop height maps, biomass maps, yield maps, nutrient maps, such as plant available nitrogen maps, compaction susceptibility maps, trafficability maps, as well as a variety of other agricultural characteristics. These agricultural characteristic mappings can take into account, for predicting, estimating, identifying, determining, etc., the agricultural characteristic of interest, various data. Depending on the agricultural characteristic to be mapped, various data may be used, for instance, compaction susceptibility may take into account multiple data sources, which themselves can be indicative of agricultural characteristics, for example, compaction susceptibility mapping may take into account soil moisture characteristics, precipitation characteristics, and drying characteristics (such as how much wind, sunlight, etc., locations of the field have been exposed to). In other examples, one source of data may be sufficient, for instance, in a bare field condition (where no or substantially no vegetation on the field is present) a lidar sensor output relative to the field of interest may be sufficient, in and of itself, to provide topographical characteristic (as the agricultural characteristic of interest) mapping for the field of interest.

The various data used for the agricultural characteristic mapping is often produced during other operations or activities relative to the field of interest. For instance, previous operations, performed in previous seasons, on the field can provide historical data that indicates historical agricultural characteristics of the field, such as historical yield, historical nutrient levels, historical crop height, historical compaction susceptibility, and historical trafficability, as well as various other historical agricultural characteristics. However, in some cases, the operators may desire data that is more current relative to the current growing season, for example, a historical yield map may be helpful when growing the same crop on the same field in successive years but may be less helpful when growing a different crop (or a different hybrid of the same crop, for instance) in a successive year. Additionally, even when growing the same crop of the same genotype in a successive year, a historical yield map may still be less helpful where there is other variance between seasons, such as different growing conditions. These are merely examples.

To collect more current data (relative to the current growing season), a survey, such as an aerial survey (e.g., satellite, drone, flyover, etc.), of the field can be conducted to collect various data from which an agricultural characteristic map can be generated. In other examples, data collected during other operations in the same growing season (e.g., tilling, planting, spraying, etc.) can be used to produce an agricultural characteristic map for use during a following operation during the same growing season (e.g., harvesting, etc.). While these maps can be made with accuracy at the time the data is collected and can include predictive, estimated, measured, identified, and/or determined values of agricultural characteristics, in the passage of time between conducting the survey or previous operation (or both) and the operation to be conducted on the field, anomalies and/or events (e.g., weather events and/or conditions, fires, waves/tides, volcanoes, earthquakes, flooding, human caused events, etc.) can occur that can dynamically alter the agricultural characteristics of the field (as well as other characteristics of the field). In one example, vegetative index data, such as Normalized Difference Vegetation Index (NDVI) data or Leaf Area Index (LAI) data, for a field of interest can be collected, such as from an aerial survey (e.g., satellite-based sensing, drone-based sensing, etc.), for example, during the vegetative stage of the crop, on the basis of which an agricultural characteristic map, such as a yield and/or a biomass map for the field of interest can be generated. However, in the time since the vegetative index data was collected, the field (and crop thereon) may have experienced moisture stress (e.g., drought stress), for example, during the reproductive stage of the crop, which may alter the agricultural characteristics, such as alter the yield and/or biomass of the crop.

In another example, washouts, ruts, drifts, rills, gullies, erosion, material/sediment deposit or build-up (e.g., ridges, soil drift, etc.), among various other conditions, can be present on the field due to the anomalies and/or events that occur in the passage of time between conducting the survey or previous operation (or both) and the operation to be conducted on the field. These changes in the topography of the field may not be represented in a topographic map provided to the operator (or the control system) of the agricultural machine that is based on data collected prior to the occurrence of the anomalies and/or events. Thus, the machine settings and other operating parameters commanded by the operator (or the control system) based on these agricultural characteristic maps can lead to error or other deviation in the performance of the agricultural machines.

Additionally, it should be understood that further data collection more immediately prior to the operation to be conducted on the field, such as by various surveys (e.g., aerial, human, machine, etc.), may not be possible. In some examples, certain characteristics may only be detectable and/or certain sensing techniques may only be accurate at certain times of the growing season, for instance, field surface imaging may only provide accurate results during bare field conditions and/or during early parts of the growing season when the crop is not present or does not interfere with the sensor's field of vision. In another example, satellite-based sensing may only be available for a given location during certain time periods, such as per the orbit schedule of the satellite (e.g., once every three weeks) and thus there may be a window of time during which satellite-based data is not available. Additionally, even if satellite-based sensing is available, if the weather or meteorological conditions obscure the view of the satellite-based sensors, the resulting data of the field may be affected or otherwise unavailable. In another example, drone-based sensing may also present difficulties, for instance, certain operators may not have access to drones, the drones may not have a particular type of sensor and/or an adequate sensor for the particular agricultural characteristic of interest, obscurants on the field or in the environment of the field may affect the data collected by the drone, as well as various other difficulties.

For the sake of illustration, and in one particular example, corn plants can experience "firing", a condition in which lower leaves on the corn plant begin turning yellow prematurely, eventually turning brown followed by death of the lower leaves, due to nitrogen deficiencies during the early and mid-season of corn growth. An overhead (e.g., aerial) survey of the corn field may capture data, such as vegetative index data (e.g., NDVI data, LAI data, etc.), that indicates that the corn plants are growing normally and/or are healthy (e.g., still appear green, etc.) even though the corn plants are or have experienced firing. This is because the lower leaves may not be visible and/or detectable to the sensors used during the survey (e.g., are blocked from sight by the upper parts of the plant). Thus, the data collected during the survey may provide inaccurate indications. This could result in an inaccuracy in various agricultural characteristic maps, such as yield maps, biomass maps, plant available nutrient maps (e.g., nitrogen maps), as well as various other agricultural characteristic maps indicative of various other agricultural characteristics. For the sake of illustration, and in another particular example, data quality may not be sufficient to provide accurate or reliable indications. For example, in the case of NDVI data, in the early point in the growing season, the sensor data (e.g., image(s)) may not be as useful because there is too little plant growth captured in the imagery, while, in the later parts of the growing season (e.g., when the plants are fully grown or at peak vegetative performance) the sensor data (e.g., image(s)) may not be as useful because their peak vegetative growth results in saturated imagery and low prediction accuracy (e.g., low yield prediction accuracy). These are merely some examples of the difficulties associated with gathering data that can provide accurate and/or reliable indications (e.g., estimations and/or predictions of agricultural characteristics).

The mobile machine can have on-board sensors, such as forward-looking imaging systems (e.g., lidar, radar, camera, etc.) which can provide near real-time information indicative of the agricultural characteristics of the field. However, these sensors can have a limited field of view and thus they may not capture and feed information back to the operator (or control system) quickly enough to adjust the machine settings or operating parameters of the agricultural machines to avoid the error or deviation in performance.

Some systems can even utilize perception systems (such as imaging systems mounted on the agricultural machines) or additional survey systems that work in concert with the agricultural machines (such as drones that fly and/or observe ahead of the agricultural machines). However, these systems may not observe the changes that can occur to the field in a timely or reliable way. For example, vegetation growth on the field may obscure the view of such systems. Further, additional surveys can be performed at a time closer to the time when the operation (e.g., harvesting operation, spraying operation, etc.) is to be performed to, for instance, correct or otherwise supplement the original (e.g., baseline) agricultural characteristic map. However, and particularly with certain operations, the characteristics of the worksite can be such that additional surveys may not be able to accurately ascertain exact agricultural characteristic information. For example, at or close to the time that the operation is to be performed, the vegetation on the field can be quite dense and tall, and thus the ability of the sensors on the survey machines to collect agricultural characteristic data can be diminished or otherwise impeded, as a view of certain agricultural characteristics of the field can often be inconsistently visible if not completely obscured. Thus, the agricultural characteristic information of the field may be incomplete or will not otherwise accurately reflect a current agricultural characteristic of the field, and thus, the control of the machine can be sub-optimal. Additionally, operators, managers, farmers, etc., may not have access to additional machinery and/or equipment (e.g., sensors) to provide additional data close to the time of the operation to be performed, for various reasons. Additionally, operators, managers, farmers, etc., may not have time available to gather additional data close to the time of the operation to be performed. For example, there can be a time schedule (e.g., deadline) or window of time available for performing operations, and in that time other events (e.g., weather) can diminish the time available. The agricultural characteristic may not vary uniformly across space in the time between data collection and use. For example, a drought may impact predicted yield more on a hilltop than in a low spot in a field.

In one example, the height or tilt of a header on a harvesting machine and/or the forward travel speed of a harvesting machine can be controlled based on an agricultural characteristic map, such as a yield, crop height, and/or biomass map, of a field, such as to control a feedrate. The yield, crop height, and/or biomass map, however, may not accurately represent current yield, crop height, and/or biomass levels due to, for instance, intervening drought conditions that occurred in a time after the data for the yield, crop height, and/or biomass map was collected that lessened the yield, crop height, and/or biomass. Thus, the controlled position of the header and/or the forward travel speed of the harvester, based on the yield, crop height, and/or biomass map, may produce sub-optimal results, such as a sub-optimal federate. In another example, the height or tilt of a header on a harvesting machine can be controlled based on a topographic map of the field. The topographic map, however, may not show a new ridge of soil that was created on the field (e.g., by wind or water) in a time after the data for the topographic map was collected. Thus, the header's position (e.g., height, orientation, tilt, etc.) can be such that it will run into the new ridge of soil. In another example, the position (e.g., height, orientation, tilt, etc.) of a boom on a spraying machine can be controlled based on a topographic map of the field. The topographic map, however, may not show a washout that was created on the field (e.g., by water, such as flooding or heavy rain) in a time after the data for the topographic map was collected. Thus, as the spraying machine travels over the field, it can encounter and enter the washout which can lower the height of the boom such that it is no longer traveling above the crop canopy, but is instead traveling through the crops, which can affect the quality of the spraying operation and the effectiveness of the application of sprayed substance. These are merely some examples.

To address at least some of these difficulties, the present description provides a control system including, among other things, an agricultural characteristic confidence system. As will be discussed further below, the control system obtains (e.g., as a baseline) an agricultural characteristic map of a field to be operated upon. The control system further obtains supplemental data relative to the field that is gathered in the time between the data for the baseline agricultural characteristic map was collected and the operation to be performed on the field or before the operation is performed at a particular geographic location on the field. The control system performs a confidence analysis on the baseline agricultural characteristic map, based on the supplemental data as well as various algorithmic processes, and generates an agricultural characteristic confidence output, such as an agricultural characteristic confidence level or an agricultural characteristic confidence map of the field indicative of, among other things, a confidence in agricultural characteristics of the field as indicated by the baseline map. In some examples, the confidence level may be expressed as a percent likelihood that the actual agricultural characteristic value is within a certain range of the baseline agricultural characteristic value for a portion of the field (e.g., there is 95% confidence that the actual yield is within 5% of the baseline predicted yield, as indicated by the baseline yield map). In some other examples, the confidence level may be expressed as the likelihood that cumulative experience of a crop at a location in the field has led to crop development being hindered (e.g., confidence in the baseline predictive yield map for a portion of a field is LOW following very low precipitation in the four weeks since emergence and then a 5-inch rain that caused ponding over the portion of the field for four days). The system uses the agricultural characteristic confidence output to generate various action signals. The action signals can be used to automatically or semi-automatically control the machine to improve overall performance by, for example, automatically controlling machine subsystems, providing operator assistance features, and providing recommendations and/or indications on interfaces or interface mechanisms that represent various information, including, but not limited to, the agricultural characteristic confidence output, such as the agricultural characteristic confidence level and/or the agricultural characteristic confidence map of the field.

In one example, an agricultural characteristic map in the form of a yield map of a field is obtained (e.g., as a baseline), the yield map indicating, among other things, estimated yield of crops on the field. The obtained yield map can be based on a variety of data, such as vegetative index data, for instance NDVI data and/or LAI data collected at a given time, such as during the vegetative stage of the of the crop on the field. Supplemental data, indicative of various characteristics, may then be collected in a time after the data for the yield map was collected, for instance, supplemental data indicative of moisture stress (e.g., drought stress) may be collected, such as during the reproductive phase of the crop. Based on the yield map and the supplemental data, an agricultural characteristic output, such as an agricultural characteristic confidence map, can be generated, the agricultural characteristic confidence output (e.g., map) indicating a confidence (e.g., confidence value) in the yield values indicated by the yield map. A mobile machine (e.g., harvester) can be controlled on the basis of the agricultural characteristic confidence output, such as by controlling the travel speed of the mobile machine. For example, the agricultural characteristic confidence output may indicate that the yield, as indicated by the baseline yield map, is reduced and/or that the plant growth was reduced and thus the travel speed of the harvester can be increased, such as to maintain a desired federate given the reduced yield and/or plant growth. In another example, the agricultural characteristic confidence output may indicate that the crop on the field is drier than expected (e.g., based on the supplemental data indicating moisture stress) and thus the travel speed of harvester may be reduced to prevent front end losses that can occur with dry crop. In another example, a recommendation can be generated on the basis of the agricultural characteristic confidence output.

In one example, an agricultural characteristic map in the form of a plant available nutrient map (e.g., a plant available nitrogen map) of a field is obtained (e.g., as a baseline), the plaint available nutrient map indicating, among other things, the availability of nutrients to plants on the field. The obtained plant available nutrient map can be based on a variety of data collected at various times (e.g., during early crop growth), such as various soil data (e.g., soil sample(s)) and/or operational data indicating nutrient application parameters of a nutrient application operation performed on the field. Supplemental data, indicative of various characteristics, may then be collected in a time after the data for the plant available nutrient map was collected, for instance, supplemental data indicative of precipitation levels experienced at the field, for instance, supplemental data indicative of high rainfall experienced at the field, as high rainfall could impact early season (e.g., early crop growth) nutrient (e.g., nitrogen) application retention. Based on the plant available nutrient map and the supplemental data, an agricultural characteristic confidence output, such as an agricultural characteristic map, can be generated, the agricultural characteristic confidence output (e.g., map) indicating a confidence (e.g., confidence value) in the plant available nutrient value indicated by the baseline plaint available nutrient map. The agricultural characteristic confidence output can indicate a confidence in a predictive late season plant available nutrient map (that is based on the values indicated by the obtained plant available nutrient map). A mobile machine can be controlled on the basis of the agricultural characteristic confidence output. In another example, a recommendation can be generated on the basis of the agricultural characteristic confidence output, such as a recommendation to apply more nutrient to the field.

In one example, an agricultural characteristic map in the form of a crop height map of a field is obtained (e.g., as a baseline), the crop height map indicating, among other things, estimated heights of crops on the field. The obtained crop height map can be based on a variety of data collected at various times, such as vegetative index data (e.g., NDVI data, LAI data, etc.), images obtained of the field, lidar data, various survey data, previous operation data, as well as a variety of other data. Supplemental data, indicative of various characteristics, may then be collected in a time after the data for the crop height map was collected, for instance, supplemental data indicative of growing conditions, such as various weather data (e.g., temperature, precipitation, wind, sunlight and/or cloud cover, etc.), various nutrient availability data (e.g., plant available nitrogen), various soil data (e.g., soil composition, soil type, soil moisture, etc.), as well as various other data indicative of growing conditions of the crop on the field. Based on the crop height map and the supplemental data, an agricultural characteristic confidence output, such as an agricultural characteristic confidence map, can be generated, the agricultural characteristic confidence output (e.g., map) indicating a confidence (e.g., confidence value) in the crop height values indicated by the baseline crop height map. A mobile machine can be controlled based on the agricultural characteristic confidence output. In another example, a recommendation can be generated based on the agricultural characteristic confidence output. In one example, the agricultural characteristic confidence output (e.g., map) may indicate a confidence in cotton plant height values indicated by the baseline crop height map and can be used to control the parameters of a pix (mepiquat chloride) application operation, such as application rate, application timing, application location, as well as various other parameters, and/or provide various recommendations, such as a recommendation indicating whether a pix operation should be conducted.

In one example, an agricultural characteristic map in the form of a compaction susceptibility and/or trafficability map of a field is obtained (e.g., as a baseline), the compaction and/or trafficability map indicating, among other things, the compaction susceptibility and/or trafficability of the field. The obtained compaction susceptibility and/or trafficability map can be based on a variety of data collected at various times, such as various data (e.g., soil type, soil composition, soil structure, soil moisture, soil sample(s), a soil moisture map, etc.), various weather data (e.g., precipitation, sunlight and/or cloud cover, wind, temperature, etc.), survey data, operational data, as well as various other data. Supplemental data, indicative of various characteristics, may then be collected in a time after the data for the compaction susceptibility and/or trafficability map was collected, for instance, supplemental data indicative of drying conditions, such as precipitation levels experienced at the field, sunlight and/or cloud cover experienced at the field, wind levels experienced at the fields, as well as various other weather data. The drying conditions can be indicative of how much the soil at the field has dried and/or soil moisture at the field. Based on the compaction susceptibility and/or trafficability map and the supplemental data, an agricultural characteristic confidence output, such as an agricultural characteristic confidence map, can be generated, the agricultural characteristic confidence output (e.g., map) indicating a confidence (e.g., confidence value) in the compaction susceptibility and/or trafficability of the field as indicated by the baseline compaction susceptibility and/or trafficability map. A mobile machine can be controlled based on the agricultural characteristic confidence output, such as a route and/or a travel speed of the mobile machine. Additionally, a recommendation can be generated based on the agricultural characteristic confidence output.

These different agricultural characteristic maps, supplemental data, agricultural characteristic confidence outputs and controls and/or recommendations based thereon, are merely examples. Various other agricultural characteristic maps and supplemental data can be obtained, on the basis of which various other agricultural characteristic confidence outputs can be generated and used for control and/or recommendations, as well as used for the generation of various other outputs.

Figure 2:
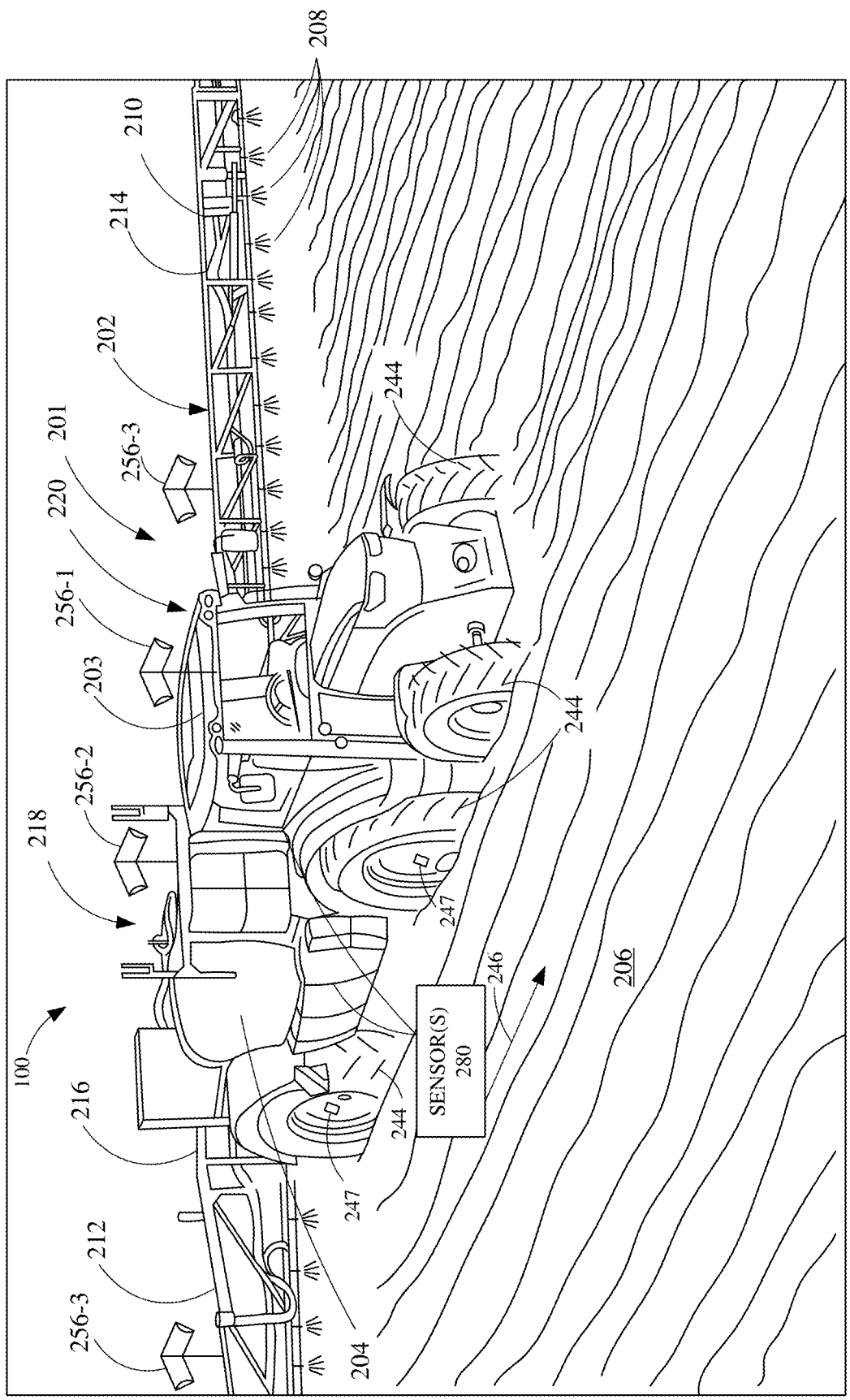
FIG. 2 is a perspective view showing one example of a mobile agricultural machine.

The present description can apply to any of a wide variety of mobile machines, such as mobile agricultural machines, mobile construction machines, mobile forestry machines, mobile turf management machines. The present description proceeds with examples with reference to particular agricultural machines. These particular agricultural machines are described herein as examples only. FIG. 1 illustrates a harvester 101 and FIG. 2 illustrates a sprayer 201. Again, these are only examples of the different types of mobile machines that the present description contemplates.

FIG. 1 is a partial pictorial, partial schematic, illustration of a mobile agricultural machine 100, in an example where mobile machine 100 is a combine harvester (also referred to as combine 101 or mobile machine 101). It can be seen in FIG. 1 that combine 101 illustratively includes an operator compartment 103, which can have a variety of different operator interface mechanisms for controlling combine 101. Operator compartment 103 can include one or more operator interface mechanisms that allow an operator to control and manipulate combine 101. The operator interface mechanisms in operator compartment 103 can be any of a wide variety of different types of mechanisms. For instance, they can include one or more input mechanisms such as steering wheels, levers, joysticks, buttons, pedals, switches, etc. In addition, operator compartment 103 may include one or more operator interface display devices, such as monitors, or mobile devices that are supported within operator compartment 103. In that case, the operator interface mechanisms can also include one or more user actuatable elements displayed on the display devices, such as icons, links, buttons, etc. The operator interface mechanisms can include one or more microphones where speech recognition is provided on combine 101. They can also include one or more audio interface mechanisms (such as speakers), one or more haptic interface mechanisms or a wide variety of other operator interface mechanisms. The operator interface mechanisms can include other output mechanisms as well, such as dials, gauges, meter outputs, lights, audible or visual alerts or haptic outputs, etc.

Combine 101 includes a set of front-end machines forming a cutting platform 102 that includes a header 104 having a cutter generally indicated at 106. It can also include a feeder house 108, a feed accelerator 109, and a thresher generally indicated at 111. Thresher 111 illustratively includes a threshing rotor 112 and a set of concaves 114. Further, combine 101 can include a separator 116 that includes a separator rotor. Combine 101 can include a cleaning subsystem (or cleaning shoe) 118 that, itself, can include a cleaning fan 120, a chaffer 122 and a sieve 124. The material handling subsystem in combine 101 can include (in addition to a feeder house 108 and feed accelerator 109) discharge beater 126, tailings elevator 128, clean grain elevator 130 (that moves clean grain into clean grain tank 132) as well as unloading auger 134 and spout 136. Combine 101 can further include a residue subsystem 138 that can include chopper 140 and spreader 142. Combine 101 can also have a propulsion subsystem that includes an engine (or other power source) that drives ground engaging elements 144 (such as wheels, tracks, etc.). It will be noted that combine 101 can also have more than one of any of the subsystems mentioned above (such as left and right cleaning shoes, separators, etc.).

As shown in FIG. 1, header 104 has a main frame 107 and an attachment frame 110. Header 104 is attached to feeder house 108 by an attachment mechanism on attachment frame 110 that cooperates with an attachment mechanism on feeder house 108. Main frame 107 supports cutter 106 and reel 105 and is movable relative to attachment frame 110, such as by an actuator (not shown). Additionally, attachment frame 110 is movable, by operation of actuator 149, to controllably adjust the position of front-end assembly 102 relative to the surface (e.g., field) over which combine 101 travels in the direction indicated by arrow 146, and thus controllably adjust a position of header 104 from the surface. In one example, main frame 107 and attachment frame 110 can be raised and lowered together to set a height of cutter 106 above the surface over which combine 101 is traveling. In another example, main frame 107 can be tilted relative to attachment frame 110 to adjust a tilt angle with which cutter 106 engages the crop on the surface. Also, in one example, main frame 107 can be rotated or otherwise moveable relative to attachment frame 110 to improve ground following performance. In this way, the roll, pitch, and/or yaw of the header relative to the agricultural surface can be controllably adjusted. The movement of main frame 107 together with attachment frame 110 can be driven by actuators (such as hydraulic, pneumatic, mechanical, electromechanical, or electrical actuators, as well as various other actuators) based on operator inputs or automated inputs.

In operation, and by way of overview, the height of header 104 is set and combine 101 illustratively moves over a field in the direction indicated by arrow 146. As it moves, header 104 engages the crop to be harvested and gather it towards cutter 106. After it is cut, the crop can be engaged by reel 105 that moves the crop to a feeding system. The feeding system move the crop to the center of header 104 and then through a center feeding system in feeder house 108 toward feed accelerator 109, which accelerates the crop into thresher 111. The crop is then threshed by rotor 112 rotating the crop against concaves 114. The threshed crop is moved by a separator rotor in separator 116 where some of the residue is moved by discharge beater 126 toward a residue subsystem. It can be chopped by a residue chopper 140 and spread on the field by spreader 142. In other implementations, the residue is simply dropped in a windrow, instead of being chopped and spread.

Grain falls to cleaning shoe (or cleaning subsystem) 118. Chaffer 122 separates some of the larger material from the grain, and sieve 124 separates some of the finer material from the clean grain. Clean grain falls to an auger in clean grain elevator 130, which moves the clean grain upward and deposits it in clean grain tank 132. Residue can be removed from the cleaning shoe 118 by airflow generated by cleaning fan 120. That residue can also be moved rearwardly in combine 100 toward the residue handling subsystem 138.

Tailings can be moved by tailing elevator 128 back to thresher 110 where they can be re-threshed. Alternatively, the tailings can also be passed to a separate re-threshing mechanism (also using a tailings elevator or another transport mechanism) where they can be re-threshed as well.

FIG. 1 also shows that, in one example, combine 101 can include a variety of one or more sensors 180, some of which are illustratively shown. For example, combine 100 can include ground speed sensors 147, one or more separator loss sensors 148, a clean grain camera 150, one or more cleaning shoe loss sensors 152, and one or more perception systems 156 (e.g., forward-looking systems, such as a camera, lidar, radar, etc., an imaging system such as a camera, as well as various other perception systems). Ground speed sensor 147 illustratively senses the travel speed of combine 100 over the ground. This can be done by sensing the speed of rotation of ground engaging elements 144, the drive shaft, the axle, or various other components. The travel speed can also be sensed by a positioning system, such as a global positioning system (GPS), a dead-reckoning system, a LORAN system, or a wide variety of other systems or sensors that provide an indication of travel speed. Perception system 156 is mounted to and illustratively senses the field (and characteristics thereof) in front of and/or around (e.g., to the sides, behind, etc.) combine 101 (relative to direction of travel 146) and generates sensor signal(s) (e.g., an image) indicative of those characteristics. For example, perception system 156 can generate a sensor signal indicative of change in agricultural characteristics in the field ahead of and/or around combine 101. While shown in a specific location in FIG. 1, it will be noted that perception system 156 can be mounted to various locations on combine 101 and is not limited to the depiction shown in FIG. 1. Additionally, while only one perception system 156 is illustrated, it will be noted that combine 101 can include any number of perception systems 156, mounted to any number of locations within combine 101, and configured to view any number of directions around combine 101.

Cleaning shoe loss sensors 152 illustratively provide an output signal indicative of the quantity of grain loss by both the right and left sides of the cleaning shoe 118. In one example, sensors 152 are strike sensors which count grain strikes per unit of time (or per unit of distance traveled) to provide an indication of the cleaning shoe grain loss. The strike sensors for the right and left sides of the cleaning shoe can provide individual signals, or a combined or aggregated signal. It will be noted that sensors 152 can comprise on a single sensor as well, instead of separate sensors for each shoe.

Separator loss sensors 148 provide signals indicative of grain loss in the left and right separators. The sensors associated with the left and right separators can provide separate grain loss signals or a combined or aggregate signal. This can be done using a wide variety of different types of sensors as well. It will be noted that separator loss sensors 148 may also comprise only a single sensor, instead of separate left and right sensors.

It will be appreciated, and as will be discussed further herein, sensors 180 can include a variety of other sensors not illustratively shown in FIG. 1. For instance, they can include residue setting sensors that are configured to sense whether combine 100 is configured to chop the residue, drop a windrow, etc. They can include cleaning shoe fan speed sensors that can be configured proximate fan 120 to sense the speed of the fan. They can include threshing clearance sensors that sense clearance between the rotor 112 and concaves 114. They can include threshing rotor speed sensors that sense a rotor speed of rotor 112. They can include chaffer clearance sensors that sense the size of openings in chaffer 122. They can include sieve clearance sensors that sense the size of openings in sieve 124. They can include material other than grain (MOG) moisture sensors that can be configured to sense the moisture level of the material other than grain that is passing through combine 101. They can include machine settings sensors that are configured to sense the various configured settings on combine 101. They can also include machine orientation sensors that can be any of a wide variety of different types of sensors that sense the orientation of combine 101, and/or components thereof. They can include crop property sensors that can sense a variety of different types of crop properties, such as crop type, crop moisture, and other crop properties. The crop property sensors can also be configured to sense characteristics of the crop as they are being processed by combine 101. For instance, they can sense grain feed rate, as it travels through clean grain elevator 120. They can sense mass flow rate of grain through elevator 130 or provide other output signals indicative of other sensed variables. Sensors 180 can include soil property sensors that can sense a variety of different types of soil properties, including, but not limited to, soil type, soil compaction, soil moisture, soil structure, among others.

Some additional examples of the types of sensors that can be used are described below, including. but not limited to a variety of position sensors that can generate sensor signals indicative of a position (e.g., geographic location, orientation, elevation, etc.) of combine 101 on the field over which combine 101 travels or a position of various components of combine 101 (e.g., header 104) relative to, for example, the field over which combine 101 travels.

As combine 101 moves in the direction indicated by arrow 146, it may be that the ground under, ahead, or otherwise around combine 101 contains variations in agricultural characteristics, such as crop height, yield, biomass, obstacles or variations in topography, as well various other agricultural characteristics. In operation, the operator sets the position of header 104 to a certain height from the field such that header 104 effectively engages the crop and sets the travel speed of the combine 101, in order to maintain a federate, reduce losses (e.g., optimize yield), as well as to achieve various other performance parameters. Variations in agricultural characteristics, such as variations in crop height, yield, biomass, obstacles and/or variations in the topography of the field can cause poor performance, such as due to a change in the distance of header 104 from the field and/or a change of the distance of header from a portion of the crop plant, which can cause header 104 to engage the crop improperly or otherwise undesirably, a travel speed too high or too low given the actual agricultural characteristics, as well as various other causes. Such errors can affect, amongst other things, the crop yield produced by combine 101. Additionally, sudden changes in the topography of the field or encountering obstacles can cause header 104 to collide with the field.

FIG. 2 is a perspective showing one example of a mobile agricultural machine, in an example where mobile machine 100 is an agricultural sprayer (also referred to as sprayer 201 or mobile machine 201). It can be seen in FIG. 1 that agricultural sprayer 201 includes a spraying system 202 having a tank 204 containing a liquid that is to be applied to field 206 as agricultural sprayer travels in the direction indicated by arrow 246. Tank 204 is fluidically coupled to spray nozzles 208 by a delivery system comprising a set of conduits that define a flow path for the liquid from tank 204 to one or more spray nozzles 208. A fluid conveyance system (e.g., a fluid pump) is configured to convey the liquid from tank 204 through the conduits to and through nozzles 208. The operation of the fluid conveyance system is adjustable, such as automatically or manually, to vary a pressure, a flow rate of liquid, as well as various other fluid characteristics of spraying system 202. Spray nozzles 208 are coupled to and spaced apart along boom 210. In one example, the operation and position of spray nozzles 208 can be adjusted, such as automatically, semi-automatically, or manually. For example, the position (e.g., height, orientation, tilt, etc.) of nozzles 208 can be adjusted, as well as the volume or flow rate of liquid passing through nozzles 208 (such as by operation of a controllable valve). Boom 210 includes arms 212 and 214 which can articulate or pivot relative to a center frame 216. Thus, arms 212 and 214 are movable between a storage or transport position and an extended or deployed position (shown in FIG. 2). The position (e.g., height, orientation, tilt, etc.) of boom 210 and/or arms 212 and 214 can be adjustable by actuation or operation of a controllable actuator (not shown) to drive movement of the boom 210 and/or arms 212 and 214. For example, but not by limitation, the distance (e.g., height) of boom 210 and/or arms 212 and 214 from field 206 can be varied, such as automatically or manually.

In the example illustrated in FIG. 2, sprayer 201 comprises a towed implement 218 that carries spraying system 202 and is towed by a towing or support machine 220 (illustratively a tractor) having an operator compartment 203, which can have a variety of different operator interface mechanisms for controlling sprayer 201. Operator compartment 203 can include one or more operator interface mechanisms that allow an operator to control and manipulate sprayer 201. The operator interface mechanisms in operator compartment 203 can be any of a wide variety of different types of mechanisms. For instance, they can include one or more input mechanisms such as steering wheels, levers, joysticks, buttons, pedals, switches, etc. In addition, operator compartment 203 may include one or more operator interface display devices, such as monitors, or mobile devices that are supported within operator compartment 203. In that case, the operator interface mechanisms can also include one or more user actuatable elements displayed on the display devices, such as icons, links, buttons, etc. The operator interface mechanisms can include one or more microphones where speech recognition is provided on sprayer 201. They can also include audio interface mechanisms (such as speakers), one or more haptic interface mechanisms or a wide variety of other operator interface mechanisms. The operator interface mechanisms can include other output mechanisms as well, such as dials, gauges, meter outputs, lights, audible or visual alerts or haptic outputs, etc.

Sprayer 201 includes a set of ground engaging elements 244, such as wheels, tracks, etc. Sprayer 201 can also have a propulsion subsystem that includes an engine (or other power source) that drives ground engaging elements 244. It will be noted that in other examples, sprayer 201 is self-propelled. That is, rather than being towed by a towing machine, the machine that carries the spraying system also includes propulsion and steering systems.

In operation, and by way of overview, the height of boom 210 (or arms 212 and 214) are set and sprayer 201 moves over field 206 in the direction indicated by arrow 246. As it moves, substance is conveyed from tank 204 through conduits in boom 210 and to and through nozzles 208 to be applied to vegetation on field 206. The application of substance on field 206 can be controllably adjusted. For example, but not by limitation, by varying the height of boom 210 (or arms 212 and 214) off of field 206, varying the position (e.g., height, orientation, tilt, etc.) of nozzles 208, varying the flow characteristics of the substance through the spraying system, etc.

FIG. 2 also shows that, in one example, sprayer 201 can include a variety of one or more sensors 280, some of which are illustratively shown. For example, sprayer 201 can include one or more ground speed sensors 247, and one or more perception systems 256 (e.g., forward-looking systems, such as a camera, lidar, radar, etc., an imaging system such as a camera, as well as various other perception systems). Ground speed sensors 247 illustratively sense the travel speed of sprayer 201 over field 206. This can be done by sensing the speed of rotation of ground engaging elements 244, the drive shaft, the axle, or various other components. The travel speed can also be sensed by a positioning system, such as a global positioning system (GPS), a dead-reckoning system, a LORAN system, or a wide variety of other systems or sensors that provide an indication of travel speed. Perception systems 256 (identified as 256-1 to 256-3) are mounted at various locations within sprayer 201 and illustratively sense the field (and characteristics thereof) in front of or around (e.g., to the sides, behind, etc.) sprayer 201 (relative to direction of travel 246) and generate sensor signal(s) (e.g., images) indicative of those characteristics. For example, forward-looking perception systems 256 can generate sensor signals indicative of change in topography of field 206 ahead of or around sprayer 201, a change in the height and/or location of vegetation ahead of or around sprayer 201, as well as various other characteristics. While shown in specific location in FIG. 2, it will be noted that perception systems 256 can be mounted at various locations within sprayer 201 and are not limited to the depiction shown in FIG. 2.

Additionally, while a particular number of perception systems 256 are shown in the illustration, it will be noted that any number of perception systems can be placed at any number of locations within sprayer 201. FIG. 2 shows that the perception systems 256 can be mounted at one or more locations within sprayer 201. For example, they can be mounted on towing vehicle 220, as indicated by perception systems 256-1. They can be mounted on implement 218, as indicated by perception systems 256-2. They can be mounted on and spaced apart along boom 210, including each of boom arms 212 and 214, as indicated by perception systems 256-3. Perception systems 256 can be forward-looking systems configured to look ahead of components of sprayer 201, side-looking systems configured to look to the sides of components of sprayer 201, or rearward-looking systems configured to look behind components of sprayer 201. Perception systems 256 can be mounted on sprayer 201 such that they travel above or below a canopy of vegetation on agricultural surface 206. It is noted that these are only some examples of locations of perception systems 256, and that perception systems 256 can be mounted at one or more of these locations or various other locations within sprayer 201 or any combinations thereof.

It will be appreciated, and as will be discussed further herein, sensors 280 can include a variety of other sensors not illustratively shown in FIG. 2. For instance, they can include machine settings sensors that are configured to sense the various configured settings on sprayer 201. Sensors 280 can also include machine orientation sensors that can be any of a wide variety of different types of sensors that sense the orientation of sprayer 201, or the orientation of components of sprayer 201. Sensors 208 can include crop property sensors that can sense a variety of different types of crop properties, such as crop type, crop moisture, and other crop properties. Sensors 208 can include soil property sensors that can sense a variety of different types of soil properties, including, but not limited to, soil type, soil compaction, soil moisture, soil structure, among others.

Some additional examples of the types of sensors that can be used are described below, including, but not limited to a variety of position sensors that can generate sensor signals indicative of a position of sprayer 201 on the field over which sprayer 201 travels or a position of various components of sprayer 201 (e.g., nozzles 208, boom 210, arms 212 and 214, etc.) relative to, for example, the field over which sprayer 201 travels.

Figure 3:
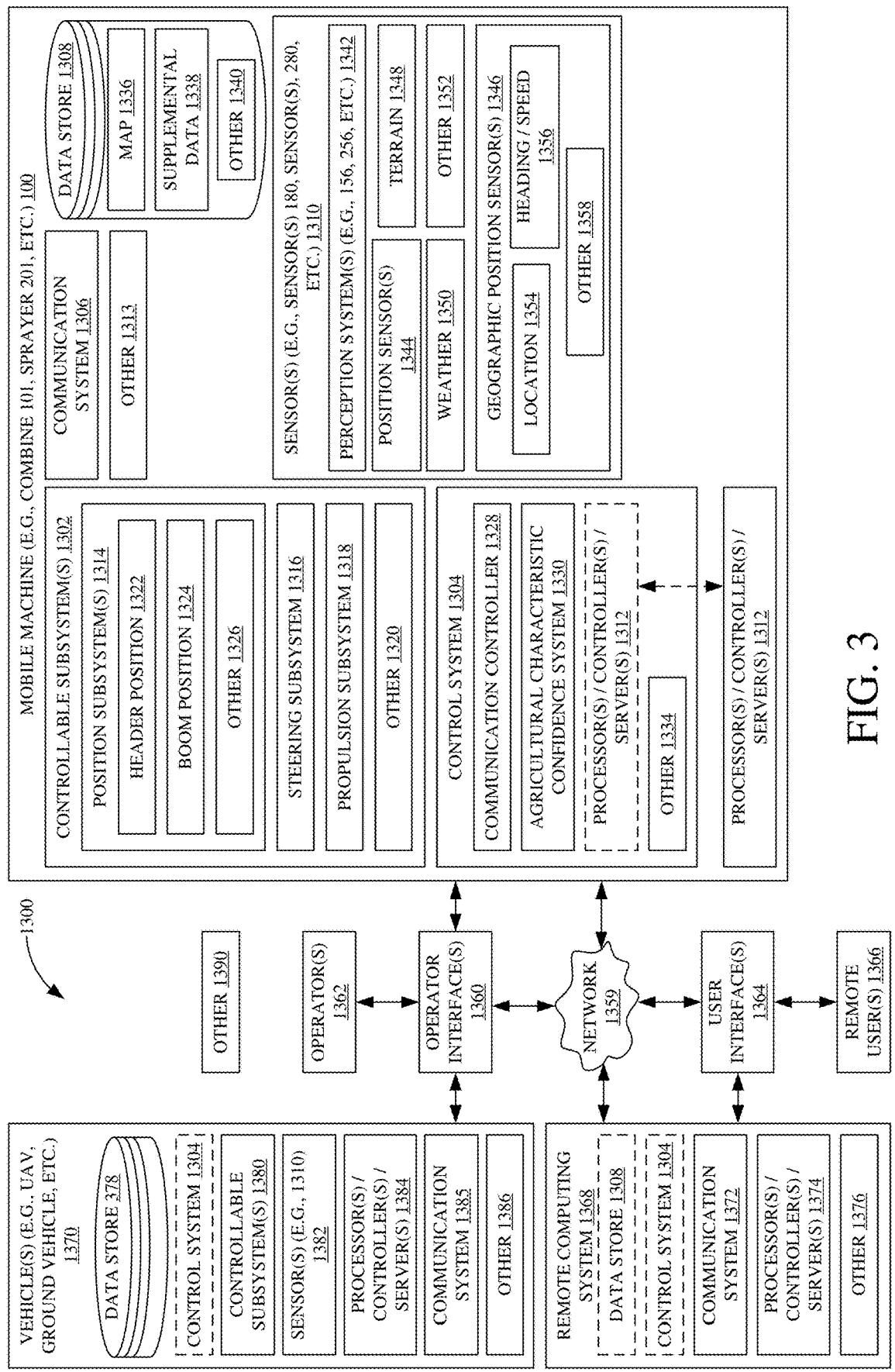
FIG. 3 is a block diagram of one example of a computing system architecture that includes the mobile agricultural machine illustrated in FIGS. 1-2.

FIG. 3 is a block diagram of one example of a computing architecture 1300 having, among other things, a mobile machine 100 (e.g., combine 101, sprayer 201, etc.) configured to perform an operation (e.g., harvesting, spraying, etc.) at a worksite (such as field 206). Some items are similar to those shown in FIGS. 1-2 and they are similarly numbered. FIG. 3 shows that architecture 1300 includes mobile machine 100, network 1359, one or more operator interfaces 1360, one or more operators 1362, one or more user interfaces 1 1364, one or more remote users 1366, one or more remote computing systems 1368, one or more vehicles 1370, and can include other items 1390 as well. Mobile machine 100 can include one or more controllable subsystems 1302, control system 1304, communication system 1306, one or more data stores 1308, one or more sensors 1310, one or more processors, controllers, or servers 1312, and it can include other items 1313 as well. Controllable subsystems 1302 can include position subsystem(s) 1314, steering subsystem 1316, propulsion subsystem 1318, and can include other items 1320 as well, such as other controllable subsystems, including, but not limited to those described above with reference to FIGS. 1-2. Position subsystem(s) 1314, itself, can include header position subsystem 1322, boom position subsystem 1324, and it can include other items 1326.

Control system 1304 can include one or more processors, controllers, or servers 1312, communication controller 1328, agricultural characteristic confidence system 1330, and can include other items 1334. Data stores 1308 can include map data 1336, supplemental data 1338, and can include other data 1340. As illustrated in FIG. 3, the one or more processors, controllers, or servers 1312 can be a part of control system 1304 or can be a part of the mobile machine 100 and be utilized by the control system 1304. Various other components of mobile machine 100 can be controlled by and/or implemented by the one or more processors, controllers, or servers 1312.

FIG. 3 also shows that sensors 1310 can include any number of different types of sensors that sense or otherwise detect any number of characteristics. Such as, characteristics relative to the environment of mobile machine 100 (e.g., agricultural surface 206), as well as the environment of other components in computing architecture 1300. Further, sensors 1310 can sense or otherwise detect characteristics relative to the components in computing architecture 1300, such as operating characteristics of mobile machine 100 or vehicles 1370, such as, current positional information relative to the header of combine 101 or the boom of sprayer 201. In the illustrated example, sensors 1310 can include one or more perception systems 1342 (such as 156 and/or 256 described above), one or more position sensors 1344, one or more geographic position sensors 1346, one or more terrain sensors 1348, one or more weather sensors 1350, and can include other sensors 1352 as well, such as, any of the sensors described above with reference to FIGS. 1-2 (e.g., sensors 180 or 280), as well as various other sensors that can sense a variety of characteristics, such as a variety of agricultural characteristics. For example, other sensors 1352 can include soil characteristic sensors (e.g., soil moisture, soil type, etc.), crop characteristic sensors (e.g., yield, biomass, crop height, crop volume, etc.), nutrient characteristic sensors (e.g., plant available nitrogen), as well as a variety of other sensors that sense a variety of other characteristics. Geographic position sensor 1346, itself, can include one or more location sensors 1354, one or more heading/speed sensors 1356, and can include other items 1358.

Additionally, sensors 1310 can, in some examples, be a component of mobile machine 100, or can be separate from mobile machine 100 but accessible (e.g., data can be obtained from) by mobile machine 100 (as well as other components of architecture 1300). Thus, in some examples, sensors 1310 can be a component of other machines, placed at various locations (e.g., fixed locations at or around a field or location of interest), or can be a part of another system.

Control system 1304 is configured to control other components and systems of computing architecture 1300, such as components and systems of mobile machine 100 or vehicles 1370. For instance, communication controller 1328 is configured to control communication system 1306. Communication system 1306 is used to communicate between components of mobile machine 100 or with other systems such as vehicles 1370 or remote computing systems 1368 over network 1359. Network 1359 can be any of a wide variety of different types of networks such as the Internet, a cellular network, a wide area network (WAN), a local area network (LAN), a controller area network (CAN), a near-field communication network, or any of a wide variety of other networks or combinations of networks or communication systems.

Remote users 1366 are shown interacting with remote computing systems 1368, such as through user interfaces 1364. Remote computing systems 1368 can be a wide variety of different types of systems. For example, remote computing systems 1368 can be in a remote server environment. Further, it can be a remote computing system (such as a mobile device), a remote network, a farm manager system, a vendor system, or a wide variety of other remote systems. Remote computing systems 1368 can include one or more processors, controllers, or servers 1374, a communication system 1372, and it can include other items 1376. As shown in the illustrated example, remote computing system 1368 can also include one or more data stores 1308 and control system 1304. For example, the data stored and accessed by various components in computing architecture 1300 can be remotely located in data stores 1308 on remote computing systems 1368. Additionally, various components of computing architecture 1300 (e.g., controllable subsystems 1302) can be controlled by a control system 1304 located remotely at a remote computing system 1368. Thus, in one example, a remote user 1366 can control mobile machine 100 or vehicles 1370 remotely, such as by a user input received by user interfaces 1364. These are merely some examples of the operation of computing architecture 1300.

Vehicles 1370 (e.g., UAV, ground vehicle, etc.) can include one or more data stores 1378, one or more controllable subsystems 1380, one or more sensors 1382, one or more processors, controllers, or servers 1384, a communication system 1385, and it can include other items 3186. In the illustrated example, vehicles 1370 can also include control system 1304. Vehicles 1370 can be used in the performance of an operation at a worksite, such as a spraying or harvesting operation on an agricultural surface. For instance, a UAV or ground vehicle 1370 can be controlled to travel over the worksite, including ahead of or behind mobile machine 100. Sensors 1382 can include any number of a wide variety of sensors, such as, sensors 1310. For example, sensors 1382 can include perception systems 1342. In a particular example, vehicles 1370 can travel the field ahead of mobile machine 100 and detect any number of characteristics that can be used in the control of mobile machine 100, such as, detecting topographic characteristics ahead of combine 101 or sprayer 201 to control a height of header 102 or boom 110, from a surface of the worksite (e.g., field 206) as well as to control various other operating parameters of various other components. In another example, vehicles 1370 can travel the field behind mobile machine 100 and detect any number of characteristics that can be used in the control of mobile machine 100, so that vehicles 1370 can enable closed-loop control of mobile machine 100. In another example, vehicles 1370 can be used to perform a scouting operation to collect additional data, such as agricultural characteristic data, relative to the worksite or particular geographic locations of the worksite.

Additionally, control system 1304 can be located on vehicles 1370 such that vehicles 1370 can generate action signals to control an action of mobile machine 100 (e.g., adjusting an operating parameter of one or more controllable subsystems 1302), based on characteristics sensed by sensors 1382. Further, an agricultural characteristic confidence output, such as an agricultural characteristic confidence map can be generated by control system 1304 on vehicles 1370, or on the basis of data collected by vehicles 1370, to be used for the control of mobile machine 100.

As illustrated, vehicles 1370 can include a communication system 1385 configured to communicate with other components of computing architecture 1300, such as mobile machine 100 or remote computing systems 1368, as well as between components of vehicles 1370.

FIG. 3 also shows one or more operators 1362 interacting with mobile machine 100, remote computing systems 1368, and vehicles 1370, such as through operator interfaces 1360. Operator interfaces 1360 can be located on mobile machine 100 or vehicles 1370, for example in an operator compartment (e.g., 103 or 203, etc.), such as a cab, or they can be another operator interface communicably coupled to various components in computing architecture 1300, such as a mobile device or other interface mechanism.

Before discussing the overall operation of mobile machine 100, a brief description of some of the items in mobile machine 100, and their operation, will first be provided.

Communication system 1306 can include wireless communication logic, which can be substantially any wireless communication system that can be used by the systems and components of mobile machine 100 to communicate information to other items, such as among control system 1304, data stores 1308, sensors 1310, controllable subsystems 1302, and agricultural characteristic confidence system 1330. In another example, communication system 306 communicates over a controller area network (CAN) bus (or another network, such as an Ethernet network, etc.) to communicate information between those items. This information can include the various sensor signals and output signals generated by the sensor characteristics and/or sensed characteristics, and other items. Thus, in some examples, communication system 1306 can be a wireless communication system, a wired communication system, or include a combination of both.

Perception systems 1342 are configured to sense various characteristics relative to the environment around mobile machine 100, such as characteristics relative to the worksite (e.g., field) at which mobile machine 100 operates. For example, perception system(s) 1342 can be configured to sense characteristics relative to the vegetation on the worksite surface (e.g., stage, stress, damage, knockdown, density, biomass, height, volume, color, health, LAI data, NDVI data, etc.), characteristics relative to the topography of the worksite surface (e.g., washouts, ruts, drifts, soil erosion, soil deposits, soil buildup, obstacles, etc.), characteristics relative to the soil (e.g., type, compaction, structure, moisture etc.), characteristics relative to soil cover (e.g., residue, cover crop, etc.), as well as various other characteristics. Perception system(s) 1342 can also sense agricultural characteristics of the worksite ahead of or around mobile machine 100, such that a change in agricultural characteristics can be determined and/or identified and the operating parameters of mobile machine 100 can be adjusted (e.g., by control of one or more controllable subsystems 1302).

Perception systems 1342 can, in one example, include imaging systems, such as cameras. In other examples, perceptions systems 1342 can include lidars, radars, as well as a variety of other sensing systems.

Position sensors 1344 are configured to sense position information relative to various components of mobile machine 100. For example, a number of position sensors 1344 can be disposed at various locations within mobile machine 100. They can thus detect a position (e.g., height, orientation, tilt, etc.) of the various components of mobile machine 100, such as the height of header 104 or boom 210 (or boom arms 212 and 214) above the worksite, the height or orientation of nozzles 208, as well as position information relative to various other components. Position sensors 1344 can be configured to sense position information of the various components of mobile machine 100 relative to any number of items, such as position information relative to the worksite surface, position information relative to other components of mobile machine 100, as well as a variety of other items. For instance, position sensors 1344 can sense the height of header 104, boom 210 or spray nozzle(s) 208 from a detected top of vegetation on the worksite surface. In another example, the position and orientation of other items can be calculated, based on a sensor signal, by knowing the dimensions of the mobile machine 100.

Geographic position sensors 1346 include location sensors 1354, heading/speed sensors 1356, and can include other sensors 1358 as well. Location sensors 1354 are configured to determine a geographic location of mobile machine on the worksite (e.g., field 206). Location sensors 1354 can include, but are not limited to, a Global Navigation Satellite System (GNSS) receiver that receives signals from a GNSS satellite transmitter. Location sensors 1354 can also include a Real-Time Kinematic (RTK) component that is configured to enhance the precision of position data derived from the GNSS signal. Location sensors 1354 can include various other sensors, including other satellite-based sensors, cellular triangulation sensors, dead reckoning sensors, etc.

Heading/speed sensors 1356 are configured to determine a heading and speed at which mobile machine 100 is traversing the worksite during the operation. This can include sensors that sense the movement of ground-engaging elements (e.g., wheels or tracks 144 or 244) or can utilize signals received from other sources, such as location sensors 1354.

Terrain sensors 1348 are configured to sense characteristics of the worksite surface (e.g., field 206) over which mobile machine 100 is traveling. For instance, terrain sensors 1348 can detect the topography of the worksite (which may be downloaded as a topographic map or sensed with sensors) to determine the degree of slope of various areas of the worksite, to detect a boundary of the field, to detect obstacles or other objects on the field (e.g., rocks, root-balls, trees, etc.), among other things.

Weather sensors 1350 are configured to sense various weather characteristics relative to the worksite. For example, weather sensors 1350 can detect the direction and speed of wind traveling over the worksite. Weather sensors 1350 can detect precipitation, humidity, temperature, as well as numerous other conditions. This information can be obtained from a remote weather service as well.

Other sensors 1352 can include, for example, operating parameter sensors that are configured to sense characteristics relative to the machine settings or operation of various components of mobile machine 100 or vehicles 1370. Other sensors 1352 can include, for example, crop characteristic sensors that are configured to sense characteristics relative to crop on the field, such as crop height, crop volume, crop biomass. Other sensors 1352 can include, for example, soil characteristic sensors that are configured to sense characteristics relative to the soil at the field, such as soil type, soil moisture, etc. Other sensors 1352 can include, for example, nutrient characteristic sensors that are configured to sense characteristics relative to nutrient at the field, such as an amount and/or type of nutrient, for instance, an amount of plant available nitrogen at one or more locations within the field.

Sensors 1310 can comprise any number of different types of sensors. Such as potentiometers, Hall Effect sensors, various mechanical and/or electrical sensors. Sensors 1310 can also comprise various electromagnetic radiation (ER) sensors, optical sensors, imaging sensors, thermal sensors, LIDAR, RADAR, Sonar, radio frequency sensors, audio sensors, inertial measurement units, accelerometers, pressure sensors, flowmeters, etc. Additionally, while multiple sensors are shown detecting or otherwise sensing respective characteristics, sensors 1310 can include a sensor configured to sense or detect a variety of the different characteristics and can produce a single sensor signal indicative of the multiple characteristics. For instance, sensors 1310 can comprise an imaging sensor mounted at various locations within mobile machine 100 or vehicles 1370. The imaging sensor can generate an image that is indicative of multiple characteristics relative to both mobile machine 100 and vehicles 1370 as well as their environment (e.g., agricultural surface 110, field 206, etc.). Further, while multiple sensors are shown, more or fewer sensors 1310 can be utilized.

Additionally, it is to be understood that some or all of the sensors 1310 can be a controllable subsystem of mobile machine 100. For example, control system 1304 can generate a variety of action signals to control the operation, position (e.g., height, orientation, tilt, etc.), as well as various other operating parameters of sensors 1310. For instance, because the vegetation on the worksite can obscure the line of view of perception systems 1342, control system 1304 can generate action signals to adjust the position or orientation of perception systems 1342 to thereby adjust their line of sight. These are examples only. Control system 1304 can generate a variety of action signals to control any number of operating parameters of sensor(s) 1310.

Controllable subsystems 1302 illustratively include position subsystem(s) 1314, steering subsystem 1316, propulsion subsystem 1318, and can include other subsystems 1320 as well. The controllable subsystems 302 are now briefly described.

Position subsystem(s) 1314 are generally configured to control the position (e.g., height, orientation, tilt, etc.) or otherwise actuate movement of various components of mobile machine 100. Position subsystem(s) 1314, itself, can include header position subsystem 1322, boom position subsystem 1324, and can include other position subsystems 1326 as well. Header position subsystem 1322 is configured to controllably adjust the position (e.g., height, orientation, tilt, etc.) or otherwise actuate movement of header 104 on combine 101. Header position subsystem 1322 can include a number of actuators (such as electrical, hydraulic, pneumatic, mechanical or electromechanical actuators, as well as numerous other types of actuators) that are coupled to various components to adjust a position (e.g., height, orientation, tilt, etc.) of header 104 relative to the worksite surface (e.g., surface of field). For instance, upon the detection of an upcoming shift in topography (e.g., detection of a rut or a soil buildup, an obstacle, etc.) on the worksite surface, action signals can be provided to header position subsystem 1322 to adjust the position (e.g., height, orientation, tilt, etc.) of header 104 relative to the worksite surface.

Boom position subsystem 1324 is configured to controllably adjust the position (e.g., height, orientation, tilt, etc.) or otherwise actuate movement of boom 210, including individual boom arms 212 and 214. For example, boom position subsystem 1324 can include a number of actuators (such as electrical, hydraulic, pneumatic, mechanical or electromechanical actuators, as well as numerous other types of actuators) that are coupled to various components to adjust a position or orientation of boom 210 or individual boom arms 212 and 214. For instance, upon the detection of an upcoming change in crop height (e.g., detection of crop height increasing ahead of boom 210), action signals can be provided to boom position subsystem 1324 to adjust the position of boom 210 or boom arms 212 or 214 relative to agricultural surface 206, such that boom 210 will remain at a desired position relative to the crop canopy.

Other position subsystems 1326 can include a nozzle position subsystem configured to controllably adjust the position (e.g., height, orientation, tilt, etc.) or otherwise actuate movement of nozzles 208. The nozzle position subsystem can include a number of actuators (such as electrical, hydraulic, pneumatic, mechanical or electromechanical actuators, as well as numerous other types of actuators) that are coupled to various components to adjust a position (e.g., height, orientation, tilt, etc.) of nozzles 208. For example, upon the detection of an upcoming shift in topography (e.g., detection of a rut, soil buildup, an obstacle, etc.) or an upcoming shift in the height of vegetation (e.g., height of crop, weeds, etc.) on agricultural surface 206, action signals can be provided to the nozzle position subsystem to adjust the position (e.g., height, orientation, tilt, etc.) of nozzles 208 relative to agricultural surface 206 or relative to vegetation on agricultural surface 206.

Steering subsystem 1316 is configured to control the heading of mobile machine 100, by steering the ground engaging elements (e.g., wheels or tracks 144 or 244). Steering subsystem 1316 can adjust the heading of mobile machine 100 based on action signals generated by control systeml 1304. For example, based on sensor signals generated by sensors 1310 indicative of a change in agricultural characteristics, control system 1304 can generate action signals to control steering subsystem 316 to adjust the heading of mobile machine 100. In another example, control system 1304 can generate action signals to control steering subsystem 1316 to adjust the heading of mobile machine 100 to comply with a commanded route, such as an operator or user commanded route, or, and as will be described in more detail below, a route based on an agricultural characteristic confidence map generated by agricultural characteristic confidence system 1330, as well as various other commanded routes. The route can also be commanded based upon characteristics of the environment in which mobile machine 100 is operating that are sensed or otherwise detected by sensors 1310. Such as characteristics sensed or detected by perception systems 1342 on mobile machine 100 or vehicles 1370. For example, based on an upcoming shift in the topography, such as a rut, at the worksite, sensed by perception systems 1342, a route can be generated by control system 1304 to change the heading of mobile machine 100 to avoid the rut.

Propulsion subsystem 1318 is configured to propel mobile machine 100 over the worksite surface, such as by driving movement of ground engaging elements (e.g., wheels or tracks 144 or 244). It can include a power source, such as an internal combustion engine or other power source, a set of ground engaging elements, as well as other power train components. In one example, propulsion subsystem 1318 can adjust the speed of mobile machine 100 based on action signals generated by control system 1304, which can be based upon various characteristics sensed or detected by sensors 1310, an agricultural characteristic confidence output, such as an agricultural characteristic confidence map, generated by agricultural characteristic confidence system 1330, as well as various other bases, such as operator or user inputs. For example, based on a detected or identified change in crop characteristics, such as yield, crop height, crop volume, biomass, etc., a forward travel speed of mobile machine 100 can be adjusted, such as to control a federate of material through mobile machine 100.

Other subsystem(s) 1320 can include various other subsystems, such as a substance delivery subsystem on sprayer 202. The substance delivery subsystem can include one or more pumps, one or more substance tanks, flow paths (e.g., conduits), controllable valves (e.g., pulse width modulation valves, solenoid valves, etc.), one or more nozzles (e.g., nozzles 208), as well as various other items. The one or more pumps can be controllably operated to pump substance (e.g., herbicide, pesticide, insecticide, fertilizer, etc.) along a flow path defined by a conduit to nozzles 208 which can be mounted on and spaced along boom 210, as well as mounted at other locations within sprayer 202. In one example, a number of controllable valves can be placed along the flow path (e.g., a controllable valve associated with each of nozzles 208) that can be controlled between an on (e.g., open) and off (e.g., closed) position, to control the flow of substance through the valves (e.g., to control the flow rate).

The substance tanks can comprise multiple hoppers or tanks, each configured to separately contain a substance, which can be controllably and selectively pumped by the one or more pumps through the flow path to spray nozzles 208. The operating parameters of the one or more pumps can be controlled to adjust a pressure or a flow rate of the substance, as well as various other characteristics of the substance to be delivered to the worksite.

Nozzles 208 are configured to apply the substance to the worksite (e.g., field 206) such as by atomizing the substance. Nozzles 208 can be controllably operated, such as by action signals received from control system 1304 or manually by an operator 1364. For example, nozzles 208 can be controllably operated between on (e.g., open) and off (e.g., closed). Additionally, nozzles 208 can be individually operated to change a characteristic of the spray emitted by nozzles 208, such as a movement (e.g., a rotational movement) of nozzles 208 that widens or narrows the flow path through and out of nozzles 208 to affect the pattern, the volume, as well as various other characteristics, of the spray.

Control system 1304 is configured to receive or otherwise obtain various data and other inputs, such as sensor signals, user or operator inputs, data from data stores, and various other types of data or inputs. Based on the data and inputs, control system 1304 can make various determinations and generate various action signals.

Control system 1304 can include agricultural characteristic confidence system 1330. Agricultural characteristic confidence system 1330 can, based on information accessed within data stores (e.g., 1308, 1378, etc.) or data received from sensors (e.g., 1310, 1382, etc.), determine a confidence level in the agricultural characteristics of a worksite indicated by a prior agricultural characteristic map and generate various agricultural characteristic confidence outputs indicative of the determined agricultural characteristic confidence level. For example, agricultural characteristic confidence system 1330 can generate agricultural characteristic confidence outputs as representations indicative of the agricultural characteristic confidence level for the worksite or for various portions of the worksite. The representations indicative of agricultural characteristic confidence level for the worksite or various portions of the worksite can be qualitative or quantitative, and expressed in a variety of ways. The representations can be numeric, such as percentages (e.g., 0%-100%) or scalar values, gradation or scaled (e.g., A-F, "high, medium, low", 1-10, etc.), advisory (e.g., caution, proceed, slow, scout first, no crop, etc.), as well as various other representations. Additionally, agricultural characteristic confidence system 1330 can generate, as an agricultural characteristic confidence output, an agricultural characteristic confidence map that indicates the agricultural characteristic confidence level for the worksite or for particular portions (e.g., locations) of the worksite.

The agricultural characteristic confidence outputs can be used by control system 1304 to generate a variety of action signals to control an action of mobile machine 100 as well as other components of computing architecture 1300, such as vehicles 1370, remote computing systems 1368, etc. For example, based on the agricultural characteristic confidence output, control system 1304 can generate an action signal to provide an indication (e.g., alert, display, notification, recommendation, etc.) on a variety of interfaces or interface mechanisms, such operator interfaces 1360 or user interfaces 1364. The indication can include an audio, visual, or haptic output. In another example, based on the agricultural characteristic confidence output, control system 1304 can generate an action signal to control an action of one or more of the various components of computing architecture 1300, such as operating parameters of one or more of controllable subsystems 1302 or controllable subsystems 1380. For instance, based on the agricultural characteristic confidence output, control system 1304 can generate an action signal to control position subsystem(s) 1314 to control a position (e.g., height, orientation, tilt, etc.) of header 104 or boom 210. Control system 1304 can also control steering subsystem 1316 to control a heading of mobile machine 100, and propulsion subsystem 1318 to control a speed of mobile machine 100. Control system 1304 can also control various other subsystems, such as a substance delivery subsystem to control the delivery of substance to the worksite. These are examples only. Control system 1304 can generate any number of action signals based on an agricultural characteristic confidence output generated by agricultural characteristic confidence system 1330 to control any number of actions of the components in computing architecture 1300.

Control system 1304 can include various other items 1334, such as other controllers. For example, control system 1304 can include a dedicated controller corresponding to each one of the various controllable subsystems. Such dedicated controllers may include a spraying subsystem controller, a boom position subsystem controller, a steering subsystem controller, a propulsion subsystem controller, as well as various other controllers for various other controllable subsystems. Additionally, control system 304 can include various logic components, for example, sensor signal processing logic, such as image processing logic. Image processing logic can process images generated by sensors 1310 (e.g., images generated by perception systems 342), to extract data from the images. Image processing logic can utilize a variety of image processing techniques or methods, such as RGB, edge detection, black/white analysis, machine learning, neural networks, pixel testing, pixel clustering, shape detection, as well any number of other suitable image processing and data extraction techniques and/or methods. Further, sensor processing logic can include sensor signal filtering, sensor signal categorization, aggregation, as well as a variety of other processing.

FIG. 3 also shows that data stores 1308 can include map data 1336, supplemental data 1338, as well as various other data 1340. Map data 1336 can include one or more agricultural characteristic maps of a worksite that indicate agricultural characteristics (e.g., crop characteristics, such as yield, crop height, crop volume, or biomass, nutrient characteristics, such as plaint available nitrogen, compaction characteristics and/or traffic ability characteristics, soil characteristics, such as soil type and/or soil moisture, as well as any other agricultural characteristic) at geographic locations of the worksite. The agricultural characteristic maps can include georeferenced data represented in various ways, such as geotagged data, rasters, polygons, point clouds, as well in various other ways. The map can be generated based on outputs from sensors, such as imaging sensors (e.g., stereo, lidar, etc.) during a survey or fly-over of the worksite as well from previous passes or operations of a mobile machine on the worksite. These agricultural characteristic maps may be generated (particularly when based on overhead imaging) on the basis of data that is collected during a bare field condition when the field surface has substantially no obscurity due to vegetation, such as during post-harvest, prior to planting, right after planting, etc. The agricultural characteristic maps can be used in the control of mobile machine 100 as it travels over the worksite, or, as will be described further below, as a baseline.

Supplemental data 1338 can include a variety of data indicative of various characteristics relative to the worksite or relative to the environment of the worksite that is obtained or collected at a time later than the time the data for the prior agricultural characteristic map was collected. In one example, supplemental data 1338 includes any of a variety of data that can indicate a characteristic or condition that can affect the agricultural characteristics of the worksite. This can include data obtained or collected prior to mobile machine 100 operating on the worksite as well as in-situ data (e.g., from sensors 1310 or 1382). Supplemental data can include weather data (e.g., rain, snow, ice, hail, wind, as well as weather events such as tornadoes, hurricanes, storms, tsunamis, etc.), environmental data (e.g., waves and tides), event data (e.g., fires, volcanoes, floods, earthquakes, etc.), topographic data (e.g., generated by sensors on a machine traveling over the worksite such as a survey, fly over, additional operation, etc.), vegetation data (e.g., images of the vegetation, crop type, crop height, crop density, yield, biomass, crop volume, weed type, weed density, weed height, Vegetation Index data, such as NDVI and/or LAI data, vegetation state data, etc.), activity data (e.g., data that indicates that human activity occurred on the worksite, such as operations of other machines, etc.), additional images of the worksite, as well as various other supplemental data. Supplemental data can be obtained from various sources, such as machines doing surveys or flyovers of the worksite, various other sensors, weather stations, news sources, operator or user inputs, human surveys of the worksite, as well as a variety of other sources. Supplemental data can also be obtained or collected by and received from sensors mobile machine 100 or sensors on vehicles 1370 during operation (e.g., in-situ) or prior to operation.

The supplemental data can be indicative of a variety of characteristics relative to the worksite or the environment of the worksite. Based on the supplemental data, agricultural characteristic confidence system 1330 can determine a confidence in the agricultural characteristics of the worksite indicated by a prior agricultural characteristic map. In one example, agricultural characteristic confidence system 1330 can determine whether a change to the agricultural characteristics of the worksite has occurred or has likely occurred based on the indications provided by the supplemental data. For example, if certain weather conditions have occurred (e.g., certain levels of rainfall) after the data for the prior agricultural characteristic map was collected, agricultural characteristic confidence system 1330 can determine that the agricultural characteristic at the worksite, or the agricultural characteristic at particular geographic locations within the worksite, has changed or has likely changed. For example, based on low levels of rainfall (e.g., drought conditions) occurring after the data for a yield map was collected (e.g., NDVI and/or LAI data during vegetative stage), agricultural characteristic confidence system 1330 can determine that the yield levels indicated by the yield map have or have likely changed. This is merely an example. Agricultural characteristic confidence system 1330 can determine a confidence in the agricultural characteristics of the worksite or of particular geographic locations within the worksite based on any number of indications provided by supplemental data, and any combinations thereof. Further, it will be noted that the term likely means, in one example, a threshold likelihood or probability that a current agricultural characteristic level deviates by a threshold amount from characteristics indicated by the prior agricultural characteristic map. In one example, the threshold can be input by an operator or user or set automatically by agricultural characteristic confidence system 1330 indicating a level of deviation from the characteristics indicated by the prior agricultural characteristic map.

Other data 1340 can include a variety of other data, such as historical data relative to operations on the worksite, historical data relative to characteristics and conditions of the worksite (e.g., historical agricultural characteristics) or the environment of the worksite (e.g., historical data relative to prior events), as well as historical data indicative of the occurrence of agricultural characteristic changes to the worksite due to various events (e.g., weather). This type of information can be used by agricultural characteristic confidence system 1330 to determine a likelihood of a change in agricultural characteristics occurring or having occurred presently.

Figure 4:
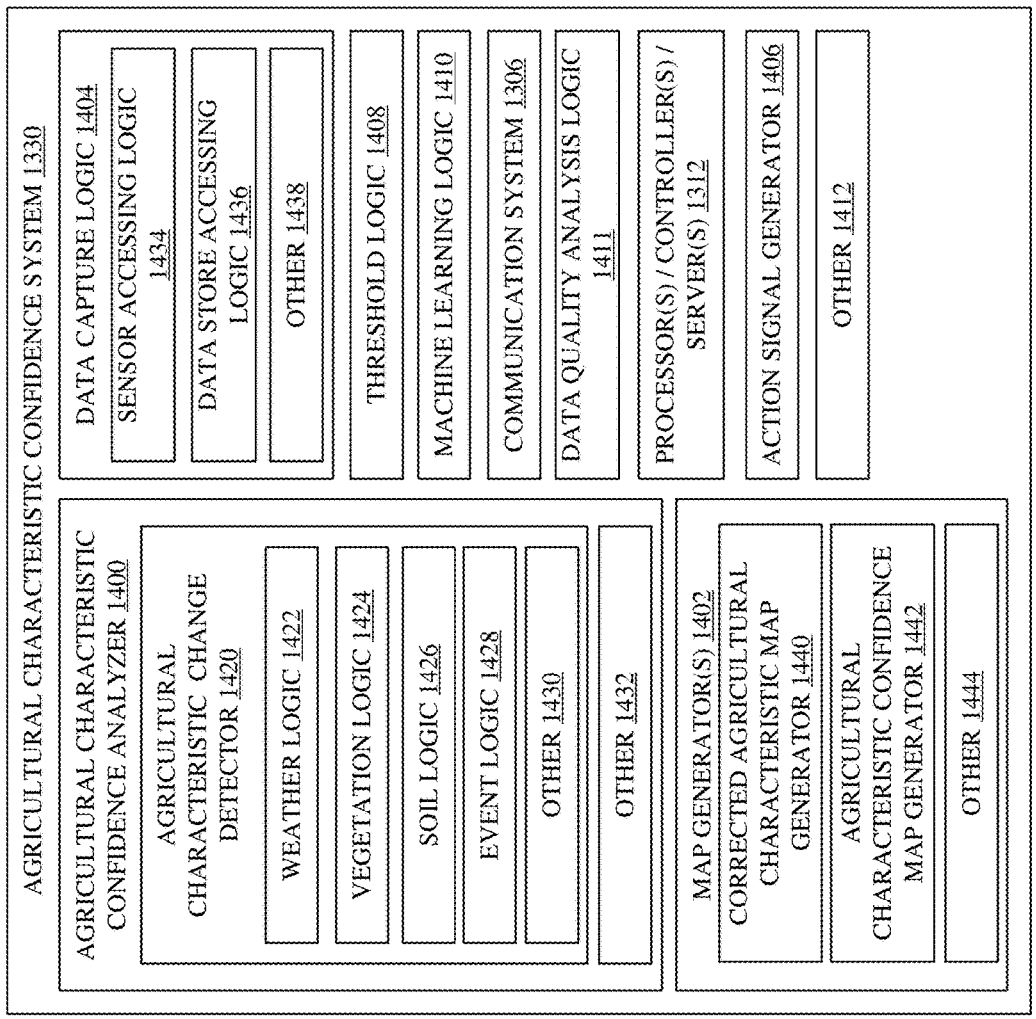
FIG. 4 is a block diagram of one example of an agricultural characteristic confidence system, in more detail.

FIG. 4 is a block diagram illustrating one example of agricultural characteristic confidence system 1330 in more detail. Agricultural characteristic confidence system 1330 can include communication system 1306, one or more processors, controllers, or servers 1312, agricultural characteristic confidence analyzer 1400, map generator(s) 1402, data capture logic 1404, action signal generator 1406, threshold logic 1408, machine-learning logic 1410, data quality analysis logic 1411, and can include other items 1412 as well. Agricultural characteristic confidence analyzer 1400, itself, can include agricultural characteristic change detector 1420 and it can include other items 1432 as well. Map generator(s) 1402, itself, can include corrected agricultural characteristic map generator 1440, agricultural characteristic confidence map generator 1442, and can include other items 1444 as well. Data capture logic 1404, itself, can include sensor accessing logic 1434, data store accessing logic 1436, and it can include other items 1438 as well.

In operation, agricultural characteristic confidence system 1330 determines a confidence level in the agricultural characteristics relative to a worksite as indicated by a prior agricultural characteristic map of the worksite, based on, among other things, available supplemental data relative to the worksite or the environment of the worksite. Agricultural characteristic confidence system 1330 can generate a variety of agricultural characteristic confidence outputs, such as various representations of the agricultural characteristic confidence level, a corrected agricultural characteristic map, or an agricultural characteristic confidence map, as well as various other outputs. Agricultural characteristic confidence system 1330 can generate action signals to control the operation of various components of computing architecture 1300 (e.g., mobile machine 100, vehicles 1370, remote computing systems 1368, etc.), as well as to control the operation of various components or items of the components of computing architecture 1300, such as controllable subsystems 1302 of mobile machine 100. Further, agricultural characteristic confidence system 1330 can generate action signals to provide indications such as displays, recommendations, alerts, notifications, as well as various other indications on an interface or interface mechanism, such as on operator interfaces 1360 or user interfaces 1364. The indications can include audio, visual or haptic outputs.

The agricultural characteristic confidence level can be indicative of a confidence that the agricultural characteristics of the worksite are the same (or substantially the same) or are otherwise accurately or reliably represented by the agricultural characteristics in the prior agricultural characteristic map of the worksite. In some examples, the agricultural characteristic confidence level can indicate a likelihood that the agricultural characteristics of the worksite, as indicated by the prior agricultural characteristic map, have changed, or the agricultural characteristic confidence level can indicate a likelihood that the agricultural characteristics of the worksite, as indicated by the prior agricultural characteristic map, are the same (or substantially the same) or are otherwise accurately or reliably represented by the prior agricultural characteristic map of the worksite. In some examples, a representation of the agricultural characteristic confidence level can indicate both the likelihood that the agricultural characteristics of the worksite, as indicated by the prior agricultural characteristic map, are the same (or substantially the same) or are otherwise accurately or reliably represented by the agricultural characteristics in the prior agricultural characteristic map, and a likelihood that the agricultural characteristics, as indicated by the prior agricultural characteristic map, have changed. For instance, a representation in the form of a percentage, such as "80%" can indicate an 80% likelihood that the agricultural characteristics of the worksite are the same (or substantially the same) or are otherwise accurately or reliably represented by the prior agricultural characteristic map, and therefore the representation simultaneously indicates a 20% likelihood that the agricultural characteristics of the worksite have changed. This is merely an example.

Data capture logic 1404 captures or obtains data that can be used by other items in agricultural characteristic confidence system 1330. Data capture logic 1404 can include sensor accessing logic 1434, data store accessing logic 1436, and other logic 1438. Sensor accessing logic 1434 can be used by agricultural characteristic confidence system 1330 to obtain or otherwise access sensor data (or values indicative of the sensed variables/characteristics) provided from sensors 1310, as well as other sensors such as sensors 1382 of vehicles 1370, that can be used to determine an agricultural characteristic confidence level. For illustration, but not by limitation, sensor accessing logic 1434 can obtain sensor signals indicative of characteristics relative to an agricultural characteristic of the worksite at which mobile machine 100 or vehicles 1370 are operating. Such characteristics may be indicative of a change in the agricultural characteristics of the worksite such as crop characteristics, soil characteristics, nutrient characteristics, as well as various other characteristics.

Additionally, data store accessing logic 1436 can be used to obtain or otherwise access data previously stored on data stores 1308 or 1378, or data stored at remote computing systems 1368. For example, this can include map data 1336, supplement data 1338, as well as a variety of other data 1340. For illustration, but not by limitation, data store accessing logic 1436 can obtain data indicative of characteristics relative to an agricultural characteristic of the worksite at which mobile machine 100 or vehicles 1370 are operating. Such characteristics may be indicative of a change in the agricultural characteristics of the worksite such as weather data, event data, activity data, environmental data, as well as various other data.

Upon obtaining various data, agricultural characteristic confidence analyzer 1400 analyzes the data to determine a confidence level in the agricultural characteristics indicated or otherwise provided by a prior agricultural characteristic map. The analysis can include, in one example, a comparison of the characteristics on the prior agricultural characteristic map to the obtained data, such as supplemental data 1338. Agricultural characteristic confidence analyzer 1400 can include agricultural characteristic change detector 1420, and it can include other items 1432. Agricultural characteristic change detector 420, itself, can include weather logic 1422, vegetation logic 1424, soil logic 1426, event logic 1428, and various other logic 1430 as well.

Based upon the agricultural characteristic confidence level, agricultural characteristic confidence system 1330 can use action signal generator 1406 to generate a variety of action signals to control the operation of the components of computing architecture 1300 (e.g., mobile machine 100, remote computing systems 1368, vehicles 1370) or to provide indications, such as displays, recommendations, or other indications (e.g., alerts) on an interface or interface mechanisms. The indications can include audio, visual, or haptic outputs. For instance, based on the agricultural characteristic confidence level, agricultural characteristic confidence system 1330 can generate an action signal to control the position of various components of mobile machine 100 (e.g., position of header 104, position of boom 210, etc.), to control the travel speed of mobile machine 100, to control the heading or route of mobile machine, and/or to control various other operating parameters of mobile machine 100. In another example, based on the agricultural characteristic confidence level, a display, recommendation, and/or other indication can be generated and surfaced to an operator 1362 on an operator interface 1360 or to a remote user 1366 on a user interface 1364, or both. Based on the generated displays, operators 1 362 or remote users 1366 can manually (e.g., via an input on an interface) adjust the settings or operation of a component of computing architecture 1300. These are merely examples, and agricultural characteristic confidence system 1330 can generate any number of action signals used to control any number of machine settings or operations of any number of machines or to generate any number of displays, recommendations, or other indications.

It will be noted that agricultural characteristic confidence analyzer 1400 can implement or otherwise utilize a variety of techniques, such as various image processing techniques, statistical analysis techniques, various models (e.g., soil model, soil erosion model, vegetation model, such as a crop model, as well as various other models), numeric equations, neural networks, machine learning, knowledge systems (e.g., expert knowledge systems, operator or user knowledge systems, etc.), fuzzy logic, rule-based systems, as well as various other techniques and any combinations thereof.

Agricultural characteristic change detector 1420 detects change (e.g., deviation) or a likelihood of change to the characteristics of the worksite from the characteristics indicated by the prior agricultural characteristic map. In some examples, detecting a change comprises detecting a change or a likely change in the agricultural characteristics of the worksite, not indicated by the prior agricultural characteristic map. In other examples, detecting a change comprises detecting a characteristic of the worksite or a characteristic of the environment of the worksite that is indicative of a likely change to the agricultural characteristics of the worksite. For instance, the detection of weather conditions (e.g., heavy or light rain, drought conditions, heavy or low wind, as well as a variety of other weather conditions) or weather events (e.g., flood), that indicate a likely change to the agricultural characteristics of the worksite. In another example, the detection of characteristics of the worksite (e.g., crop state, such as downed crop, growing conditions, as well as a variety of other characteristics), that indicate a likely change to the agricultural characteristics of the worksite. It will be noted that while a single characteristic can indicate a change or a likely change in the agricultural characteristics of the worksite, it can also be that a variety of characteristics form the basis for the detection or determination that a change or likely change has occurred. For example, such characteristics can include a consideration of the weather conditions (e.g., precipitation level), the soil characteristics of the worksite or of a particular area of the worksite, and the previously known slope and/or elevation of the worksite or particular area of the worksite.

Weather logic 1422 is configured to analyze weather data accessed from data stores, received from sensors, such as weather sensors 1350, or operator or user inputs, or other sources such as remote weather services or stations. Weather logic 1422 determines if a change in the agricultural characteristics of the worksite (as indicated by the prior agricultural characteristic map) has changed or is likely to have changed. For instance, weather logic 1422 can receive various data indicative of weather conditions that occurred in the time after the data was collected for the prior map, such as precipitation types and levels (e.g., hail, rain, snow, various other precipitation), temperature, humidity, wind speeds and direction, and various other weather conditions. As an example, assume that weather logic 1422 receives weather data that indicates that the worksite received no rainfall over a certain time period (e.g., during the reproductive phase of the crop). Weather logic 1422 can determine that a change in the agricultural characteristics (e.g., yield, biomass, crop height, etc.) of the worksite or of particular geographic locations within the worksite has occurred or has likely occurred or that the agricultural characteristics indicated (e.g., estimated, predicted, etc.) by the prior map are not accurate. This determination can be based solely on the weather data, or it can be based on a combination of the weather data and other characteristics of the worksite or the environment such as crop type, crop genetics (e.g., crop hybrid), crop row direction or orientation, crop location, soil characteristics, topographic characteristics, tillage history, as well as various other characteristics.

In another example, weather logic 1422 can receive or otherwise obtain various data indicative of weather events that occurred in the time after the data for the prior map was collected, such as storms, tornadoes, hurricanes, tsunamis, floods, high winds, as well as various other weather events. For example, weather logic 1422 can receive weather data that indicates that the worksite flooded and can determine that a change in the agricultural characteristics of the worksite or of particular geographic locations within the worksite has occurred or has likely occurred. Weather logic 1422 can make these determinations based on various models, such as weather models, river gage readings, as well as various other models.

Vegetation logic 1424 is configured to analyze vegetation data which may be accessed from data stores, received from sensors, such as imaging sensors that image the worksite during an aerial survey (e.g., satellite, drone, fly-over, etc.), as well as various other sources of vegetation data. Vegetation logic 1424 determines whether a change in the agricultural characteristics of the field from that indicated by the prior agricultural characteristic map has occurred or is likely to have occurred. For instance, vegetation logic 1424 can receive various data indicative of vegetation characteristics or conditions that occurred or otherwise presented in the time after the data for the prior map was collected. This data can include crop state data (e.g., data indicating crop health, growth, standing, blown over, down crop, down crop direction, as well as various other crop state data), vegetation type (e.g., crop genotype, crop type, weed type, cultivar or hybrid, etc.), crop stage, crop stress, crop density, crop height, vegetation index data, such as NDVI data or LAI data, as well as various other vegetation data. For example, vegetation logic 1424 can receive vegetation data (e.g., LAI, NDVI, etc.) that indicates that the vegetation is less vigorous than an expected level at the worksite or at particular geographic locations of the worksite and can determine that a change in the agricultural characteristics of the worksite or of particular geographic locations within the worksite has occurred or has likely occurred. For instance, less vigorous vegetation growth or density, as well as vegetation state data that indicates less healthy vegetation, can be an indicator of a change in a nutrient characteristic of the worksite, such as an insufficient level of plant nutrients, for example, plant available nitrogen. This determination can be based solely on the vegetation data, or it can be based on a combination of the vegetation data and other characteristics of the worksite or the environment of the worksite. For example, based on the vegetation data (e.g., growth, health, crop state, etc.) and weather data (e.g., heavy level of rainfall during early growing season), vegetation logic 1424 can determine that a change in the nutrient levels likely occurred at the worksite or at a particular geographic location within the worksite, for example, due to heavy rainfall after a nutrient application operation which caused the nutrients to not be retained on the field (e.g., were washed away).

In another example, vegetation logic 1424 can receive vegetation data that indicates that crop on the field is a particular genotype (e.g., drought resistant, drought susceptible, etc.). The crop genotype data in combination with, for instance, weather data that indicates drought conditions (e.g., low levels of precipitation, high winds, high temperature, heavy sunlight, etc.) at the field can be used to determine that the agricultural characteristics (e.g., yield, biomass, crop height, etc.) as indicated by the agricultural characteristic map have change or have likely changed. For instance, a drought susceptible crop may have reduced growth, health, and/or yield due to drought conditions and thus drought conditions experienced at the field after the data for the prior agricultural characteristic map was collected may cause the indications of the prior agricultural characteristic map to be inaccurate or unreliable. These determinations can be based solely on the vegetation data, or it can be based on a combination of the vegetation data and other characteristics of the field. Additionally, vegetation logic 1424 can make these determinations based on various models, such as a crop model, as well as various other models.

Soil logic 1426 is configured to analyze soil data accessed from data stores, received from sensors such as soil characteristic sensors, or received from operator or user inputs, as well as various other sources of soil data. Soil logic 1426 can determine whether a change in the agricultural characteristics of the worksite from that indicated by the prior agricultural characteristic map has occurred or is likely to have occurred. For instance, soil logic 1426 can receive various data indicative of soil characteristics that presented in the time after the data for the prior map was collected, such as soil type, soil structure, soil surface features (e.g., rills, gullies, washouts, erosion, deposits, etc.), soil moisture, soil composition, soil cover (e.g., residue level, such as crop residue) as well as various other soil characteristics. For example, soil logic 1426 can receive soil data that indicates that the soil at the worksite or at particular geographic locations within the worksite is at a certain level of moisture and based on the moisture level soil logic 1426 may determine that it is more or less likely that the compaction susceptibility and/or the trafficability has changed.

In other examples, this determination can be based solely on the soil data or on a combination of soil data and other characteristics of the worksite or the environment of the worksite. For example, the field can be more or less susceptible to compaction and/or more or less trafficable based on the type of soil (e.g., loose topsoil, clay base, sandy, etc.), how much wind or rain the worksite has experienced, the amount of sunlight exposed to the field, as well as the amount of crop residue left on the worksite (e.g., from a previous harvest) to absorb the moisture or provide cover from the wind. Soil logic 1426 can determine that a change in the agricultural characteristics of the worksite or of particular geographic locations in the worksite has occurred or has likely occurred based on the soil data (e.g., soil type, soil moisture, soil temperature, as well as various other soil data), weather data (e.g., temperature, level of rainfall, wind, sunshine, weather events, as well as various other weather data), as well as vegetation data (e.g., level of crop residue coverage on the worksite) as well as various other data. Additionally, soil logic 1426 can make these determinations based on a variety of models, such a soil erosion models, sediment transport models, water runoff models, geomorphological models, as well as various other models.

Event logic 1428 is configured to analyze event data accessed from data stores, received from sensors, received from operator or user inputs, as well as various other sources of event data, such as news sources. Event logic 1428 can determine whether a change in the agricultural characteristics of the worksite from that indicated by the prior agricultural characteristic map has occurred or is likely to have occurred. For instance, event logic 1428 can receive various data indicative of events that occurred in the time after the data for the prior map was collected, such as, event data indicative of the occurrence of natural events (e.g., volcanoes, fires, earthquakes, as well as various other natural events) as well as event data indicative of human activity, as well as various other event data. As an example, event logic 1428 can receive event data that indicates that a fire or a volcano eruption occurred near (or near enough) to the worksite such that ash from fire(s) or volcano(es) or other sediment deposit may have occurred and can determine that a change in the agricultural characteristics of the worksite or of particular geographic locations within the worksite has occurred or has likely occurred. This determination can be based solely on the event data, or it can be based on a combination of the event data and other characteristics of the worksite or the environment of the worksite. For example, event logic 1428 can determine that sediment deposit has occurred or has likely occurred at the worksite or at a particular geographic location within the worksite based on the event data indicating the occurrence of a fire or a volcano eruption and weather characteristics (e.g., wind speed and direction during time of fire or volcano eruption).

In another example, event logic 1428 can receive various event data indicative of the occurrence of non-natural activities occurring at the worksite in the time after the data for the prior map was collected, such as event data that indicates that another operation occurred (e.g., agricultural planting operation, agricultural spraying operation, agricultural tillage operation, agricultural irrigation operation, etc.) or event data that indicates the occurrence of an event during another operation (such as a machine getting stuck at a location in the field). and can determine that a change in the agricultural characteristics has occurred or has likely occurred. For instance, event logic 1428 can receive event data indicative of a spraying operation occurring at the worksite after the data for the prior map was collected and before the harvesting operation is to be performed and determine that a change in the agricultural characteristics at the worksite or at particular geographic locations within the worksite has occurred or has likely occurred. In other examples, event logic 1428 can receive event data indicative of a tillage operation occurring at the worksite after the data for the prior map was collected and before the spraying operation is to be performed and determine that a change in the agricultural characteristics at the worksite or at particular geographic locations within the worksite has occurred or has likely occurred, such as a ridge tilling operation creating tilled ridges. In another example, event logic 1428 can receive event data indicative of an irrigation operation occurring at the worksite after the data for the prior map was collected and before the harvesting operation is to be performed and determine that a change in the agricultural characteristics at the worksite or at particular geographic locations within the worksite has occurred or has likely occurred, such as increased biomass due to the irrigation operation. Event logic 1428 can, in making such a determination, also consider various other data, such as weather data, to determine the likelihood of a change in the agricultural characteristics of the field, such as the occurrence of high wind, high sunlight, high temperatures, etc., that would cause the moisture applied by the irrigation operation to not be retained on the field. These are merely examples. Additionally, event logic 1428 can make these determinations using various models, such as sediment drift or deposit models, ash drift models, earthquake models, weather models, as well as various other models.

Other logic 1430 can include various other logic configured to analyze a variety of other data (e.g., accessed from data store(s), received from sensor(s), operator/user inputs, as well as various other sources of data) and determine if a change in the agricultural characteristics of the worksite (as indicated by the prior agricultural characteristic map) has occurred or is likely to have occurred.

It will be noted that these are merely some examples of the logic and the operations of the logic that can be included as part of agricultural characteristic confidence system(s).

It will be understood that the determination(s) that a change in the agricultural characteristics of a worksite of particular geographic locations within the worksite has occurred or has likely occurred can be based on a single type of data or on a combination of data, as well on a single characteristic or on a combination of various characteristics. In some examples, the number of indications can affect the agricultural characteristic confidence level. For instance, the presence of a single characteristic (e.g., low rainfall) can indicate that a change has occurred or has likely occurred, however the presence of multiple characteristics can indicate that a change has occurred or has likely occurred to a greater or lesser degree. For example, while an indication that high winds have occurred can indicate a change in an agricultural characteristic, such as yield, biomass, crop height, etc., high wind combined with, for instance, data that indicates certain crops on the field are located at higher elevations, oriented in a certain direction relative to the wind direction, and/or that the crop type or crop genotype is particularly susceptible to high winds, can affect the confidence value in the agricultural characteristics of that particular location (as indicated by the prior agricultural characteristic map) to a greater degree. For example, it can lead to determination that the crop growth has been affected or that crop blowdown has occurred to a relatively high degree of likelihood, and thus the resultant yield, biomass, crop height, etc. will be changed as compared to the yield, biomass, crop height, etc. as indicated by the prior map. Similarly, an indication that the field has experienced high wind, without accompanying indication(s) with regard to the elevation of the crop, the orientation of the crop, and/or the crop type or crop genotype, can affect the confidence value to a lesser degree. For example, it can lead to a determination that a change to the yield, biomass, crop height, etc. may have occurred with a relatively lower degree of likelihood. These are merely examples.

Map generator(s) 1402 are configured to generate a variety of maps based on the prior agricultural characteristic map(s) and the supplemental data. In some examples, the supplemental data provides an indication of a detected change in the agricultural characteristics of the worksite. In such a case, corrected agricultural characteristic map generator 1440 can incorporate the detected change to the agricultural characteristics as indicated by the supplemental data with the prior agricultural characteristic map to generate a corrected agricultural characteristic map. For example, in some instances, characteristics of the worksite may be detectable by or visible to various sensor(s) used to generate supplemental data such that a change in the agricultural characteristics of the worksite (as indicated by the prior map) can be determined with a degree of certainty. For instance, the occurrence of a change to crop state, such as the crop being blown down, may be clearly detectable such that it can be detected. In such a case, the corrected agricultural characteristic map (e.g., corrected crop height map) generated by corrected agricultural characteristic map generator 1440 will reflect the change in the crop height of the crop at the worksite.

In some examples, the supplemental data provides an indication of a characteristic or a condition at the worksite or the environment of the worksite that can indicate that a change in the agricultural characteristic(s) of the worksite has likely occurred but cannot be confirmed with a level of certainty by the system(s) (e.g., sensor(s)) or humans collecting or otherwise inputting the data). This can be the case, for example, when a characteristic of the worksite is not visible due to vegetation coverage or due to various other obscurants. In such examples, agricultural characteristic confidence map generator 1442 can generate an agricultural characteristic confidence map that indicates, among other things, the agricultural characteristic confidence value at the worksite or at particular geographic locations within the worksite. The agricultural characteristic confidence map (some examples of which are provided below) can be generated as an interactive map layer on an interactive map such that the user or operator is able to manipulate the functionality of the map layer or the map. For instance, the user or operator may be able to switch the display between the agricultural characteristic confidence map and the prior agricultural characteristic map, or to generate a split-screen with one part showing the prior agricultural characteristic map and another part showing the agricultural characteristic confidence map. Additionally, the user or operator can manipulate the display of the confidence value representation for the worksite or for particular geographic locations of the worksite, such as by changing the representation of the confidence value, or by displaying both the representation of the confidence value and the corresponding agricultural characteristic (or value thereof) as indicated by the prior agricultural characteristic map. Additionally, the map display may further include an indication of the location of mobile machine 100 on the worksite as represented by the map. These are merely examples.

It will also be understood that map generator(s) 1402 can, in some examples, generate a map that includes corrected agricultural characteristics and agricultural characteristic confidence levels. For example, for the areas of the worksite where the agricultural characteristics can be detected with a degree of certainty (e.g., the characteristic of the worksite is actually visible or otherwise detectable), corrected or updated agricultural characteristics can be provided, and for the areas of the worksite where the agricultural characteristics cannot be detected with a degree of certainty (e.g., the characteristic of the worksite is not visible) an agricultural characteristic confidence level for those areas can be provided. In this way, the map can be a mix of corrected agricultural characteristics and agricultural characteristic confidence levels. Additionally, a map can be generated that has a combination of the agricultural characteristics as indicated by the prior map, corrected agricultural characteristics, and agricultural characteristic confidence levels.

As illustrated in FIG. 4, agricultural characteristic confidence system 1330 can include action signal generator 1406. Action signal generator 1406 can generate a variety of action signals, used to control an action of components of computing architecture 1300. For instance, action signal(s) can be used to control an operation of mobile machine 100, such as raising or lowering header 104, raising or lowering boom 210, adjusting a speed of mobile machine 100, adjusting a heading of mobile machine 100, adjusting the operation of spraying subsystem, as well as controlling and/or adjusting a variety of other operations or machine settings. In another example, action signal(s) are used to provide displays, recommendations, and/or other indications (e.g., alerts) on an interface or interface mechanism, such as to an operator 1362 on an operator interface 1360 or to a remote user 1366 on a user interface 1364. The indications can include audio, visual, or haptic outputs. The indication can be indicative of the agricultural characteristic confidence value or representation of the agricultural characteristic confidence value, a corrected agricultural characteristic map, an agricultural characteristic confidence map, as well as a variety of other displays. Additionally, action signal generator 1406 can generate action signals to control the operation of vehicles 1370 to, for instance, travel to locations on the worksite to further scout the locations to collect additional data. Similarly, action signals can be generated to recommend to the operator or user to send out a human scout to locations of the worksite to further scout the locations to collect additional data. In other examples, action signal generator 1406 can generate action signals to direct (such as by providing an indication on an interface mechanism) a human to drive, ride, or walk to an area to scout the area to collect additional data. This may include visually scouting the area or the assistance of various sensing devices (such as handheld devices) operated by the human or included on a vehicle operated by a human. The direction may be given by at least one of audio, visual, or haptic guidance. These are merely examples. Agricultural characteristic confidence system 1330 can generate any number of a variety of action signal(s) used to control any number of actions of any number of components of computing architecture 1300.

Threshold logic 1408 is configured to compare various characteristics of the worksite to a variety of thresholds. The thresholds can be automatically generated by system 1330 (such as by machine learning logic 1410), input by an operator or a user, or generated in various other ways. For example, thresholds may be used to determine a level of deviation from an expected value, or a level of deviation from the surrounding areas of the worksite to determine areas of the worksite that may have agricultural characteristic changes. For instance, if the growth of crops (as measured by vegetative index data) at a particular geographic location within the worksite deviates by a threshold amount from an expected level of crop growth or as compared to crops in the surrounding areas of the worksite, then agricultural characteristic confidence system 1330 can be controlled to generate an agricultural characteristic confidence value for the worksite or the particular geographic location within the worksite, indicating that an agricultural characteristic (e.g., topography, soil characteristics, such as soil moisture, nutrient levels, as well as various other agricultural characteristics) change may be likely or may have occurred.

Additionally, threshold logic 1408 is configured to compare the various agricultural characteristic confidence values to a variety of thresholds. The thresholds can be automatically generated by system 1330 (such as by machine learning logic 1410), input by an operator or a user, as well generated in various other ways. The thresholds can be used to determine how much the agricultural characteristics of the worksite (as indicated by supplemental data and the corresponding agricultural characteristic confidence level) can deviate from the agricultural characteristics indicated by the prior agricultural characteristic map before a control of the machine(s) and/or adjustment of the operating parameters of the machine(s) in undertaken, or before a display, recommendation, or other indication (e.g., alert) is provided on an interface or interface mechanism. The indication can include audio, visual, or haptic outputs. For instance, an operator or a user can input a threshold of 95% agricultural characteristic confidence level, such that, only when the agricultural characteristic confidence level is below 95% will some action signal be generated. Additionally, the threshold may be used in the assignment of representations of the confidence value. For instance, in the example of "high, medium, and low" as representations of the agricultural characteristic confidence level, a threshold may indicate a range of agricultural characteristic confidence levels to assign to each representation. For example, 90%-99% may be represented as "high", 70%-89% may be represented as "medium", and anything below 70% may be represented as "low." These are merely examples.

FIG. 4 also shows that agricultural characteristic confidence system 1330 can include machine learning logic 1410. Machine learning logic 1410 can include a machine learning model that can include machine learning algorithm(s), such as, but not limited to, memory networks, Bayes systems, decision tress, Eigenvectors, Eigenvalues and Machine Learning, Evolutionary and Genetic Algorithms, Expert Systems/Rules, Engines/Symbolic Reasoning, Generative Adversarial Networks (GANs), Graph Analytics and ML, Linear Regression, Logistic Regression, LSTMs and Recurrent Neural Networks (RNNSs), Convolutional Neural Networks (CNNs), MCMC, Random Forests, Reinforcement Learning or Reward-based machine learning, and the like.

Machine learning logic 1410 can improve the determination of agricultural characteristic confidence levels by improving the algorithmic process for the determination, such as by improving the recognition of characteristics and conditions of the worksite or the environment of the worksite that indicate modifications to the agricultural characteristics of the worksite. For example, machine learning logic 1410 can learn relationships between characteristics, factors, and/or conditions that affect the agricultural characteristics of the worksite. Machine learning logic 1410 can also utilize a closed-loop style learning algorithm such as one or more forms of supervised machine learning.

As illustrated in FIG. 4, agricultural characteristic confidence system 1330 can include data quality analysis logic 1411. In determining a confidence level in the agricultural characteristics of a worksite as indicated by a prior agricultural characteristic map, agricultural characteristic confidence system 1330 can utilize data quality outputs generated by data quality analysis logic 1411. Data quality analysis logic 1411 can identify or determine a quality of data, for instance data used to generate a prior agricultural characteristic and/or supplemental data. In determining the confidence in agricultural characteristics indicated by a prior agricultural characteristic map, agricultural characteristic confidence system 1330 can take into account the quality of the data used to generate the prior agricultural characteristic map as determined or identified by data quality analysis logic 1411. Data quality analysis logic 1411 can utilize various data (e.g., metadata) that indicates conditions and/or characteristic under which the data for the prior map was collected. For example, the time at which the data was collected, the sensor(s), the sensor capabilities and settings, environmental conditions (e.g., weather, meteorological conditions, obscurants, etc.), field conditions (e.g., bare field condition, etc.), as well as a variety of other data.

In a particular example, a prior agricultural characteristic map may be generated based upon vegetative index data (e.g., NDVI, LAI, etc.). The timing of the collection of the vegetative index data can be determinative of the quality and/or reliability of the resulting agricultural characteristic map (e.g., yield map, etc.). For instance, NDVI data collected at an early point in the growing season, may not be as useful because there may be too little plant growth captured in the imagery. Similarly, in later parts of the seasons, such as when the plants are fully grown, the NDVI data may not be as useful because the peak vegetative growth can result in saturated imagery (e.g., the plant spectral response saturates). Whereas, at various other points in the growing season, the NDVI data may be more useful as the plants on the field may have experienced adequate growth and the data may provide good distribution of vegetative index values (e.g., not as much saturation). This is merely an example. In other examples, data quality analysis logic 1411 can consider the resolution of imagery, clarity of imagery, the presence of obscurants (e.g., weather conditions, meteorological conditions, field conditions, etc.). For instance, depending on the agricultural characteristic of interest, bare field conditions may provide for higher quality data, such that data collected when the field is bare is considered higher quality than data collected when the field has plant growth.

Based on the data quality output indicating a quality of the data for the generation of the prior agricultural characteristic map, agricultural characteristic confidence system 1330 may determine a confidence in the agricultural characteristics indicated by the prior agricultural characteristic map. In some examples, agricultural characteristic confidence system 1330 may obtain or recommend obtaining an alternative prior agricultural characteristic map and/or use or recommend using different data for the generation of the prior agricultural characteristic map. Additionally, the quality of data used for the generation of the prior agricultural characteristic map may affect the determination of the likelihood that the agricultural characteristics have changed.

In another example, data quality analysis logic 1411, in providing a data quality output, can consider the characteristic and/or conditions under which the supplemental data was collected. For instance, weather data collected from third-party sources (e.g., external weather stations, the internet, etc.) may be less reliable or given less weight than weather data from weather sensors located at a field of interest or weather data provided by a user or operator that has observed the weather at the field of interest. Similarly, the sensors, as well as the sensor capabilities and settings, can be considered when determining or identifying a quality of the supplemental data. For instance, supplemental data collected by an older or outdated sensor, or a sensor with relatively lower resolution, may be considered less reliable or given less weight than supplemental data collected by a newer sensor, or a sensor having relatively higher resolution. Further, the field conditions and/or environmental conditions at the time at which the supplemental data was collected can also be considered, for example, the presence of obscurants at the field of interest (e.g., weather obscurants, meteorological obscurants, obscurants on the field, etc.). These are merely examples. In other examples, data quality analysis logic can consider various other conditions or characteristics under which the supplemental data was collected.

Based on the data quality output indicating a quality of the supplemental data, agricultural characteristic confidence system 1330 may determine a confidence in the agricultural characteristics indicated by the prior agricultural characteristic map. In some examples, agricultural characteristic confidence system 1330 may obtain or recommend obtaining alternative supplemental data and/or use or recommend using different supplemental data for the generation of the agricultural characteristic confidence output. Additionally, the quality of the supplemental data may affect the determination of the likelihood that the agricultural characteristics have changed.

Figure 5:
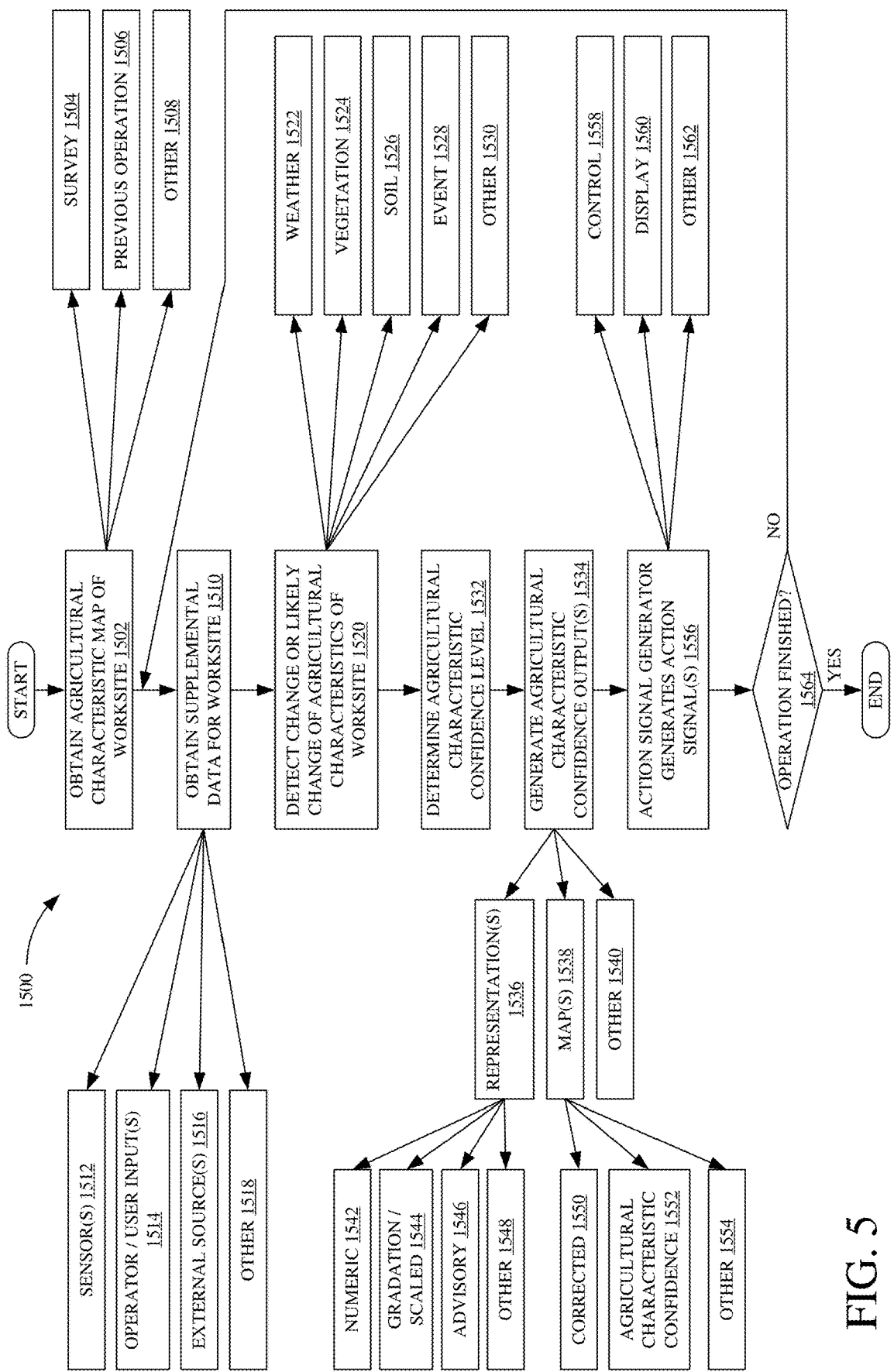
FIG. 5 is a flow diagram showing example operations of the agricultural characteristic confidence system illustrated in FIG. 4.

FIG. 5 is a flow diagram showing an example of the operation of the agricultural characteristic confidence system 1330 shown in FIG. 4 in determining a confidence in the agricultural characteristics of the worksite as indicated by the prior agricultural characteristic map based on supplemental data and generating an agricultural characteristic confidence output based on the determination. It is to be understood that the operation can be carried out at any time or at any point through an agricultural operation, or even if an agricultural operation is not currently underway. Further, while the operation will be described in accordance with mobile machine 100, it is to be understood that other machines with an agricultural characteristic confidence system 1330 can be used as well.

Processing begins at block 1502 where data capture logic 1404 obtains an agricultural characteristic map of a worksite (e.g., as a baseline). The agricultural characteristic map can be based on a survey of the worksite (e.g., an aerial survey, a satellite survey, a survey by a ground vehicle, a human survey, etc.) as indicated by block 1504, data from a previous operation on the worksite (e.g., row data, pass data, etc.) as indicated by block 1506, as well as based on various other data, as indicated by block 1508.

Once an agricultural characteristic map of the worksite has been obtained at block 1502, processing proceeds at block 1510 where data capture logic 1404 obtains supplemental data for the worksite. The supplemental data can be obtained or otherwise received from various sensor(s) as indicated by block 1512, operator/user input as indicated by block 1514, various external sources (e.g., weather stations, the Internet, news sources, etc.) as indicated by block 1516, as well as from various other sources of supplemental data, as indicated by block 1518.

Once the data is obtained at blocks 1502 and 1510, processing proceeds at block 1520 where, based on the agricultural characteristic map (e.g., prior agricultural characteristic map) and the supplemental data, agricultural characteristic change detector 1420 of agricultural characteristic confidence system 1330 detects a change or a likely change in the agricultural characteristics of the worksite (as indicated by the prior agricultural characteristic map) based on characteristics of the worksite or the environment of the worksite as indicated by the supplemental data. These characteristics can be weather characteristics indicated by weather data and analyzed by weather logic 1422 as indicated by block 1522, vegetation characteristics indicated by vegetation data and analyzed by vegetation logic 1424 as indicated by block 1524, soil characteristics indicated by soil data and analyzed by soil logic 1426 as indicated by block 1526, event characteristics indicated by event data and analyzed by event logic 1428 as indicated by block 528, as well as a variety of other characteristics indicated by various other data and analyzed by various other logic, as indicated by block 1530.

Processing proceeds at block 1532 where, based on the detected change or likely change to the agricultural characteristics of the worksite, agricultural characteristic confidence analyzer 1400 of agricultural characteristic confidence system 1330 determines an agricultural characteristic confidence level indicative of a confidence in the agricultural characteristics of the worksite or the agricultural characteristics of particular geographic locations within the worksite, as indicated by the prior agricultural characteristic map.

Processing proceeds at block 1534 where, based on the agricultural characteristic confidence level(s), agricultural characteristic confidence system 1330 generates agricultural characteristic confidence output(s). The agricultural characteristic confidence outputs can include representation(s) of the agricultural characteristic confidence level(s) as indicated by block 1536, maps as indicated by block 1538, as well as various other outputs, or combinations thereof, as indicated by block 11540. The representations(s) at block 536 can include numeric representations, such as percentages or scalar values, as indicated by block 1542, gradation and/or scaled values, such A-F, "high, medium, low", 1-10, as indicated by block 1544, advisory representations, such as caution, proceed, slow, scout first, no crop, as indicated by block 1546, as well as various other representations, including various other metrics and/or values, or combinations thereof, as indicated by block 1548.

The maps at block 1538 can be generated by map generator(s) 1402 and can include corrected agricultural characteristic maps as indicated by block 1550, agricultural characteristic confidence maps as indicated by block 1552, as well as various other maps, as indicated by block 1554. In one example, other maps can include a map that includes both corrected agricultural characteristic information and agricultural characteristic confidence level(s). In another example, other maps can include a map that includes one or more of corrected agricultural characteristic information, agricultural characteristic confidence level(s), and/or agricultural characteristics as indicated by the prior agricultural characteristic map.

In one example, once agricultural characteristic confidence output(s) have been generated at block 1534, processing proceeds at block 1556 where action signal generator 1406 generates one or more action signal(s). In one example, action signals can be used to control the operation of one or more machines, such as controlling one or more controllable subsystems 1302 of mobile machine 100, vehicles 1370, etc., as indicated by block 1558. For instance, action signal generator 1406 can generate action signals to control the speed of mobile machine 100, or the route (e.g., travel path) of mobile machine 100, adjust the position of a component of mobile machine 100, such as the position of header 104 or boom 210 above the surface of the worksite, adjust an operating parameter of the spraying subsystem of sprayer 201, as well as controlling and/or adjusting a variety of other operations or machine settings. In another example, a display, recommendation, or other indication can be generated to an operator 1362 on an operator interfaces 1360 or to a remote user 1366 on a user interface 1364, as indicated by block 1560. The display can include an indication of the agricultural characteristic confidence level, a display of a map, such as a corrected agricultural characteristic map or an agricultural characteristic confidence map, or a map having one or more of corrected agricultural characteristics, agricultural characteristic confidence representations, and/or agricultural characteristics as indicated by the prior agricultural characteristic map. Any number of various other action signal(s) can be generated by action signal generator 1406 based on the agricultural characteristic confidence output(s), as indicated by block 1562.

Processing proceeds at block 1564 where it is determined whether the operation of mobile machine 100 is finished at the worksite. If, at block 1564, it is determined that the operation has not been finished, processing proceeds at block 1510 where additional supplemental data is obtained. If, at block 1564, it is determined that the operation has been finished, then processing ends.

FIGS. 6-11 are pictorial illustrations of examples of the various maps that can be used by or generated by an agricultural characteristic confidence system 1330 shown in FIG. 4.

Figure 6:
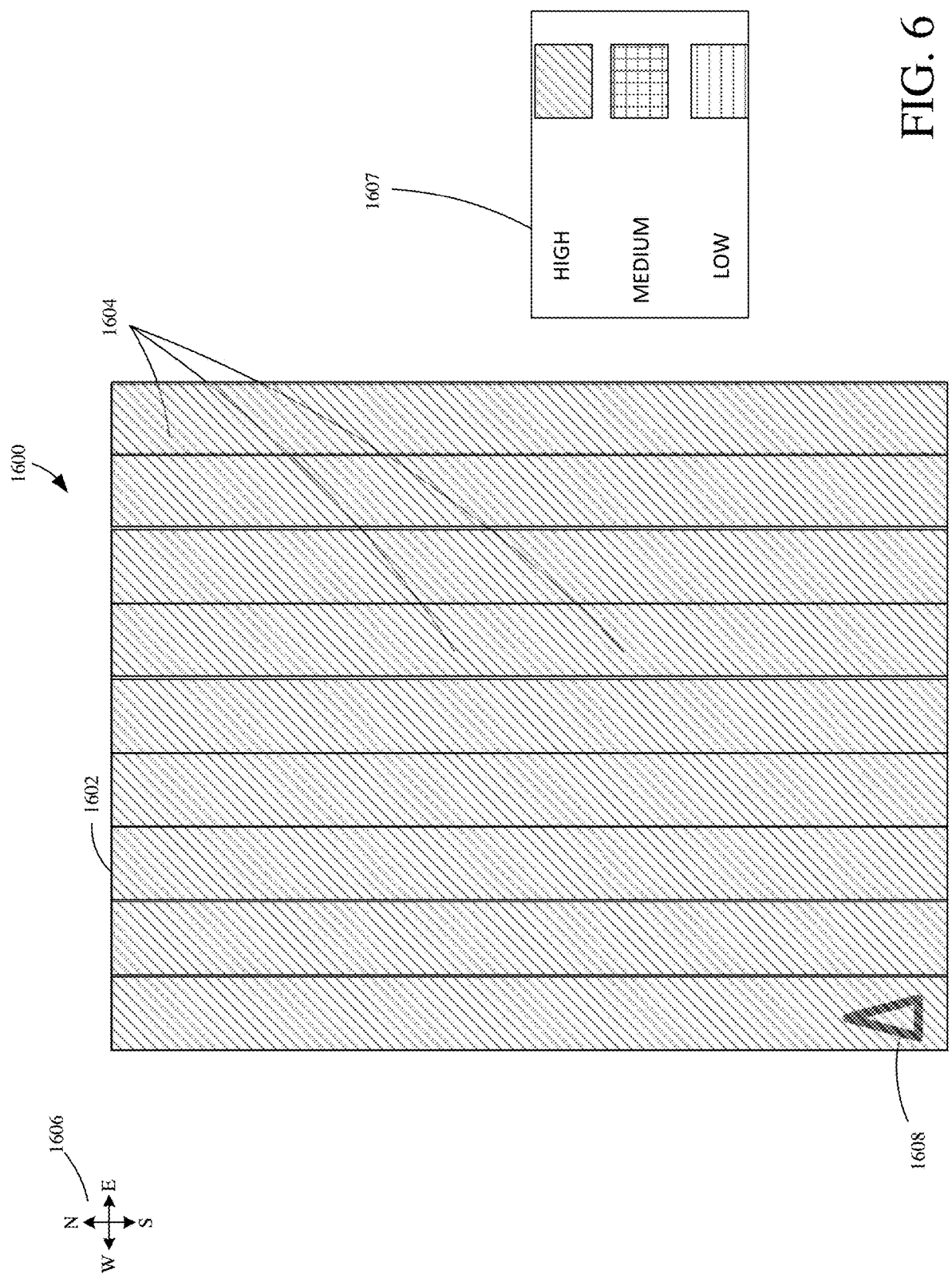
FIG. 6-11 are pictorial illustrations showing example maps that can be generated by the agricultural characteristic confidence system illustrated in FIG. 4.

FIG. 6 is one example of a prior agricultural characteristic map 1600 of a worksite that can be obtained and used by agricultural characteristic confidence system 1330. Prior agricultural characteristic map 1600 shows agricultural characteristics of worksite 1602 upon which mobile machine 100 is to operate. In the example illustrated in FIG. 6, map 1600 is a yield map that shows yield characteristics. In one example, the yield map may be generated based upon vegetative index data, such as NDVI data and/or Leaf Area Index data, collected prior to the operation to be performed by mobile machine 100. Prior yield map 1600 can include agricultural characteristic value representations 1604, compass rose 1606, legend 1607, and mobile machine indicator 1608. While certain items are illustrated in FIG. 6, it will be understood that the prior agricultural characteristic map 1600 can include various other items. Generally speaking, prior agricultural characteristic map 1600 indicates agricultural characteristics of worksite 1602 such as yield values of crop at worksite 1602 as indicated by agricultural characteristic value representations 1604 (illustratively shown as yield values). Agricultural characteristic map 1600 further includes compass rose 1606 to indicate the disposition of worksite 1602 and items on map 1600 or worksite 1602 relative to North, South, East, and West. Agricultural characteristic map 1600 further includes legend 1607 which provides a key to representations on map 1600, such as a key to agricultural characteristic value representations 1604, illustratively shown as representing "HIGH" (e.g., high yield), "MEDIUM" (e.g., medium yield), and "LOW" (e.g., low yield). While high, medium, and low are shown, various other representations can be utilized, such as other representations discussed herein. Additionally, while yield is illustrated as the agricultural characteristic of interest in FIG. 6, it is to be understood that various other agricultural characteristics can also be used. Agricultural characteristic map 1600 can further include an indication of the position and/or heading of mobile machine 100, as represented by indicator 1608 which is shown in the southwestern corner of worksite 1602 heading North. Agricultural characteristic value representations 1604 can further indicate, beyond a location of the agricultural characteristic values, row or pass data, such as organizing the agricultural characteristic values per row or per pass. For example, the agricultural characteristic value representations can organize the agricultural characteristic values by prospective passes or rows of the mobile machine, the prospective passes can be based on the location, heading (or route), and/or dimensions of the mobile machine.

Figure 7:
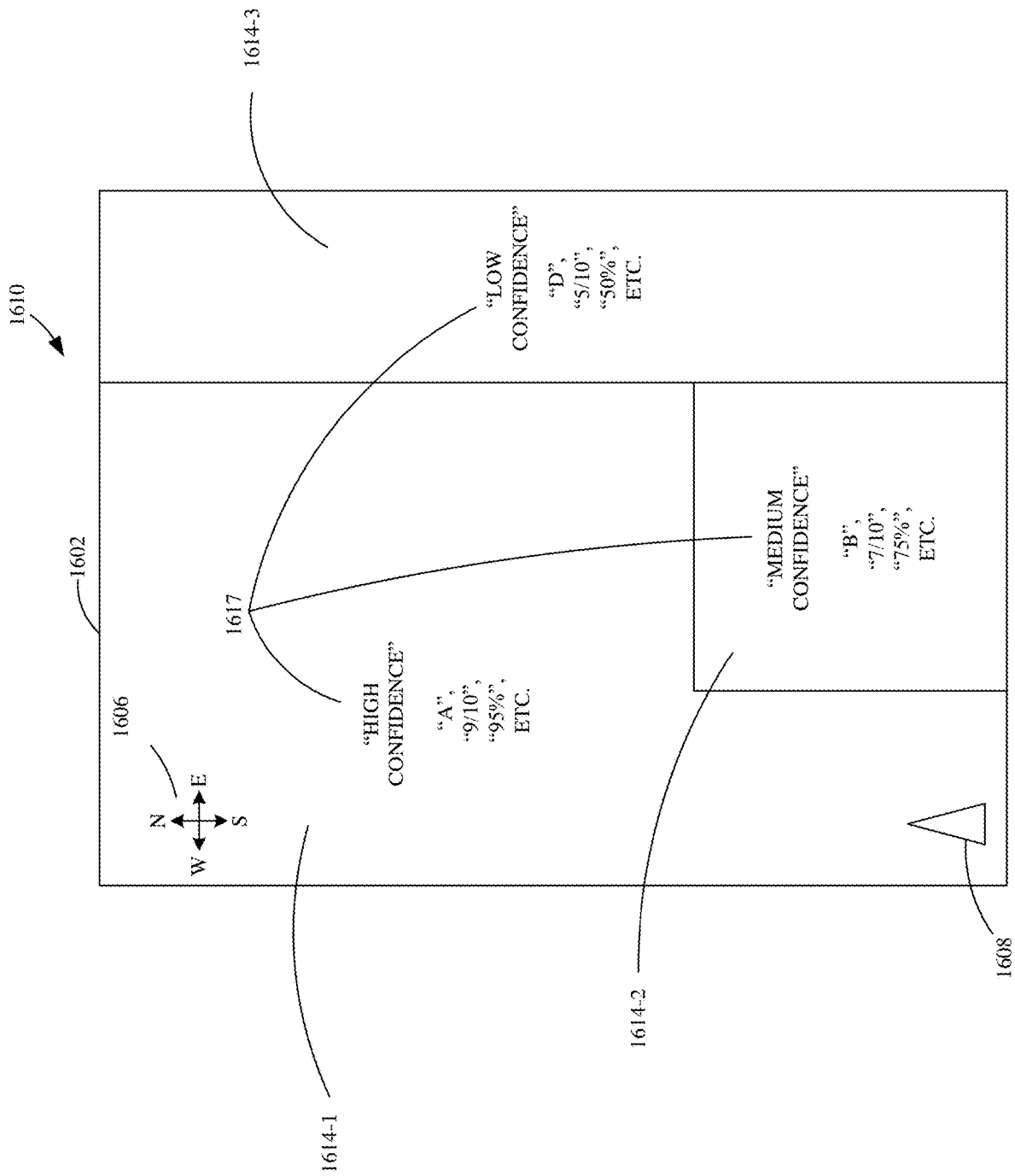

FIG. 7 is one example of an agricultural characteristic map 1610 that can be generated by agricultural characteristic confidence system 1330, based on a prior agricultural characteristic map, such as map 1600 and supplemental data relative to worksite 1602 or the environment of worksite 1602. Agricultural characteristic confidence map 1610 generally indicates a confidence level in the agricultural characteristics of worksite 1602 that are shown on prior agricultural characteristic map 1600. As can be seen, agricultural characteristic confidence map 1610 can include agricultural characteristic confidence zones 1614 (shown as 1614-1 to 1614-3) and agricultural characteristic confidence level representations 1617. A number of different examples of agricultural characteristic confidence level representations 1617 are shown in FIG. 7. For instance, FIG. 7 shows that representations 1617 can be numeric representations (e.g., 95%) as well as gradation and/or scaled representations (e.g., A-F, 1-10, "high, medium, low", etc.). As can be seen, the agricultural characteristic confidence level and the corresponding agricultural characteristic confidence level representations can vary across worksite 1602, as indicated by confidence zones 1614-1 to 1614-3.

In one example, agricultural characteristic confidence system 1330 may have received supplemental data indicating that worksite 1602 experienced drought conditions over a period of time (e.g., little to no rain during the reproductive phase of crop). Based on this supplemental data, agricultural characteristic confidence system 1330 can determine that a change in the agricultural characteristics (e.g., predictive yield) of worksite 1602 and/or of particular geographic locations within worksite 1602 has occurred or has likely occurred. For example, based on the characteristics (e.g., yield, vegetative index data) as indicated by prior agricultural characteristic map 1600 of worksite 602 and the supplemental data (e.g., amount of sunlight exposure, amount of wind, the amount of rainfall, drought conditions, etc.), agricultural characteristic confidence system 1330 can determine that the area of the field represented by 1614-3 likely experienced a change in agricultural characteristics (e.g., predictive yield) due to poor growing conditions (e.g., lack of rain, overexposure of sunlight, heavy wind) on worksite 1602 (which likely caused a change in yield, such as due to decreased crop growth or crop death), and thus indicates that the confidence level in the agricultural characteristics for that area is "low" (or some other representation). In one example, the crops planted in the area of the field represented by 1614-3 may be a particular crop genotype that is particularly susceptible to drought. In the same example, the crops planted in the areas of the field represented by 1614-1 and 1614-2 may be a particular crop genotype and/or genotypes that are drought resistant or relatively more drought tolerant than the crops in area 1614-3, and thus, the confidence level in areas 1614-1 and 1614-2 are relatively higher than area 1614-3. However, there can still be variance in confidence across the field even where there is similarity in one characteristic (e.g., crop genotype), particularly when there is variance in one or more other characteristics (e.g., location, topography, etc.). Thus, in the example shown in FIG. 7, while the crops planted in area 1614-2 are the same genotype as the crops planted in area 1614-1 (e.g., drought resistant, drought tolerant, etc.), the crops in area 1614-2 are located at an area of relatively higher elevation and are located on the south side of worksite 1602, and thus, in the example, were exposed to more sunlight, experienced higher wind speeds, and/or the ground drained more water, and thus there is some likelihood that the agricultural characteristics (e.g., predictive yield) may have changed. Thus, the confidence level for area 1614-2 is "medium", whereas the confidence level for area 1614-1 is "high" as the crops in area 1614-1 are located at lower elevation. Additionally, due to the crop genotype of the crop (e.g., drought susceptible) in the area of the field represented by 1614-3, the amount or severity of deviation from the agricultural characteristics of that area, as indicated by the prior map, may be greater, and thus the confidence may be relatively lower. Further, while the area represented by 1614-2 may have experienced some change to the agricultural characteristics, as indicated by the prior map, due to the growing conditions, the amount or severity of deviation from the agricultural characteristics of that area, as indicated by prior map, may be less, and thus the confidence value may be relatively higher as compared to the confidence value for the area of the field represented by 1614-3. For instance, the confidence level for area 1614-2 may be "medium" because a change may still have occurred in the area in the experienced growing conditions (e.g., drought, south side of the field, higher elevation, etc.), but due to the crop genotype of the crop of the area (e.g., drought resistant), the change may be less likely to be significant (e.g., the deviation may be less severe) than the change in the area of the field represented by 1614-3 where the crop is a drought susceptible genotype. Further, the confidence level for area 1614-1 may be "high" because agricultural characteristic confidence system 1330 determines that a change is not likely to have occurred given the location, elevation, and crop genotype of the crop in area 1614-1, and is thus less likely to experience change in yield due to the characteristics and/or conditions indicated by the supplemental data.

It will be noted that this is merely an example, and that various other characteristics of the worksite or the environment of the worksite, including various other characteristics indicated by supplemental data, can be considered by agricultural characteristic confidence system 1330. In the example provided, the agricultural characteristic of yield, and the characteristics provided by the supplemental data, such as precipitation, wind, sunlight exposure, etc. can have an effect on the amount of moisture retention, moisture availability, and crop growth at worksite 602, and thus can affect the likelihood and/or level of yield (as well as various other agricultural characteristics) at worksite 1602. Additionally, it is to be understood that agricultural characteristic confidence system 1330 can use any number of models in determining the agricultural characteristic confidence level, for instance, in the provided example, a crop growth model.

Figure 8:
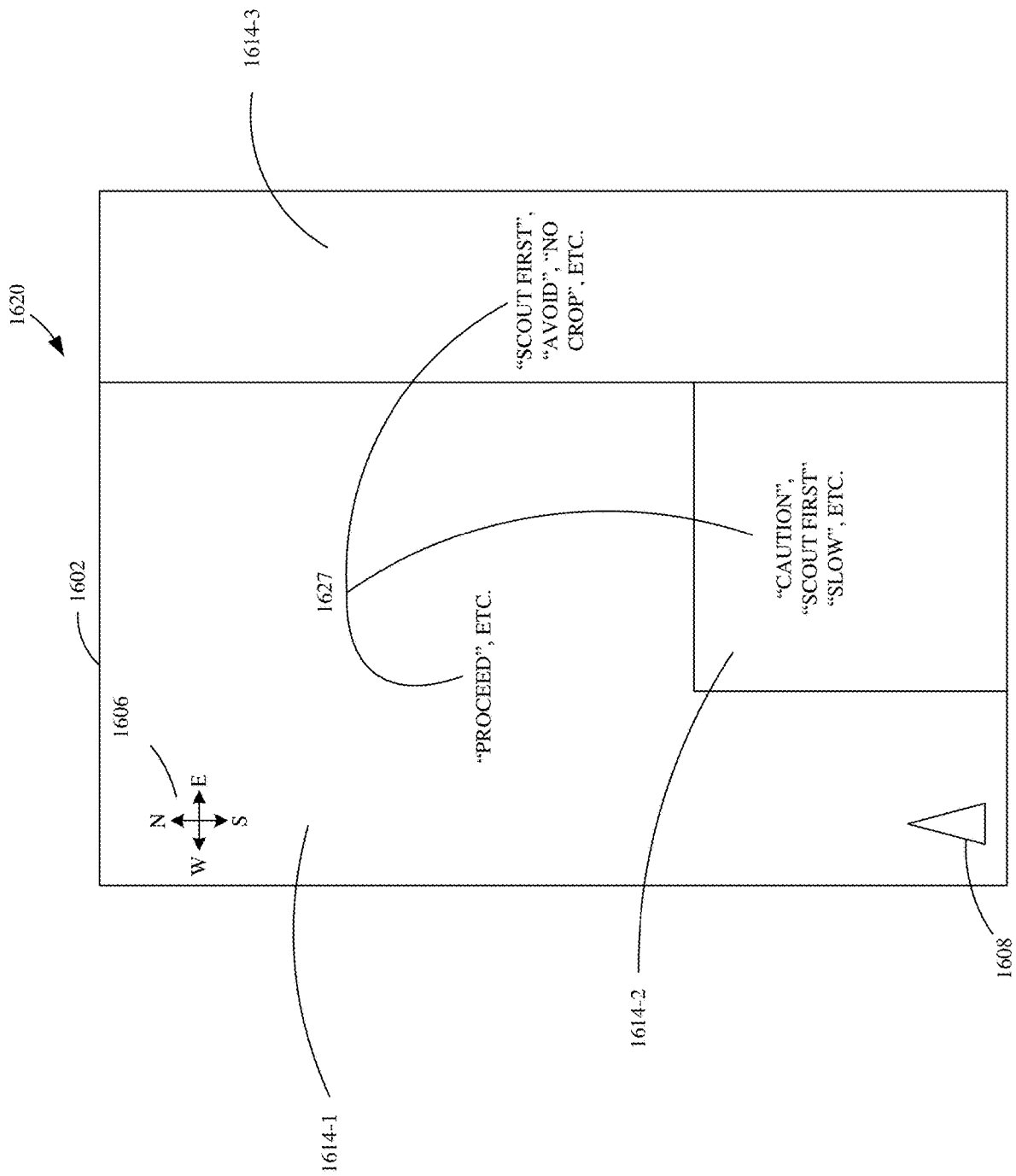

FIG. 8 is one example of an agricultural characteristic confidence map 1620 that can be generated by agricultural characteristic confidence system 1330, based on a prior agricultural characteristic map, such as map 1600 and supplemental data relative to worksite 1602 and/or the environment of worksite 1602. Agricultural characteristic confidence map 1620 is similar to agricultural characteristic confidence map 1610 except that the agricultural characteristic confidence level is represented by advisory agricultural characteristic confidence level representations 1627, which can indicate an action to be taken or a recommendation, such as a recommendation of an action to be taken either while operating on worksite 1602 or prior to operating on worksite 1602. As described above, the agricultural characteristic confidence level can vary across worksite 1602, as represented by agricultural characteristic confidence zones 1614 (shown as 1614-1 to 1 1614-3). Each of the zones 1614 can have a different advisory agricultural characteristic confidence level as represented by 1627. In this way, the control of machine 100 as it operates across worksite 1602 can also vary depending on which confidence zone 1614 it is operating within. In one example, confidence zones 1614 can act as "control zones" for mobile machine 100 such that mobile machine 100 is controlled in a certain manner in one control zone as compared to another control zone.

For example, proceeding with the previous example provided above in FIG. 7, in zone 1614-3 where it was determined that a change in the agricultural characteristics likely occurred, or at least that the confidence level in the agricultural characteristics as indicated by prior agricultural characteristic map 1600 is "low", agricultural characteristic confidence system 1330 can provide an advisory agricultural characteristic confidence level representation 1627, such as, "scout first", "avoid", "no crop", as well as various other advisory representations. These advisory representations can be used to automatically control machine operation (e.g., by control system 1304) or can be used by the operator/user to control the operation of various machines, such as mobile machine 100, vehicles 1370, as well as various other components of computing architecture 1300.

For instance, in the example of "scout first", agricultural characteristic confidence system 1330 could generate an action signal to automatically control a vehicle (e.g., vehicles 1370) to travel to zone 1614-3 to collect further data (e.g., via sensors 1382) prior to mobile machine 100 operating in zone 1614-3, as well as generate an action signal to provide a display, alert, recommendation, or some other indication on an interface or interface mechanism (e.g., on operator interfaces 1360, user interfaces 1364, as well as various other interfaces or interface mechanisms) that zone 1614-3 should first be scouted (e.g., by a human, by a vehicle, etc.) prior to mobile machine 100 operating there. The indication can include audio, visual, or haptic outputs. In other examples, agricultural characteristic confidence system 1330 can generate a route and an action signal to automatically control a heading of mobile machine 100 such that it travels along the edge of zone 1614-3 but not into zone 1614-3. In such an example, the mobile machine 100 can perform a scouting operation such that, as it travels along the edge of zone 1614-3, sensors on-board mobile machine 100 (e.g., sensors 1310) or operator 1362 can detect characteristics within zone 1614-3 prior to operating within zone 1614-3. Agricultural characteristic confidence system 1330 can also generate an action signal to provide a display, alert, recommendation, or some other indication, such as a recommended route of mobile machine 100 across worksite 1602, on an interface or interface mechanism. The indication can include audio, visual, or haptic outputs. Once additional data for area 1614-3 is collected, the agricultural characteristic confidence level can be dynamically redetermined by confidence system 1330 such that operation on worksite 1602 can be adjusted. Additionally, in the event that the additional data has a sufficient level of certainty, agricultural characteristics of zone 1614-3 can be generated, such as in the form of a supplemental or corrected agricultural characteristic map.

In the example of "avoid", agricultural characteristic confidence system 1330 can generate a route and an action signal to automatically control a heading of mobile machine 100 such that it avoids traveling into zone 1614-3, and to generate an action signal to provide a display, alert, recommendation, or some other indication, such as a recommended route of mobile machine 100 across worksite 1602, on an interface or interface mechanism. The indication can include audio, visual, or haptic outputs. In one example of "avoid", an advisory representation 1627 of "no crop" can instead be displayed. For instance, it may be that the supplemental data indicates that there is no crop to be harvested in zone 1614-3 and thus there is no need for mobile machine 100 to operate there, nor is there any need for additional scouting or collection of data.

In other examples, in areas of reduced confidence, control of the agricultural machine may return control (if previously operating automatically or semiautomatically) to an operator and/or user such that the operator and/or user may observe the field (and characteristics thereof) in front of and/or around the agricultural machine, such as via sensor(s) (e.g., 1310, 1382, etc.), and control the machine according to what is observed.

In zone 1614-2 where, in the example of FIG. 7, it was determined that there was a possibility that a change in the agricultural characteristics of worksite 1602 occurred, or at least that the confidence level in the agricultural characteristics indicated by prior agricultural characteristic map 1600 is "medium", agricultural characteristic confidence system 1330 can provide an advisory agricultural characteristic confidence level representation 1627, such as, "scout first", "caution", "slow", or various other advisory representations. These advisory representations can be used to automatically control machine operation (e.g., by control system 1304) or can be used by the operator or user to control the operation of various machines, such as mobile machine 100, vehicles 1370, as well as various other components of computing architecture 1300.

For instance, in the example of "caution" or "slow", agricultural characteristic confidence system 1330 can generate an action signal to automatically control a machine (e.g., by controlling the propulsion subsystem 1318 of mobile machine 100) to travel at a slower speed throughout zone 1614-2 as compared to other zones or at a speed slow enough for sensor signals generated by sensors on-board the machine (e.g., sensors 1310) to be used to control the operation of the machine in a timely enough fashion to avoid consequences of agricultural characteristics on worksite 1602 in zone 1614-2. As an example, propulsion subsystem 1318 of mobile machine 100 may be controlled to propel mobile machine 100 at a speed which allows a sensor signal generated by perception system(s) 1342 indicative of upcoming crop, to be used to adjust the height or orientation of header 104, to adjust the travel speed of mobile machine 100, as well as to adjust various other operating parameters, to compensate for an agricultural characteristic change, such as reduced yield, to maintain a desired federate, to maintain separation and/or cleaning levels, etc. Additionally, agricultural characteristic confidence system 1330 can generate an action signal to provide a display, alert, recommendation, or some other indication on an interface or interface mechanism, such as an indication to the operator or user that the speed of the machine should be reduced, an indication that the operator should pay particularly close attention to the worksite (or crops) ahead of the machine, or various other indications. The indication can include an audio, visual, or haptic output.

In zone 1614-1, in the example of FIG. 7, it was determined that a change in the agricultural characteristics of worksite 1602 was unlikely, or at least that the confidence level in the agricultural characteristics as indicated by prior agricultural characteristic map is "high". Therefore, agricultural characteristic confidence system 1330 can provide an advisory agricultural characteristic confidence level representation 1627, such as, "proceed" or various other advisory representations. For example, agricultural characteristic confidence system 1330 can generate an action signal to automatically control a machine (e.g., mobile machine 100) to operate based on the agricultural characteristics indicated by prior agricultural characteristic map 1600. Additionally, agricultural characteristic confidence system 1330 can generate an action signal to provide a display, alert, recommendation, or some other indication on an interface or interface mechanism to the operator or user so the operator or user can use prior agricultural characteristic map 1600 for operating mobile machine 100. The indication can include an audio, visual, or haptic output. Agricultural characteristic confidence system 1330 can generate control signals to control various other components of computing architecture 1300, as well as various other machines, at least while in zone 1614-1.

Indicator 1608 provides an indication of the location and heading of mobile machine 100 on worksite 1602, and, in some examples, agricultural characteristic confidence system 1330 can generate an action signal to control an operation of mobile machine 100 as well as to provide a display, alert, recommendation, or some other indication on an interface or interface mechanism based on the position of mobile machine 100 on worksite 1602. The indication can include an audio, visual, or haptic output. For instance, agricultural characteristic confidence system 1330 can automatically control the machine to change operation upon exit from one zone 1614 and entrance into another zone 1614, such as automatically adjusting the speed of the machine upon exit from zone 1614-2 and entrance into zone 1614-1. Additionally, agricultural characteristic confidence system 1330 can provide an indication to the operator that the machine has entered a different zone.

Figure 9:
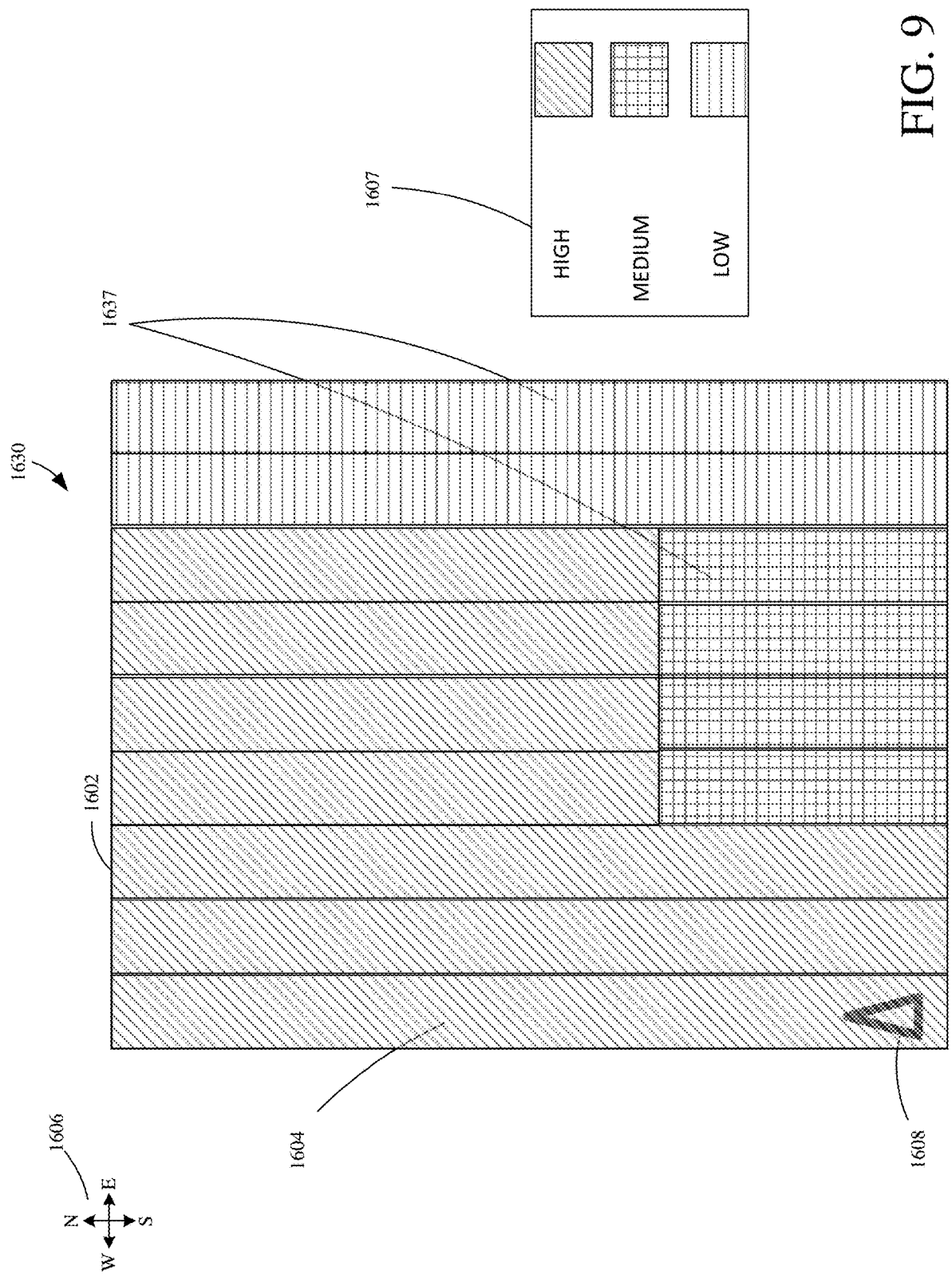

FIG. 9 is one example of a corrected (or supplemental) agricultural characteristic map 1630 of a worksite that can be generated by agricultural characteristic confidence system 1330, based on supplemental data relative to worksite 1602 or the environment of worksite 1602. As described above, in some instances the collected supplemental data will provide an accurate or relatively accurate indication of the agricultural characteristics of the worksite such that the actual or a substantial approximation of the actual agricultural characteristics of the worksite can be determined by agricultural characteristic confidence system 1330. For instance, a subsequent aerial survey of worksite 1602 (performed sometime after the data was collected for the prior agricultural characteristic map 1600) can provide sensor signal(s) (e.g., images) that provide accurate indications of the agricultural characteristics of worksite 1602. For example, the subsequent aerial survey may have been performed by a satellite and provide vegetative index data (e.g., NDVI data, Leaf Area Index data, etc.) relative to the crop on worksite 1602. In one example, corrected agricultural characteristic map 1630 can be generated and used as a new baseline to replace prior agricultural characteristic map 1600. In another example, and particularly if corrected agricultural characteristic map 630 is generated at a time close enough to the performance of the operation on worksite 1602 (e.g., harvesting, spraying, etc.), it can be used by control system 1304 or operator 1362 or user 1366 to control of mobile machine 100 as well as other components of computing architecture 1300.

As shown in FIG. 9, corrected agricultural characteristic map 1630 is similar to prior agricultural characteristic map 1600. Corrected agricultural characteristic map 1630 can include corrected agricultural characteristic value representations 1637 which indicate the corrected agricultural characteristic of worksite 1602 (e.g., corrected yield values). In the example shown, corrected agricultural characteristic map 1630 can also include agricultural characteristic value representations 1604 which remain unchanged from the prior map 1600. In some examples, the original representations (e.g., 1604) and the corrected representations (e.g., 1637) can be visually differentiated such that the operator and/or user can differentiate them (and thus their source). The representations can be differentiated in any number of ways, such as different colors, different fonts, different intensities, bolding, as well various other stylistic differences. Though not shown in FIG. 9, the previous representations (e.g., 1604) which have been corrected can also be displayed (or referenced) on corrected agricultural characteristic map 1630 and displayed in any number of ways to differentiate them, such as using dashed lines, different colors, as well as various other stylistic differences. In another example, the previous representations which have been corrected, need not be displayed. As illustrated in FIG. 9, corrected agricultural characteristic map 1630 shows that worksite 1602 experienced a change in agricultural characteristics, such as a change in the predictive yield for various crops in various areas of the worksite 1602.

Figure 10:
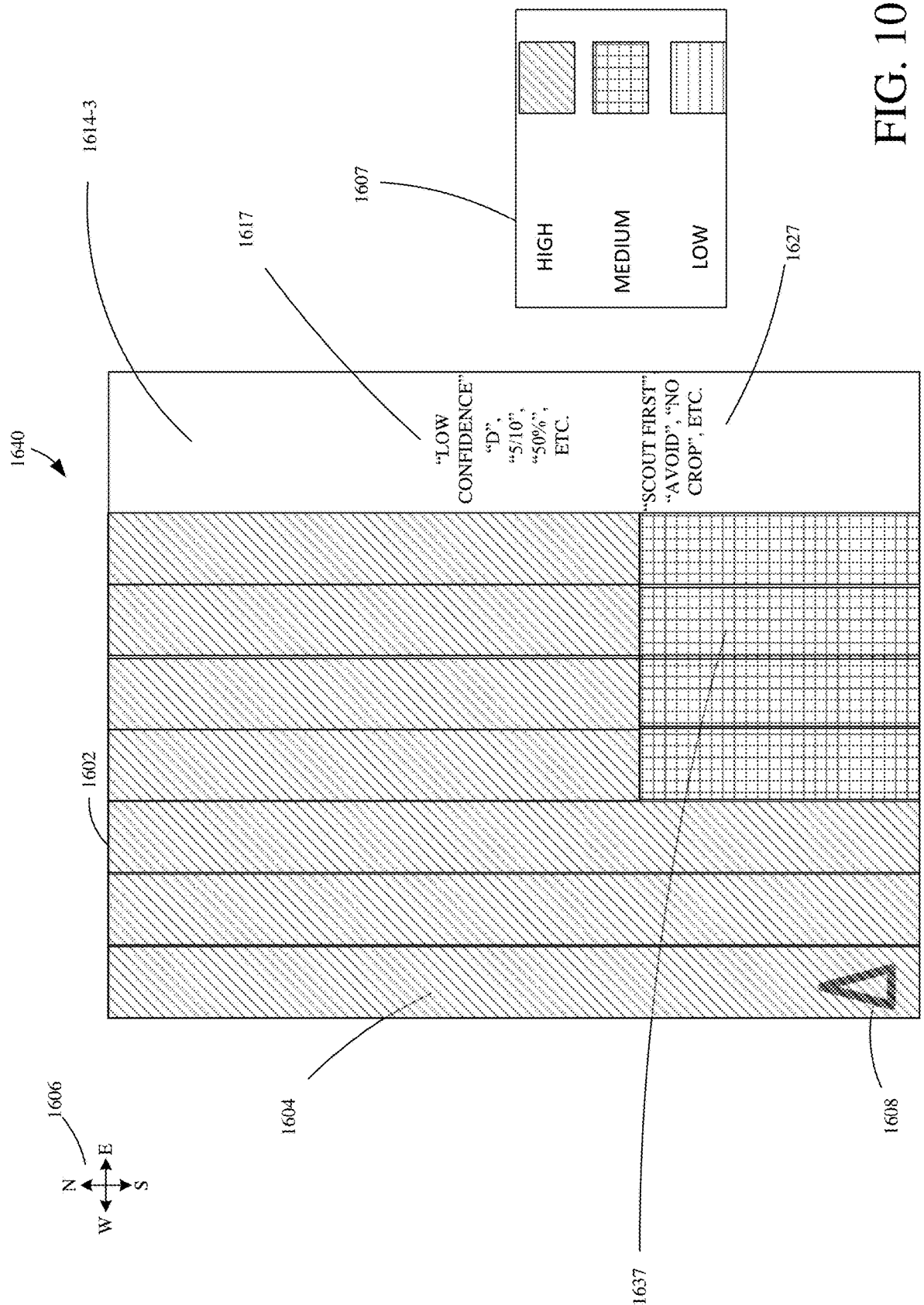

FIG. 10 is one example of a mixed agricultural characteristic map 1640 of a worksite that can be generated by agricultural characteristic confidence system 1330, based on a prior agricultural characteristic map, such as map 1600 and supplemental data relative to worksite 1602 or the environment of worksite 1602. In some examples, supplemental data can, for at least some areas of the worksite, provide indications of agricultural characteristics of worksite 1602 that are of a sufficient level of certainty or accuracy such that corrected agricultural characteristics can be generated, while for other areas of the worksite 1602 the supplemental data can be used to determine a confidence level in the agricultural characteristics as indicated by the prior agricultural characteristic map. For instance, in some areas of worksite 1602, the characteristic of interest (e.g., predictive yield) may be detectable such that the agricultural characteristic can be determined (e.g., can be accurately or reliably determined), while for other areas, the characteristic of interest may not be detectable (or at least not reliably detectable). For example, obscurants (e.g., cloud cover) may prevent detection in some areas, while not preventing detection in other areas. In other examples, certain areas of the field may have been surveyed (e.g., by another machine, by a human, etc.) whereas other areas were not surveyed. In some examples, there may exist fixed sensors on the worksite 1602 in certain areas (or that can detect certain areas) but not in other areas. These are merely examples.

In such examples, a mixed agricultural characteristic map 1640 can be generated that includes both representations of corrected agricultural characteristics (as indicated by corrected agricultural characteristic representations 1637) as well as representations of agricultural characteristic confidence levels (as represented by confidence zones 1614 and confidence level representations 1617 and 1627). In this way, the operator or user can be provided with a map the indicates, for areas of the field where the agricultural characteristics are known to a certain level of accuracy or certainty (which can be based on a threshold as described above), the corrected agricultural characteristics and/or the original agricultural characteristics as indicated by the prior agricultural characteristic map. For areas of the field where the agricultural characteristics are not known to a certain level of accuracy or certainty map 1640 can show the confidence level in the agricultural characteristics indicated by the prior agricultural characteristic map.

Figure 11:
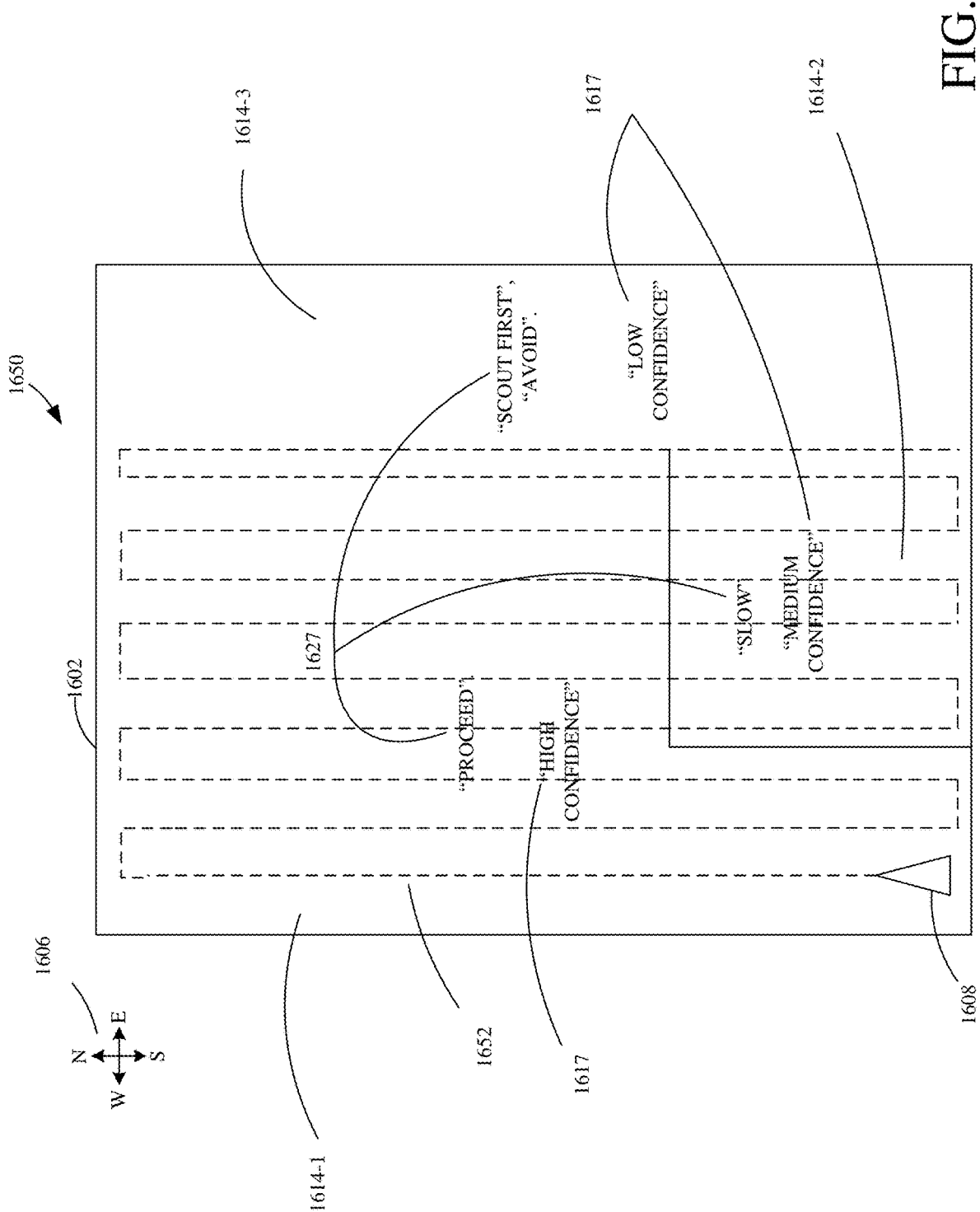

FIG. 11 is one example of an agricultural characteristic confidence map 1650 that can be generated by agricultural characteristic confidence system 1330, based on a prior agricultural characteristic map, such as map 1600 and supplemental data relative to worksite 1602 or the environment of worksite 1602. As illustrated, agricultural characteristic confidence map 1650 also includes an indication of a route 1652 generated by agricultural characteristic confidence system 1330 for a machine (e.g., mobile machine 100) to travel along. Route 1652 can be used by control system 1304 to automatically control the operation of mobile machine 100 as it travels across worksite 1602. For instance, route 1652 can be used by control system 1304 to generate an action signal to control one or more controllable subsystems 1302 of mobile machine 100, such as steering subsystem 1316 to control a heading of mobile machine 100.

Additionally, the control of mobile machine 100 can be varied as it operates across worksite 1602, based on its position within or proximity to confidence zones 1614. For example, in confidence zone 1614-1, mobile machine 100 can be controlled based on the agricultural characteristics indicated by a prior agricultural characteristic map, such as map 1600, because the agricultural characteristic confidence level representation 1617 is "high" and the advisory representation 1627 is "proceed". Whereas, in zone 1614-2, mobile machine 100 can be controlled to adjust speed (e.g., travel slower) because the agricultural characteristic confidence level representation 1617 is "medium" and the advisory representation 1627 is "slow". As can further be seen, route 1652 can direct mobile machine 100 to travel around and/or along the perimeter, or the edge of, but avoid travel into, zone 1614-3 as the agricultural confidence level representation 1617 is "low" and the advisory representation 1627 is "scout first" and/or "avoid". It should also be noted that route 1652 can be generated and displayed to an operator or a user, while the operation of the machine (e.g., the heading) is still controlled by the operator or user. In other examples, route 1652 may be used directly by a mobile machine operating in semi-autonomous or autonomous modes. Indicator 1608 can provide an indication of the position of the machine, and, in the case of operator or user control, can provide an indication of deviation from the recommended travel path (such as a line showing where the machine has actually traveled).

It will be noted that the various maps shown in FIGS. 6-11 do not comprise an exhaustive list and that agricultural characteristic confidence system 1330 can generate any number of maps that indicated or other display any number of characteristics, conditions, and or items on or relative to a worksite. It will also be understood that any and all of the maps described above in FIGS. 6-11 can comprise map layers that can be generated by agricultural characteristic confidence system 1330 and can be displayed over other map layers (e.g., as an overlay), be displayed alongside other map layers (e.g., split screen), and/or individually selectable or toggleable by an operator or user, such as by an input on an actuatable input mechanism on a display screen (e.g., touch screen) on an interface mechanism. For instance, operator 1362 of mobile machine 100 may desire to switch between a display of the prior agricultural characteristic map 1600, the agricultural characteristic confidence map 1610, and the agricultural characteristic confidence map 1620 during operation. In this way, operator 1362 can be provided with an indication of what the last known agricultural characteristics were (e.g., via map 1600), what the agricultural characteristic confidence level across the worksite is (e.g., via map 1610), and what the advised operation of mobile machine 100 is across the worksite (e.g., via map 1620).

FIGS. 12-20 illustrate one example embodiment of agricultural characteristic confidence system 1330, where the particular agricultural characteristic of interest are topographic characteristics. Thus, FIGS. 12-20 illustrate an example having a computing system architecture (e.g., 300) including a topographic confidence system 330. Topography is merely one example of an agricultural characteristic. Various other agricultural characteristics are also contemplated herein.

Figure 12:
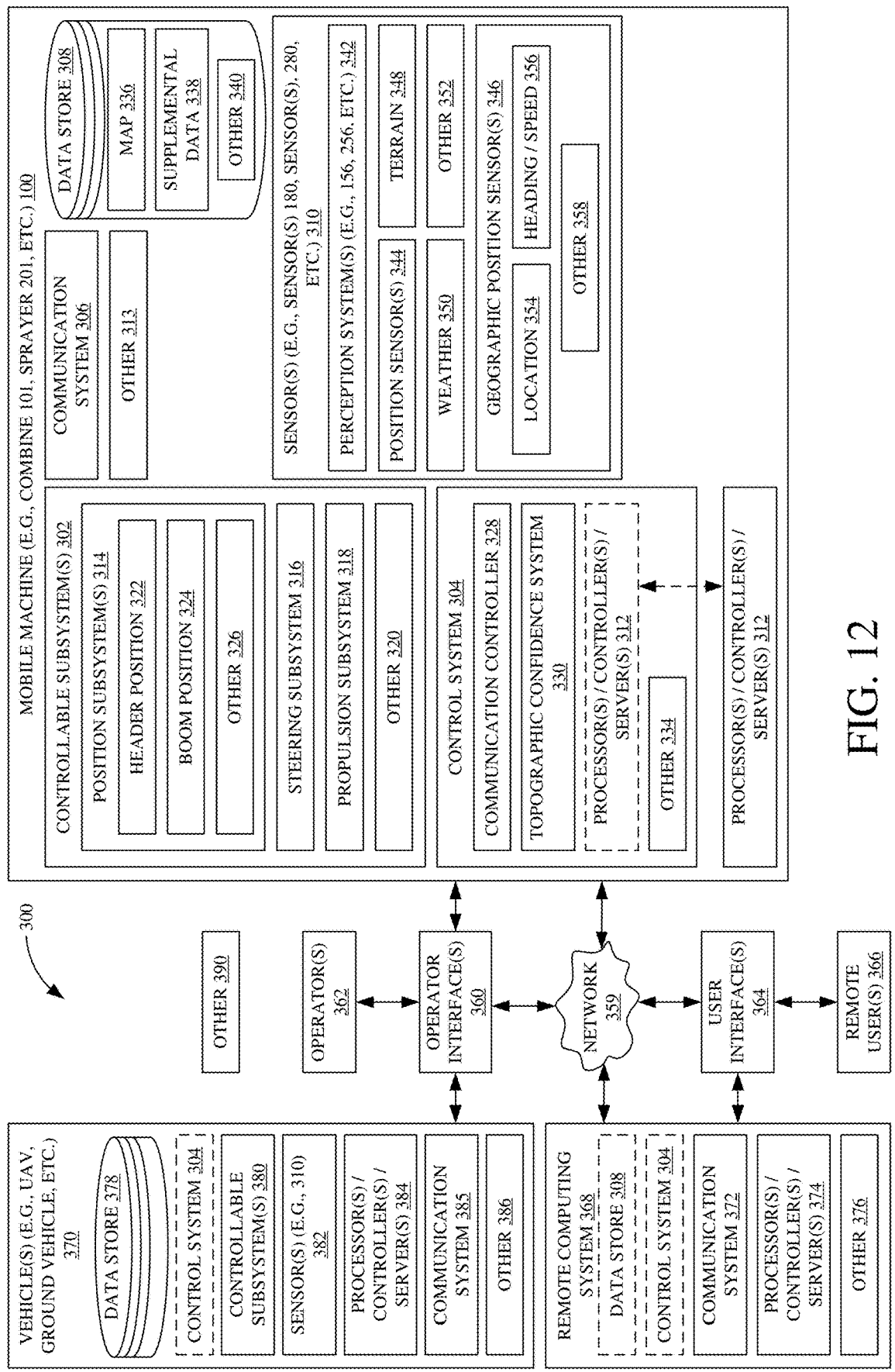
FIG. 12 is a block diagram of one example of a computing system architecture that includes the mobile agricultural machines illustrated in FIGS. 1-2.

FIG. 12 is a block diagram of one example of a computing architecture 300 having, among other things, a mobile machine 100 (e.g., combine 101, sprayer 201, etc.) configured to perform an operation (e.g., harvesting, spraying, etc.) at a worksite (such as field 206). Some items are similar to those shown in FIGS. 1-2 and they are similarly numbered. FIG. 12 shows that architecture 300 includes mobile machine 100, network 359, one or more operator interfaces 360, one or more operators 362, one or more user interfaces 364, one or more remote users 366, one or more remote computing systems 368, one or more vehicles 370, and can include other items 390 as well. Mobile machine 100 can include one or more controllable subsystems 302, control system 304, communication system 306, one or more data stores 308, one or more sensors 310, one or more processors, controllers, or servers 312, and it can include other items 313 as well. Controllable subsystems 302 can include position subsystem(s) 314, steering subsystem 316, propulsion subsystem 318, and can include other items 320 as well, such as other subsystems, including, but not limited to those described above with reference to FIGS. 1-2. Position subsystem(s) 314, itself, can include header position subsystem 322, boom position subsystem 324, and it can include other items 326.

Control system 304 can include one or more processors, controllers, or servers 312, communication controller 328, topographic confidence system 330, and can include other items 334. Data stores 308 can include map data 336, supplemental data 338, and can include other data 340.

FIG. 12 also shows that sensors 310 can include any number of different types of sensors that sense or otherwise detect any number of characteristics. Such as, characteristics relative to the environment of mobile machine 100 (e.g., agricultural surface 206), as well as the environment of other components in computing architecture 300. Further, sensors 310 can sense or otherwise detect characteristics relative to the components in computing architecture 300, such as operating characteristics of mobile machine 100 or vehicles 370, such as, current positional information relative to the header of combine 101 or the boom of sprayer 201. In the illustrated example, sensors 310 can include one or more perception systems 342 (such as 156 and/or 256 described above), one or more position sensors 344, one or more geographic position sensors 346, one or more terrain sensors 348, one or more weather sensors 350, and can include other sensors 352 as well, such as, any of the sensors described above with reference to FIGS. 1-2 (e.g., sensors 180 or 280). Geographic position sensor 346, itself, can include one or more location sensors 354, one or more heading/speed sensors 356, and can include other items 358.

Control system 304 is configured to control other components and systems of computing architecture 300, such as components and systems of mobile machine 100 or vehicles 370. For instance, communication controller 328 is configured to control communication system 306. Communication system 306 is used to communicate between components of mobile machine 100 or with other systems such as vehicles 370 or remote computing systems 368 over network 359. Network 359 can be any of a wide variety of different types of networks such as the Internet, a cellular network, a wide area network (WAN), a local area network (LAN), a controller area network (CAN), a near-field communication network, or any of a wide variety of other networks or combinations of networks or communication systems.

Remote users 366 are shown interacting with remote computing systems 368, such as through user interfaces 364. Remote computing systems 368 can be a wide variety of different types of systems. For example, remote computing systems 368 can be in a remote server environment. Further, it can be a remote computing system (such as a mobile device), a remote network, a farm manager system, a vendor system, or a wide variety of other remote systems. Remote computing systems 368 can include one or more processors, controllers, or servers 374, a communication system 372, and it can include other items 376. As shown in the illustrated example, remote computing system 368 can also include one or more data stores 308 and control system 304. For example, the data stored and accessed by various components in computing architecture 300 can be remotely located in data stores 308 on remote computing systems 368. Additionally, various components of computing architecture 300 (e.g., controllable subsystems 202) can be controlled by a control system 304 located remotely at a remote computing system 368. Thus, in one example, a remote user 366 can control mobile machine 100 or vehicles 370 remotely, such as by a user input received by user interfaces 364. These are merely some examples of the operation of computing architecture 300.

Vehicles 370 (e.g., UAV, ground vehicle, etc.) can include one or more data stores 378, one or more controllable subsystems 380, one or more sensors 382, one or more processors, controllers, or servers 384, a communication system 385, and it can include other items 386. In the illustrated example, vehicles 370 can also include control system 304. Vehicles 370 can be used in the performance of an operation at a worksite, such as a spraying or harvesting operation on an agricultural surface. For instance, a UAV or ground vehicle 370 can be controlled to travel over the worksite, including ahead of or behind mobile machine 100. Sensors 382 can include any number of a wide variety of sensors, such as, sensors 310. For example, sensors 382 can include perception systems 342. In a particular example, vehicles 370 can travel the field ahead of mobile machine 100 and detect any number of characteristics that can be used in the control of mobile machine 100, such as, detecting topographic characteristics ahead of combine 101 or sprayer 201 to control a height of header 102 or boom 110, from a surface of the worksite (e.g., field 206) as well as various other operating parameters of various other components. In another example, vehicles 370 can travel the field behind mobile machine 100 and detect any number of characteristics that can be used in the control of mobile machine 100, sot that, vehicles 370 can enable closed-loop control of mobile machine 100. In another example, vehicles 370 can be used to perform a scouting operation to collect additional data, such as topographic data, relative to the worksite or particular geographic locations of the worksite.

Additionally, control system 304 can be located on vehicles 370 such that vehicles 370 can generate action signals to control an action of mobile machine 100 (e.g., adjusting an operating parameter of one or more controllable subsystems 302), based on characteristics sensed by sensors 382. Further, a confidence map can be generated by control system 304 on vehicles 370 to be used for the control of mobile machine 100.

As illustrated, vehicles 370 can include a communication system 385 configured to communicate with other components of computing architecture 300, such as mobile machine 100 or remote computing systems 368, as well as between components of vehicles 370.

FIG. 12 also shows one or more operators 362 interacting with mobile machine 100, remote computing systems 368, and vehicles 370, such as through operator interfaces 360. Operator interfaces 360 can be located on mobile machine 100 or vehicles 370, for example in an operator compartment (e.g., 103 or 203, etc.), such as a cab, or they can be another operator interface communicably coupled to various components in computing architecture 300, such as a mobile device or other interface mechanism.

Before discussing the overall operation of mobile machine 100, a brief description of some of the items in mobile machine 100, and their operation, will first be provided.

Communication system 306 can include wireless communication logic, which can be substantially any wireless communication system that can be used by the systems and components of mobile machine 100 to communicate information to other items, such as among control system 304, data stores 308, sensors 310, controllable subsystems 302, and topographic confidence system 330. In another example, communication system 306 communicates over a controller area network (CAN) bus (or another network, such as an Ethernet network, etc.) to communicate information between those items. This information can include the various sensor signals and output signals generated by the sensor characteristics and/or sensed characteristics, and other items.

Perception systems 342 are configured to sense various characteristics relative to the environment around mobile machine 100, such as characteristics relative to the worksite surface. For example, perception system(s) 342 can be configured to sense characteristics relative to the vegetation on the worksite surface (e.g., stage, stress, damage, knockdown, density, height, Leaf Area index, etc.), characteristics relative to the topography of the worksite surface (e.g., washouts, ruts, drifts, soil erosion, soil deposits, soil buildup, obstacles, etc.), characteristics relative to the soil (e.g., type, compaction, structure, etc.), characteristics relative to soil cover (e.g., residue, cover crop, etc.), as well as various other characteristics. Perception system(s) 342 can also sense topographic characteristics of the worksite surface ahead of mobile machine 100, such that a change in topography can be determined and the height of header 104 or boom 210 can be adjusted. Perception systems 342 can, in one example, comprise imaging systems, such as cameras.

Position sensors 344 are configured to sense position information relative to various components of agricultural spraying system 102. For example, a number of position sensors 344 can be disposed at various locations within mobile machine 100. They can thus detect a position (e.g., height, orientation, tilt, etc.) of the various components of mobile machine 100, such as the height of header 104 or boom 210 (or boom arms 212 and 214) above agricultural surface 110, the height or orientation of nozzles 208, as well as position information relative to various other components. Position sensors 344 can be configured to sense position information of the various components of mobile machine 100 relative to any number of items, such as position information relative to the worksite surface, position information relative to other components of mobile machine 100, as well as a variety of other items. For instance, position sensors 344 can sense the height of header 104, boom 210 or spray nozzle(s) 208 from a detected top of vegetation on the worksite surface. In another example, the position and orientation of other items can be calculated, based on a sensor signal, by knowing the dimensions of the mobile machine 100.

Geographic position sensors 346 include location sensors 354, heading/speed sensors 356, and can include other sensors 358 as well. Location sensors 354 are configured to determine a geographic location of mobile machine on the worksite surface (e.g., field 206). Location sensors 354 can include, but are not limited to, a Global Navigation Satellite System (GNSS) receiver that receives signals from a GNSS satellite transmitter. Location sensors 354 can also include a Real-Time Kinematic (RTK) component that is configured to enhance the precision of position data derived from the GNSS signal. Location sensors 354 can include various other sensors, including other satellite-based sensors, cellular triangulation sensors, dead reckoning sensors, etc.

Heading/speed sensors 356 are configured to determine a heading and speed at which mobile machine 100 is traversing the worksite during the operation. This can include sensors that sense the movement of ground-engaging elements (e.g., wheels or tracks 144 or 244) or can utilize signals received from other sources, such as location sensors 354.

Terrain sensors 348 are configured to sense characteristics of the worksite surface (e.g., field 206) over which mobile machine 100 is traveling. For instance, terrain sensors 348 can detect the topography of the worksite (which may be downloaded as a topographic map or sensed with sensors) to determine the degree of slope of various areas of the worksite, to detect a boundary of the field, to detect obstacles or other objects on the field (e.g., rocks, root-balls, trees, etc.), among other things.

Weather sensors 350 are configured to sense various weather characteristics relative to the worksite. For example, weather sensors 350 can detect the direction and speed of wind traveling over the worksite. Weather sensors 350 can detect precipitation, humidity, temperature, as well as numerous other conditions. This information can be obtained from a remote weather service as well.

Other sensors 352 can include, for example, operating parameter sensors that are configured to sense characteristics relative to the machine settings or operation of various components of mobile machine 100 or vehicles 370.

Sensors 310 can comprise any number of different types of sensors. Such as potentiometers, Hall Effect sensors, various mechanical and/or electrical sensors. Sensors 310 can also comprise various electromagnetic radiation (ER) sensors, optical sensors, imaging sensors, thermal sensors, LIDAR, RADAR, Sonar, radio frequency sensors, audio sensors, inertial measurement units, accelerometers, pressure sensors, flowmeters, etc. Additionally, while multiple sensors are shown detecting or otherwise sensing respective characteristics, sensors 310 can include a sensor configured to sense or detect a variety of the different characteristics and can produce a single sensor signal indicative of the multiple characteristics. For instance, sensors 310 can comprise an imaging sensor mounted at various locations within mobile machine 100 or vehicles 370. The imaging sensor can generate an image that is indicative of multiple characteristics relative to both mobile machine 100 and vehicles 370 as well as their environment (e.g., agricultural surface 110). Further, while multiple sensors are shown, more or fewer sensors 310 can be utilized.

Additionally, it is to be understood that some or all of the sensors 310 can be a controllable subsystem of mobile machine 100. For example, control system 304 can generate a variety of action signals to control the operation, position (e.g., height, orientation, tilt, etc.), as well as various other operating parameters of sensors 310. For instance, because the vegetation on the worksite can obscure the line of view of perception systems 342, control system 304 can generate action signals to adjust the position or orientation of perception systems 342 to thereby adjust their line of sight. These are examples only. Control system 304 can generate a variety of action signals to control any number of operating parameters of sensor(s) 310.

Controllable subsystems 302 illustratively include position subsystem(s) 314, steering subsystem 316, propulsion subsystem 318, and can include other subsystems 320 as well. The controllable subsystems 302 are now briefly described.

Position subsystem(s) 314 are generally configured to control the position (e.g., height, orientation, tilt, etc.) or otherwise actuate movement of various components of mobile machine 100. Position subsystem(s) 314, itself, can include header position subsystem 322, boom position subsystem 324, and can include other position subsystems 326 as well. Header position subsystem 322 is configured to controllably adjust the position (e.g., height, orientation, tilt, etc.) or otherwise actuate movement of header 104 on combine 101. Header position subsystem 322 can include a number of actuators (such as electrical, hydraulic, pneumatic, mechanical or electromechanical actuators, as well as numerous other types of actuators) that are coupled to various components to adjust a position (e.g., height, orientation, tilt, etc.) of header 104 relative to the worksite surface (e.g., surface of field). For instance, upon the detection of an upcoming shift in topography (e.g., detection of a rut or a soil buildup, an obstacle, etc.) on the worksite surface, action signals can be provided to header position subsystem 322 to adjust the position (e.g., height, orientation, tilt, etc.) of header 104 relative to the worksite surface.

Boom position subsystem 324 is configured to controllably adjust the position (e.g., height, orientation, tilt, etc.) or otherwise actuate movement of boom 210, including individual boom arms 212 and 214. For example, boom position subsystem 324 can include a number of actuators (such as electrical, hydraulic, pneumatic, mechanical or electromechanical actuators, as well as numerous other types of actuators) that are coupled to various components to adjust a position or orientation of boom 210 or individual boom arms 212 and 214. For instance, upon the detection of characteristics relative to the topography of agricultural surface 206 (e.g., detection of a rut, soil buildup, an obstacle, etc. on agricultural surface 206), action signals can be provided to boom position subsystem 324 to adjust the position of boom 210 or boom arms 212 or 214 relative to agricultural surface 206.

Other position subsystems 326 can include a nozzle position subsystem configured to controllably adjust the position (e.g., height, orientation, tilt, etc.) or otherwise actuate movement of nozzles 208. The nozzle position subsystem can include a number of actuators (such as electrical, hydraulic, pneumatic, mechanical or electromechanical actuators, as well as numerous other types of actuators) that are coupled to various components to adjust a position (e.g., height, orientation, tilt, etc.) of nozzles 208. For example, upon the detection of an upcoming shift in topography (e.g., detection of a rut, soil buildup, an obstacle, etc.) or an upcoming shift in the height of vegetation (e.g., height of crop, weeds, etc.) on agricultural surface 206, action signals can be provided to the nozzle position subsystem to adjust the position (e.g., height, orientation, tilt, etc.) of nozzles 208 relative to agricultural surface 206 or relative to vegetation on agricultural surface 206.

Steering subsystem 316 is configured to control the heading of mobile machine 100, by steering the ground engaging elements (e.g., wheels or tracks 144 or 244). Steering subsystem 316 can adjust the heading of mobile machine 100 based on action signals generated by control system 304. For example, based on sensor signals generated by sensors 310 indicative of a change in topography, control system 304 can generate action signals to control steering subsystem 316 to adjust the heading of mobile machine 100. In another example, control system 304 can generate action signals to control steering subsystem 316 to adjust the heading of mobile machine 100 to comply with a commanded route, such as an operator or user commanded route, or, and as will be described in more detail below, a route based on a topographic confidence map generated by topographic confidence system 330, as well as various other commanded routes. The route can also be commanded based upon characteristics of the environment in which mobile machine 100 is operating that are sensed or otherwise detected by sensors 310. Such as characteristics sensed or detected by perception systems 342 on mobile machine 100 or vehicles 370. For example, based on an upcoming shift in the topography, such as a rut, at the worksite, sensed by perception systems 342, a route can be generated by control system 304 to change the heading of mobile machine 100 to avoid the rut.

Propulsion subsystem 318 is configured to propel mobile machine 100 over the worksite surface, such as by driving movement of ground engaging elements (e.g., wheels or tracks 144 or 244). It can include a power source, such as an internal combustion engine or other power source, a set of ground engaging elements, as well as other power train components. In one example, propulsion subsystem 318 can adjust the speed of mobile machine 100 based on action signals generated by control system 304, which can be based upon various characteristics sensed or detected by sensors 310, a topographic confidence map generated by topographic confidence system 330, as well as various other bases, such as operator or user inputs.

Other subsystem(s) 320 can include various other subsystems, such as a substance delivery subsystem on sprayer 202. The substance delivery subsystem can include one or more pumps, one or more substance tanks, flow paths (e.g., conduits), controllable valves (e.g., pulse width modulation valves, solenoid valves, etc.), one or more nozzles (e.g., nozzles 208), as well as various other items. The one or more pumps can be controllably operated to pump substance (e.g., herbicide, pesticide, insecticide, fertilizer, etc.) along a flow path defined by a conduit to nozzles 208 which can be mounted on and spaced along boom 210, as well as mounted at other locations within sprayer 202. In one example, a number of controllable valves can be placed along the flow path (e.g., a controllable valve associated with each of nozzles 208) that can be controlled between an on (e.g., open) and off (e.g., closed) position, to control the flow of substance through the valves (e.g., to control the flow rate).

The substance tanks can comprise multiple hoppers or tanks, each configured to separately contain a substance, which can be controllably and selectively pumped by the one or more pumps through the flow path to spray nozzles 208. The operating parameters of the one or more pumps can be controlled to adjust a pressure or a flow rate of the substance, as well as various other characteristics of the substance to be delivered to the worksite.

Nozzles 208 are configured to apply the substance to the worksite (e.g., field 206) such as by atomizing the substance. Nozzles 208 can be controllably operated, such as by action signals received from control system 304 or manually by an operator 264. For example, nozzles 208 can be controllably operated between on (e.g., open) and off (e.g., closed). Additionally, nozzles 208 can be individually operated to change a characteristic of the spray emitted by nozzles 208, such as a movement (e.g., a rotational movement) of nozzles 208 that widens or narrows the flow path through and out of nozzles 208 to affect the pattern, the volume, as well as various other characteristics, of the spray.

Control system 304 is configured to receive or otherwise obtain various data and other inputs, such as sensor signals, user or operator inputs, data from data stores, and various other types of data or inputs. Based on the data and inputs, control system 304 can make various determinations and generate various action signals.

Control system 304 can include topographic confidence system 330. Topographic confidence system 330 can, based on information accessed within data stores (e.g., 208, 378, etc.) or data received from sensors (e.g., 310, 382, etc.), determine a confidence level in the topographic characteristics of a worksite indicated by a prior topographic map and generate various topographic confidence outputs indicative of the determined topographic confidence level. For example, topographic confidence system 330 can generate topographic confidence outputs as representations indicative of the topographic confidence level for the worksite or for various portions of the worksite. These representations can be numeric, such as percentages (e.g., 0%-100%) or scalar values, gradation or scaled (e.g., A-F, "high, medium, low", 1-10, etc.), advisory (e.g., caution, proceed, slow, scout first, no crop, etc.), as well as various other representations. Additionally, topographic confidence system 330 can generate, as a topographic confidence output, a topographic confidence map that indicates the topographic confidence level for the worksite or particular portions of the worksite.

The topographic confidence outputs can be used by control system 304 to generate a variety of action signals to control an action of mobile machine 100 as well as other components of computing architecture 300, such as vehicles 370, remote computing systems 368, etc. For example, based on the topographic confidence output, control system 304 can generate an action signal to provide an indication (e.g., alert, display, notification, recommendation, etc.) on a variety of interfaces or interface mechanisms, such operator interfaces 360 or user interfaces 364. The indication can include an audio, visual, or haptic output. In another example, based on the topographic confidence output, control system 304 can generate an action signal to control an action of one or more of the various components of computing architecture 300, such as operating parameters of one or more of controllable subsystems 302 or controllable subsystems 380. For instance, based on the topographic confidence output, control system 304 can generate an action signal to control position subsystem(s) 314 to control a position (e.g., height, orientation, tilt, etc.) of header 104 or boom 210. Control system 304 can also control steering subsystem 316 to control a heading of mobile machine 100, and propulsion subsystem 318 to control a speed of mobile machine 100. Control system 304 can also control various other subsystems, such as substance delivery subsystem to control the delivery of substance to the worksite. These are examples only. Control system 304 can generate any number of action signals based on a topographic confidence output generated by topographic confidence system 330 to control any number of actions of the components in computing architecture 300.

Control system 304 can include various other items 334, such as other controllers. For example, control system 304 can include a dedicated controller corresponding to each one of the various controllable subsystems. Such dedicated controllers may include a spraying subsystem controller, a boom position subsystem controller, a steering subsystem controller, a propulsion subsystem controller, as well as various other controllers for various other controllable subsystems. Additionally, control system 304 can include various logic components, for example, image processing logic. Image processing logic can process images generated by sensors 310 (e.g., images generated by perception systems 342), to extract data from the images. Image processing logic can utilize a variety of image processing techniques or methods, such as RGB, edge detection, black/white analysis, machine learning, neural networks, pixel testing, pixel clustering, shape detection, as well any number of other suitable image processing and data extraction techniques and/or methods.

FIG. 12 also shows that data stores 308 can include map data 336, supplemental data 338, as well as various other data 340. Map data 336 can include one or more topographic maps of a worksite that indicate topographic characteristics (e.g., slope, elevation, etc.) at geographic locations of the worksite. The topographic maps can include georeferenced data represented in various ways, such as geotagged data, rasters, polygons, point clouds, as well in various other ways. The map can be generated based on outputs from sensors, such as imaging sensors (e.g., stereo, lidar, etc.) during a survey or fly-over of the worksite as well from previous passes or operations of a mobile machine on the worksite. These topographic maps may be generated (particularly when based on overhead imaging) on the basis of data that is collected during a bare field condition when the field surface has substantially no obscurity due to vegetation, such as during post-harvest, prior to planting, right after planting, etc. The topographic maps can be used in the control of mobile machine 100 as it travels over the worksite, or, as will be described further below, as a baseline.

Supplemental data 338 can include a variety of data indicative of various characteristics relative to the worksite or relative to the environment of the worksite that is obtained or collected at a time later than the time the data for the prior topographic map was collected. In one example, supplemental data 338 includes any of a variety of data that can indicate a characteristic or condition that can affect the topography of the worksite. This can include data obtained or collected prior to mobile machine 100 operating on the worksite as well as in-situ data (e.g., from sensors 310 or 382). Supplemental data can include weather data (e.g., rain, snow, ice, hail, wind, as well as weather events such as tornadoes, hurricanes, storms, tsunamis, etc.), environmental data (e.g., waves and tides), event data (e.g., fires, volcanoes, floods, earthquakes, etc.), additional topographic data (e.g., generated by sensors on a machine traveling over the worksite such as a survey, fly over, additional operation, etc.), vegetation data (e.g., images of the vegetation, crop type, weed type, density, height, Vegetation Index, vegetation state data, etc.), activity data (e.g., data that indicates that human activity occurred on the worksite, such as operations of other machines, etc.), additional images of the worksite, as well as various other supplemental data. Supplemental data can be obtained from various sources, such as machines doing surveys or flyovers of the worksite, various other sensors, weather stations, news sources, operator or user inputs, as well as a variety of other sources. Supplemental data can also be obtained or collected by and received from sensors mobile machine 100 or sensors on vehicles 370 during operation (e.g., in-situ) or prior to operation.

The supplemental data can be indicative of a variety of characteristics relative to the worksite or the environment of the worksite. Based on the supplemental data, topographic confidence system 330 can determine a confidence in the topographic characteristics of the worksite indicated by a prior topographic map. In one example, topographic confidence system 330 can determine whether a change to the topography of the worksite has occurred or has likely occurred based on the indications provided by the supplemental data. For example, if certain weather conditions have occurred (e.g., certain levels of rainfall) after the data for the prior topographic map was collected, topographic confidence system 330 can determine that the topography at the worksite, or the topography at particular geographic locations within the worksite, has changed or has likely changed. This is merely an example. Topographic confidence system 330 can determine a confidence in the topographic characteristics of the worksite or of particular geographic locations within the worksite based on any number of indications provided by supplemental data, and any combinations thereof. Further, it will be noted that the term likely means, in one example, a threshold likelihood or probability that a current topography characteristic deviates by a threshold amount from characteristics indicated by the prior topographic map. In one example, the threshold can be input by an operator or user or set automatically by topographic confidence system indicating a level of deviation from the characteristics indicated by the prior topographic map.

Other data 340 can include a variety of other data, such as historical data relative to operations on the worksite, historical data relative to characteristics and conditions of the worksite (e.g., historical topographic characteristics) or the environment of the worksite (e.g., historical data relative to prior events), as well as historical data indicative of the occurrence of topographic changes to the worksite due to various events (e.g., weather). This type of information can be used by topographic confidence system 330 to determine a likelihood of a change in topographic characteristics occurring or having occurred presently.

Figure 13:
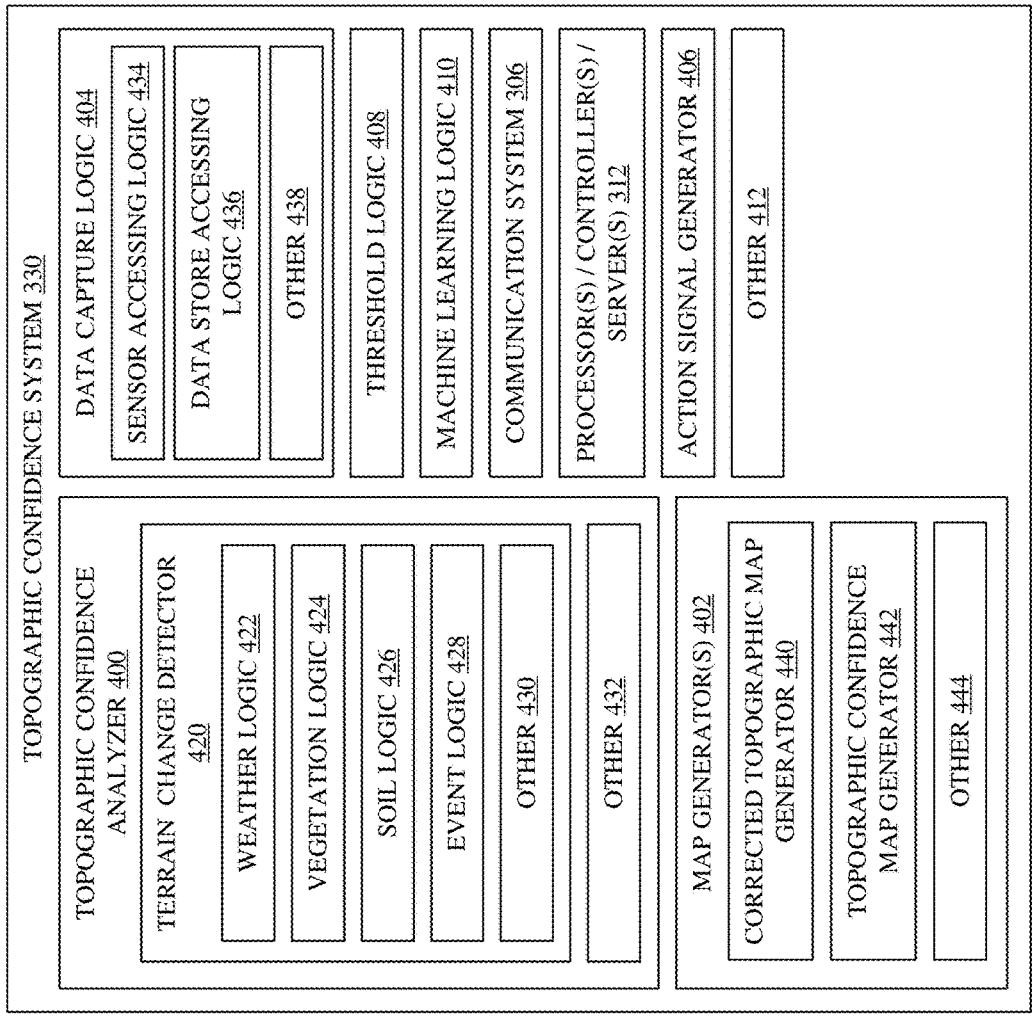
FIG. 13 is a block diagram of one example of a topographic confidence system, in more detail.

FIG. 13 is a block diagram illustrating one example of topographic confidence system 330 in more detail.

Figure 14:
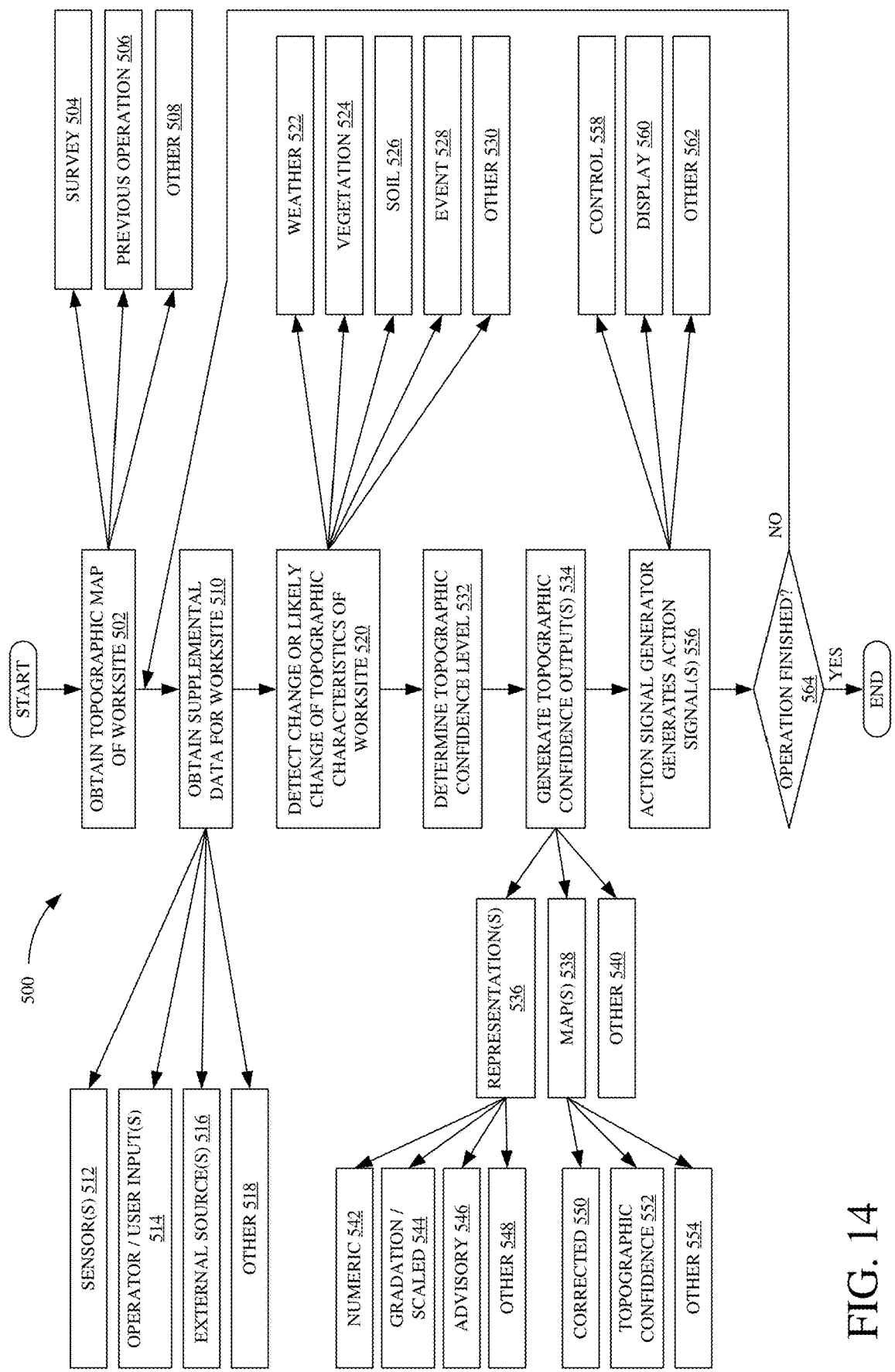
FIG. 14 is a flow diagram showing example operations of the topographic confidence system illustrated in FIG. 13.

FIG. 14 is a flow diagram showing an example of the operation of the topographic confidence system 330 shown in FIG. 13 in determining a confidence in the topographic characteristics of the worksite as indicated by a prior topographic map based on supplemental data and generating a topographic confidence output based on the determination. It is to be understood that the operation can be carried out at any time or at any point through an agricultural operation, or even if an agricultural operation is not currently underway. Further, while the operation will be described in accordance with mobile machine 100, it is to be understood that other machines with a topographic confidence system 330 can be used as well.

Processing begins at block 502 where data capture logic 404 obtains a topographic map of a worksite. The topographic map can be based on a survey of the worksite (e.g., an aerial survey, a satellite survey, a survey by a ground vehicle, etc.) as indicated by block 504, data from a previous operation on the worksite (e.g., row data, pass data, etc.) as indicated by block 506, as well as based on various other data, as indicated by block 508.

Once a topographic map of the worksite has been obtained at block 502, processing proceeds at block 510 where data capture logic 404 obtains supplemental data for the worksite. The supplemental data can be obtained or otherwise received from various sensor(s) as indicated by block 512, operator/user input as indicated by block 514, various external sources (e.g., weather stations, the Internet, etc.) as indicated by block 516, as well as from various other sources of supplemental data, as indicated by block 518.

Once the data is obtained at blocks 502 and 510, processing proceeds at block 520 where, based on the topographic map and the supplemental data, terrain change detector 420 of topographic confidence system 330 detects a change or a likely change in the topographic characteristics of the worksite (as indicated by the topographic map) based on characteristics of the worksite or the environment of the worksite as indicated by the supplemental data. These characteristics can be weather characteristics indicated by weather data and analyzed by weather logic 422 as indicated by block 522, vegetation characteristics indicated by vegetation data and analyzed by vegetation logic 424 as indicated by block 524, soil characteristics indicated by soil data and analyzed by soil logic 426 as indicated by block 526, event characteristics indicated by event data and analyzed by event logic 428 as indicated by block 528, as well as a variety of other characteristics analyzed by various other logic, as indicated by block 530.

Processing proceeds at block 532 where, based on the detected change or likely change to the topographic characteristics of the worksite, topographic confidence analyzer 400 of topographic confidence system 330 determines a topographic confidence level indicative of a confidence in the topographic characteristics of the worksite or the topographic characteristics of particular geographic locations within the worksite, as indicated by the topographic map.

Processing proceeds at block 534 where, based on the topographic confidence level(s), topographic confidence system 330 generates topographic confidence output(s). The topographic confidence outputs can include representation(s) of the topographic confidence level(s) as indicated by block 536, maps as indicated by block 538, as well as various other outputs, as indicated by block 540. The representations(s) at block 536 can include numeric representations, such as percentages or scalar values, as indicated by block 542, gradation and/or scaled values, such A-F, "high, medium, low", 1-10, as indicated by block 544, advisory representations, such as caution, proceed, slow, scout first, no crop, as indicated by block 546, as well as various other representations, including various other metrics and/or values, as indicated by block 548.

The maps at block 538 can be generated by map generator(s) 402 and can include corrected topographic maps as indicated by block 550, topographic confidence maps as indicated by block 552, as well as various other maps, as indicated by block 554. In one example, other maps can include a map that includes both corrected topographic information and topographic confidence level(s).

In one example, once topographic confidence output(s) have been generated at block 534, processing proceeds at block 556 where action signal generator 406 generates one or more action signal(s). In one example, action signals can be used to control the operation of one or more machines, such as one or more controllable subsystems 302 of mobile machine 100, vehicles 370, etc., as indicated by block 558. For instance, action signal generator 406 can generate action signals to control the speed of mobile machine 100, or the route of mobile machine 100, adjust the position of header 104 or boom 210 above the surface of the worksite, adjust an operating parameter of the spraying subsystem of sprayer 201, as well as a variety of other operations or machine settings. In another example, a display, recommendation, or other indication can be generated to an operator 362 on an operator interfaces 360 or to a remote user 366 on a user interface 364. The display can include an indication of the topographic confidence level, a display of a map, such as a corrected topographic map or a topographic confidence map. Any number of various other action signal(s) can be generated by action signal generator 406 based on the topographic confidence output(s), as indicated by block 562.

Processing proceeds at block 564 where it is determined whether the operation of mobile machine 100 is finished at the worksite. If, at block 564, it is determined that the operation has not been finished, processing proceeds at block 510 where additional supplemental data is obtained. If, at block 564, it is determined that the operation has been finished, then processing ends.

FIGS. 15-20 are pictorial illustrations of examples of the various maps that can be used by or generated by a topographic confidence system 330 shown in FIG. 13.

Figure 15:
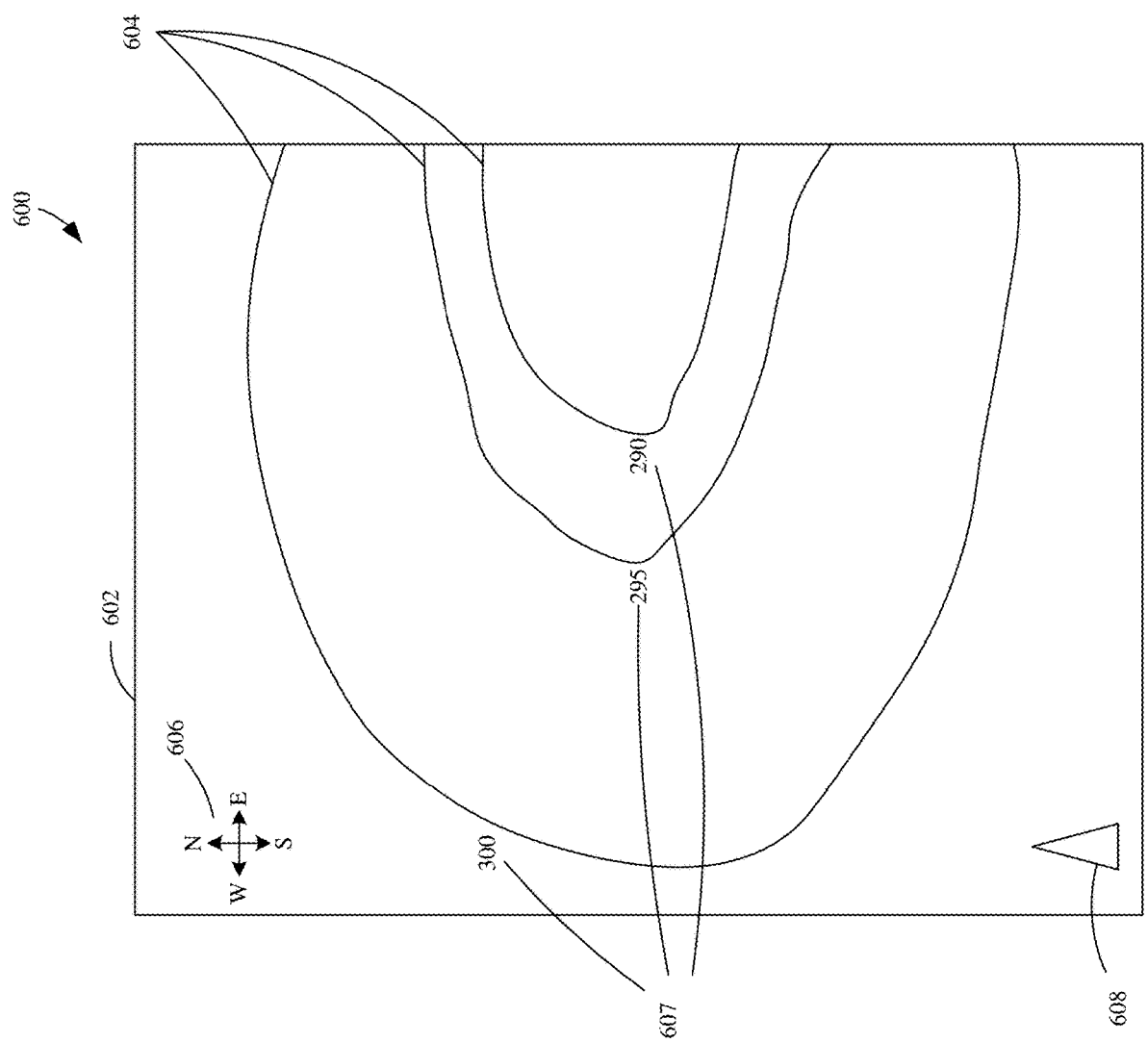
FIGS. 15-20 are pictorial illustrations showing example maps that can be generated by the topographic confidence system illustrated in FIG. 13.

FIG. 15 is one example of a prior topographic map 600 of a worksite that can be obtained and used by topographic confidence system 330. Prior topographic map 600 shows topographic characteristics of worksite 602 upon which mobile machine 100 is to operate. Topographic map 600 can include contour lines 604, compass rose 606, topographic representations 607, and mobile machine indicator 608. While certain items are illustrated in FIG. 15, it will be understood that topographic map 602 can include various other items. Generally speaking, prior topographic map 600 indicates topographic characteristics of worksite 602 such as elevation of a surface of worksite 602 relative to a reference value (typically sea level) as indicated by topographic representations 607. Topographic map 600 further includes compass rose 606 to indicate the disposition of worksite 602 and items on map 600 or worksite 602 relative to North, South, East, and West. Topographic map 600 can further include an indication of the position and/or heading of mobile machine 100, as represented by indicator 608 which is shown in the southwestern corner of worksite 602 heading North. Contour lines 604 can further indicate, beyond a location of the elevation as represented by topographic representations 607, other topographic characteristics, such as characteristics of the slope of worksite 602. For instance, the distance between contour lines 604 generally indicates the slope of terrain at worksite 602.

Figure 16:
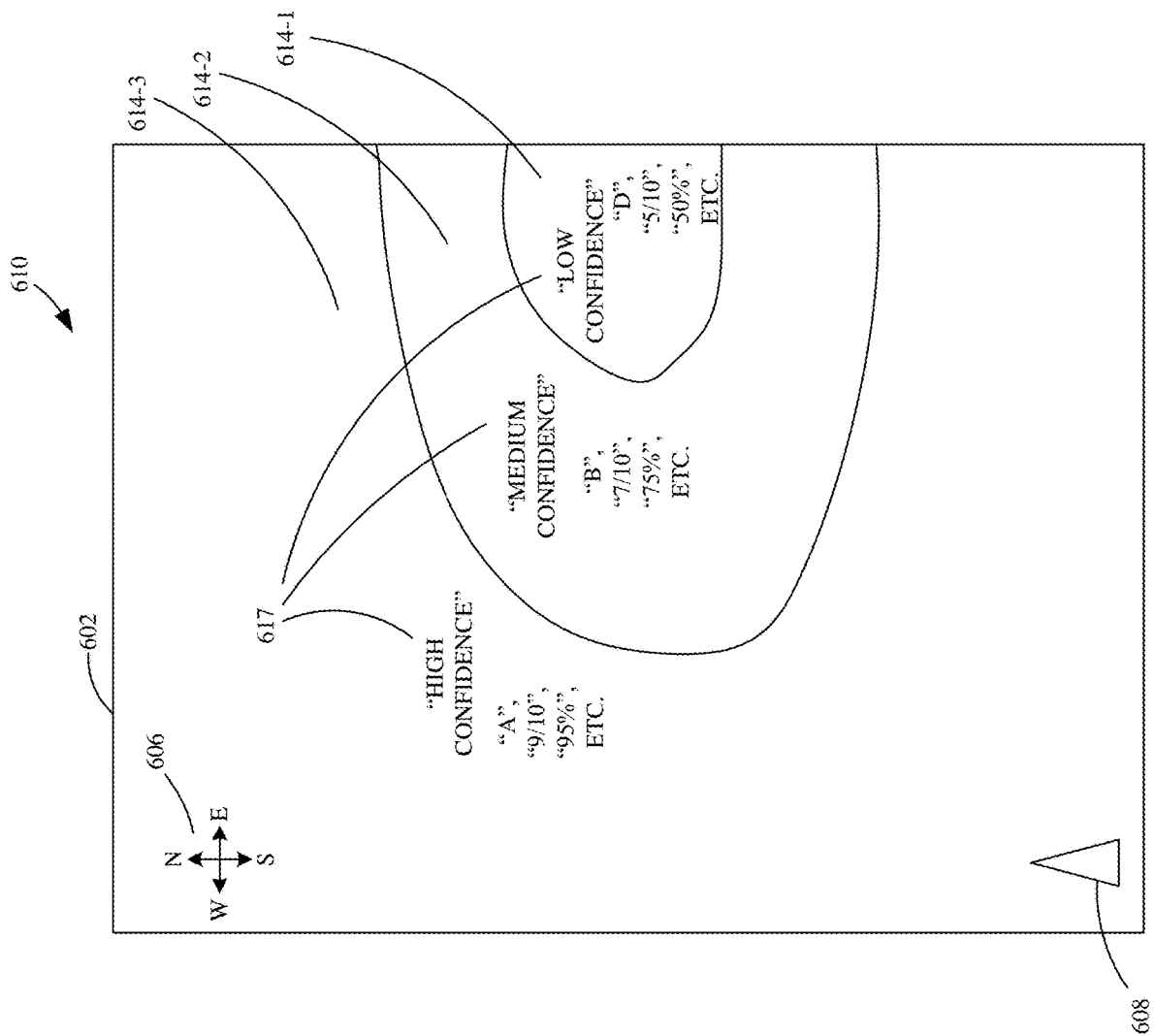

FIG. 16 is one example of a topographic confidence map 610 that can be generated by topographic confidence system 330, based on a prior topographic map, such as map 600 and supplemental data relative to worksite 602 or the environment of worksite 602. Topographic confidence map 610 generally indicates a confidence level in the topographic characteristics of worksite 602 that are shown on prior topographic map 600. As can be seen, topographic confidence map 610 can include topographic confidence zones 614 (shown as 614-1 to 614-3) and topographic confidence level representations 617. A number of different examples of topographic confidence level representations 617 are shown in FIG. 16. For instance, FIG. 16 shows that representations 617 can be numeric representations (e.g., 95%) as well as gradation and/or scaled representations (e.g., A-F, 1-10, "high, medium, low", etc.). As can be seen, the topographic confidence level and the corresponding topographic confidence level representations can vary across worksite 602, as indicated by confidence zones 614-1 to 614-3.

In one example, topographic confidence system 330 may have received supplemental data indicating that worksite 602 received heavy rain (e.g., 4 inches in an hour), that the crop residue cover on worksite 602 is only 5%, and that the tillage direction is east-to-west. Based on this supplemental data, topographic confidence system 330 can determine that a change in the topographic characteristics of worksite 602 and/or of particular geographic locations within worksite 602 has occurred or has likely occurred. For example, based on the topographic characteristics (such as elevation, slope, etc.), as indicated by prior topographic map 600, of worksite 602, the amount of rainfall, the tillage direction and the amount of crop residue cover, topographic confidence system 330 can determine that the area of the field represented by 614-1 likely experienced a change in topography due to a washout on worksite 602 (which likely caused a change in topography, such as material or sediment build-up in the area of the field represented by 614-1), and thus indicates that the confidence level in the topographic characteristics for that area is "low" (or some other representation). This is because material and sediment from higher areas on the field (such as 614-2) may wash away and accumulate in a lower and flatter areas of the field (such as 614-1) when the worksite 602 experiences heavy rain. Additionally, due to the relative size of the area of the field represented by 614-1, the amount or severity of deviation from the topographic characteristics of that area, as indicated by the prior topographic map, may be greater, and thus the confidence may be relatively lower. Similarly, while the area represented by 614-2 may have experienced some change to the topographic characteristics, as indicated by the prior topographic map, due to the relative size of the area of the field represented by 614-2, the amount or severity of deviation from the topographic characteristics of that area, as indicated by prior topographic map, may be less, and thus the confidence value may be relatively higher. For instance, the confidence level for area 614-2 may be "medium" because a change may still have occurred in the area, but due to the relative size of the area, the change may be less likely to be significant (e.g., the change may be more gradual across the area). Extending further West on the worksite 602 into the area represented by 614-3, confidence system 330 can determine that a washout (or some other form of erosion) is unlikely to have occurred or at least that it is unlikely that something occurred which would affect or likely affect the topographic characteristics as indicated by prior topographic map 600, as compared to the areas represented by 614-1 and 614-2. Topographic confidence system 330 thus indicates that the confidence level in the topographic characteristics for that area is "high" (or some other representation). For instance, it may be "high" because area 614-3 is higher, flatter, and larger, as compared to surrounding areas of worksite 602, and thus the likelihood a change or a significant change to the topographic characteristics of area 614-3 may be less when the worksite 602 experiences heavy rain.

It will be noted that this is merely an example, and that various other characteristics of the worksite or the environment of the worksite, including various other characteristics indicated by supplemental data, can be considered by topographic confidence system 330. In the example provided, the topographic characteristics of elevation and slope, and the characteristics provided by the supplemental data, such as precipitation, tillage direction, and crop residue can have an effect on the amount of water runoff at worksite 602, and thus can affect the likelihood and/or level of erosion and/or material or sediment build-up or drift at worksite 602. Additionally, it is to be understood that topographic confidence system 330 can use any number of models in determining the topographic confidence level, for instance, in the provided example, a water runoff model or an erosion model.

Figure 17:
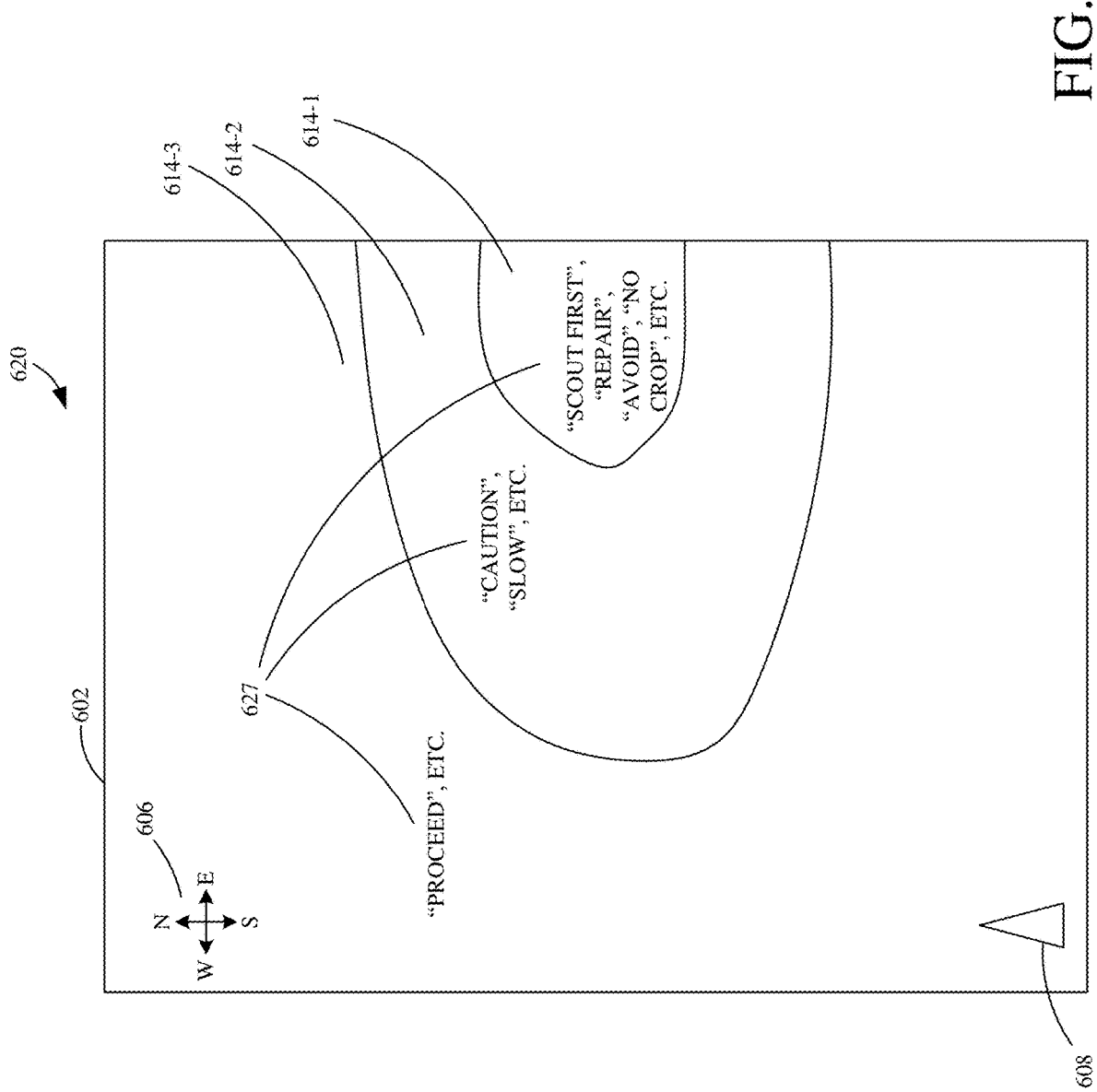

FIG. 17 is one example of a topographic confidence map 620 that can be generated by topographic confidence system 330, based on a prior topographic map, such as map 600 and supplemental data relative to worksite 602 and/or the environment of worksite 602. Topographic confidence map 620 is similar to topographic confidence map 610 except that the topographic confidence level is represented by advisory topographic confidence level representations 627, which can indicate an action to be taken or a recommendation of an action to be taken either while operating on worksite 602 or prior to operating on worksite 602. As described above, the topographic confidence level can vary across worksite 602, as represented by topographic confidence zones 614 (shown as 614-1 to 614-3). Each of the zones 614 can have a different advisory topographic confidence level as represented by 627. In this way, the control of machine 100 as it operates across worksite 602 can also vary depending on which confidence zone 614 it is operating within. In one example, confidence zones 614 can act as "control zones" for mobile machine 100 such that mobile machine 100 is controlled in a certain manner in one control zone as compared to another control zone.

For example, proceeding with the previous example provided above in FIG. 16, in zone 614-1 where it was determined that a change in the topographic characteristics likely occurred, or at least that the confidence level in the topographic characteristics as indicated by prior topographic map 600 is "low", topographic confidence system 330 can provide an advisory topographic confidence level representation 627, such as, "scout first", "avoid", "no crop", "repair", as well as various other advisory representations. These advisory representations can be used to automatically control machine operation (e.g., by control system 304) or can be used by the operator/user to control the operation of various machines, such as mobile machine 100, vehicles 370, as well as various other components of computing architecture 300.

For instance, in the example of "scout first", topographic confidence system 330 could generate an action signal to automatically control a vehicle (e.g., vehicles 370) to travel to zone 614-1 to collect further data (e.g., via sensors 382) prior to mobile machine 100 operating in zone 614-1, as well as generate an action signal to provide a display, alert, recommendation, or some other indication on an interface or interface mechanism (e.g., on operator interfaces 360, user interfaces 364, as well as various other interfaces or interface mechanisms) that zone 614-1 should first be scouted (e.g., by a human, by a vehicle, etc.) prior to mobile machine 100 operating there. The indication can include audio, visual, or haptic outputs. In other examples, topographic confidence system 330 can generate a route and an action signal to automatically control a heading of mobile machine 100 such that it travels along the edge of zone 614-1 but not into zone 614-1. In such an example, the mobile machine 100 can perform a scouting operation such that, as it travels along the edge of zone 614-1, sensors on-board mobile machine 100 (e.g., sensors 310) or operator 362 can detect characteristics within zone 614-1 prior to operating within zone 614-1. Topographic confidence system 330 can also generate an action signal to provide a display, alert, recommendation, or some other indication, such as a recommended route of mobile machine 100 across worksite 602, on an interface or interface mechanism. The indication can include audio, visual, or haptic outputs. Once additional data for area 614-1 is collected, the topographic confidence level can be dynamically redetermined by topographic confidence system 330 such that operation on worksite 602 can be adjusted. Additionally, in the event that the additional data has a sufficient level of certainty, topographic characteristics of zone 614-1 can be generated, such as in the form of a supplemented or corrected topographic map.

In the example of "avoid", topographic confidence system 330 can generate a route and an action signal to automatically control a heading of mobile machine 100 such that it avoids traveling into zone 614-1, and to generate an action signal to provide a display, alert, recommendation, or some other indication, such as a recommended route of mobile machine 100 across worksite 602, on an interface or interface mechanism. The indication can include audio, visual, or haptic outputs. In one example of "avoid", an advisory representation 627 of "no crop" can instead be displayed. For instance, it may be that the supplemental data indicates that there is no crop to be harvested in zone 614-1 and thus there is no need for mobile machine 100 to operate there, nor is there any need for additional scouting or collection of data.

In the example of "repair", topographic confidence system 330 can generate an action signal to automatically control a machine (e.g., vehicle(s) 370) to travel to zone 614-1 to perform a repair operation on zone 614-1 to correct undesirable topographic characteristics (e.g., to fill in a washout, correct the build-up or drift of materials or sediments by regrading) and, in some examples, return the topography to the levels indicated by map 600, or to some other level as control system 304 or operators 362 or users 366 may desire or determine. Additionally, topographic confidence system 330 can generate an action signal to provide a display, alert, recommendation, or some other indication on an interface or interface mechanism that zone 614-1 should first be repaired (e.g., by a human, by vehicles 370, other machines, etc.) before operation of mobile machine 100 within zone 614-1. The indication can include audio, visual, or haptic outputs.

In zone 614-2 where, in the example of FIG. 17, it was determined that there was a possibility that a change in the topographic characteristics of worksite 602 occurred, or at least that the confidence level in the topographic characteristics indicated by prior topographic map 600 is "medium", topographic confidence system 330 can provide an advisory topographic confidence level representation 627, such as, "caution", "slow", or various other advisory representations. These advisory representations can be used to automatically control machine operation (e.g., by control system 304) or can be used by the operator or user to control the operation of various machines, such as mobile machine 100, vehicles 370, as well as various other components of computing architecture 300.

For instance, in the example of "caution" or "slow", topographic confidence system 330 can generate an action signal to automatically control a machine (e.g., by controlling the propulsion subsystem 318 of mobile machine 100) to travel at a slower speed throughout zone 614-2 as compared to other zones or at a speed slow enough for sensor signals generated by sensors on-board the machine (e.g., sensors 310) to be used to control the operation of the machine in a timely enough fashion to avoid consequences of topographic conditions on worksite 602. As an example, propulsion subsystem 318 of mobile machine 100 may be controlled to propel mobile machine 100 at a speed which allows a sensor signal generated by perception system(s) 342 indicative of an upcoming washout or build-up of material, to be used to adjust the height or orientation of header 104 or boom 210 to compensate for the topographic change caused by the upcoming washout or build-up of material so that header 104 won't run into the ground or miss the crop, or so that boom 210 will remain at a desired position, such as above the crop canopy. Additionally, topographic confidence system 330 can generate an action signal to provide a display, alert, recommendation, or some other indication on an interface or interface mechanism, such as an indication to the operator or user that the speed of the machine should be reduced, an indication that the operator should pay particularly close attention to the worksite surface ahead of the machine, or various other indications. The indication can include an audio, visual, or haptic output.

In zone 614-3, in the example of FIG. 17, it was determined that a change in the topographic characteristics of worksite 602 was unlikely, or at least that the confidence level in the topographic characteristics as indicated by prior topographic map is "high". Therefore, topographic confidence system 330 can provide an advisory topographic confidence level representation 627, such as, "proceed" or various other advisory representations. For example, topographic confidence system 330 can generate an action signal to automatically control a machine (e.g., mobile machine 100) to operate based on the topographic characteristics indicated by prior topographic map 600. Additionally, topographic confidence system 330 can generate an action signal to provide a display, alert, recommendation, or some other indication on an interface or interface mechanism to the operator or user so the operator or user can use prior topographic map 600 for operating mobile machine 100. The indication can include an audio, visual, or haptic output. Topographic confidence system 330 can generate control signals to control various other components of computing architecture 300, as well as various other machines, at least while in zone 614-3.

Indicator 608 provides an indication of the location and heading of mobile machine 100 on worksite 602, and, in some examples, topographic confidence system 330 can generate an action signal to control an operation of mobile machine 100 as well as to provide a display, alert, recommendation, or some other indication on an interface or interface mechanism based on the position of mobile machine 100 on worksite 602. The indication can include an audio, visual, or haptic output. For instance, topographic confidence system 330 can automatically control the machine to change operation upon exit from one zone 614 and entrance into another zone 614, such as automatically adjusting the speed of the machine upon exit from zone 614-3 and entrance into zone 614-2. Additionally, topographic confidence system 330 can provide an indication to the operator that the machine has entered a different zone.

Figure 18:
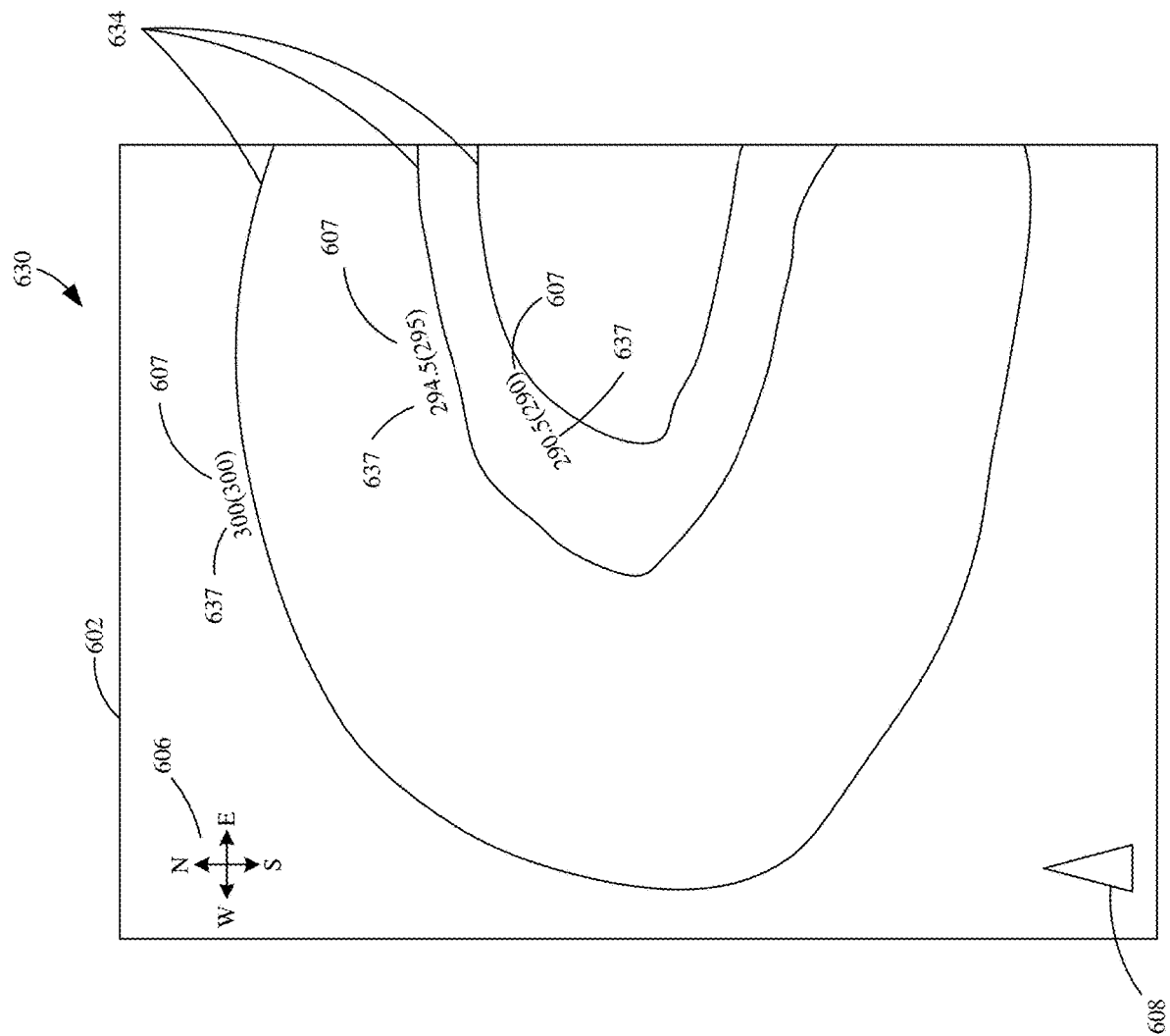

FIG. 18 is one example of a corrected topographic map 630 of a worksite that can be generated by topographic confidence system 330, based on supplemental data relative to worksite 602 or the environment of worksite 602. As described above, in some instances the collected supplemental data will provide an accurate or relatively accurate indication of the topographic characteristics of the worksite such that the actual or a substantial approximation of the actual topographic characteristics of the worksite can be determined by topographic confidence system 330. For instance, a subsequent aerial survey of worksite 602 (performed sometime after the data was collected for the prior topographic map 600) can provide sensor signal(s) (e.g., images) that provide accurate indications of the topographic characteristics of worksite 602. For example, the subsequent aerial survey may have been performed at a time when the surface of worksite 602 was still detectable (e.g., vegetation did not yet obscure detection). In one example, corrected topographic map 630 can be generated and used as a new baseline to replace prior topographic map 600. In another example, and particularly if corrected topographic map 630 is generated at a time close enough to the performance of the operation on worksite 602 (e.g., harvesting, spraying, etc.), it can be used by control system 304 or operator 362 or user 366 to control of mobile machine 100 as well as other components of computing architecture 300.

As shown in FIG. 18, corrected topographic map 630 is similar to prior topographic map 600. Corrected topographic map 630 can include topographic representations 637 which indicate the corrected elevation of the surface of worksite 602 relative to a reference level (e.g., sea level) and can also include corrected contour lines 634. In the example shown, corrected topographic map 630 can include topographic representations 607 which indicate the elevation of the surface of worksite 602 relative to a reference level as indicated by the prior topographic map 600. As shown in FIG. 18, topographic representations 607 are bracketed, such that the operator or user can differentiate them from the corrected topographic values as represented by topographic representations 637, though this need not be the case. Representations 607 and 637 can be differentiated in any number of ways, such as different colors, different fonts, as well various other stylistic differences. Additionally, the previous contour lines indicated by prior topographic map 600 can also be displayed on corrected topographic map 630 and displayed in any number of ways to differentiate them, such as using dashed lines, different colors, as well as various other stylistic differences. In another example, the previous topographic characteristics, such as the previous topographic characteristics represented by topographic representations 607, need not be displayed. As illustrated in FIG. 18, corrected topographic map 630 shows that worksite 602 experienced a change in topography, such as a washout (or erosion) in higher areas of the field, thus decreasing their elevation, which subsequently caused material build-up in lower areas of the field, thus increasing the elevation in the lower areas of the field.

Figure 19:
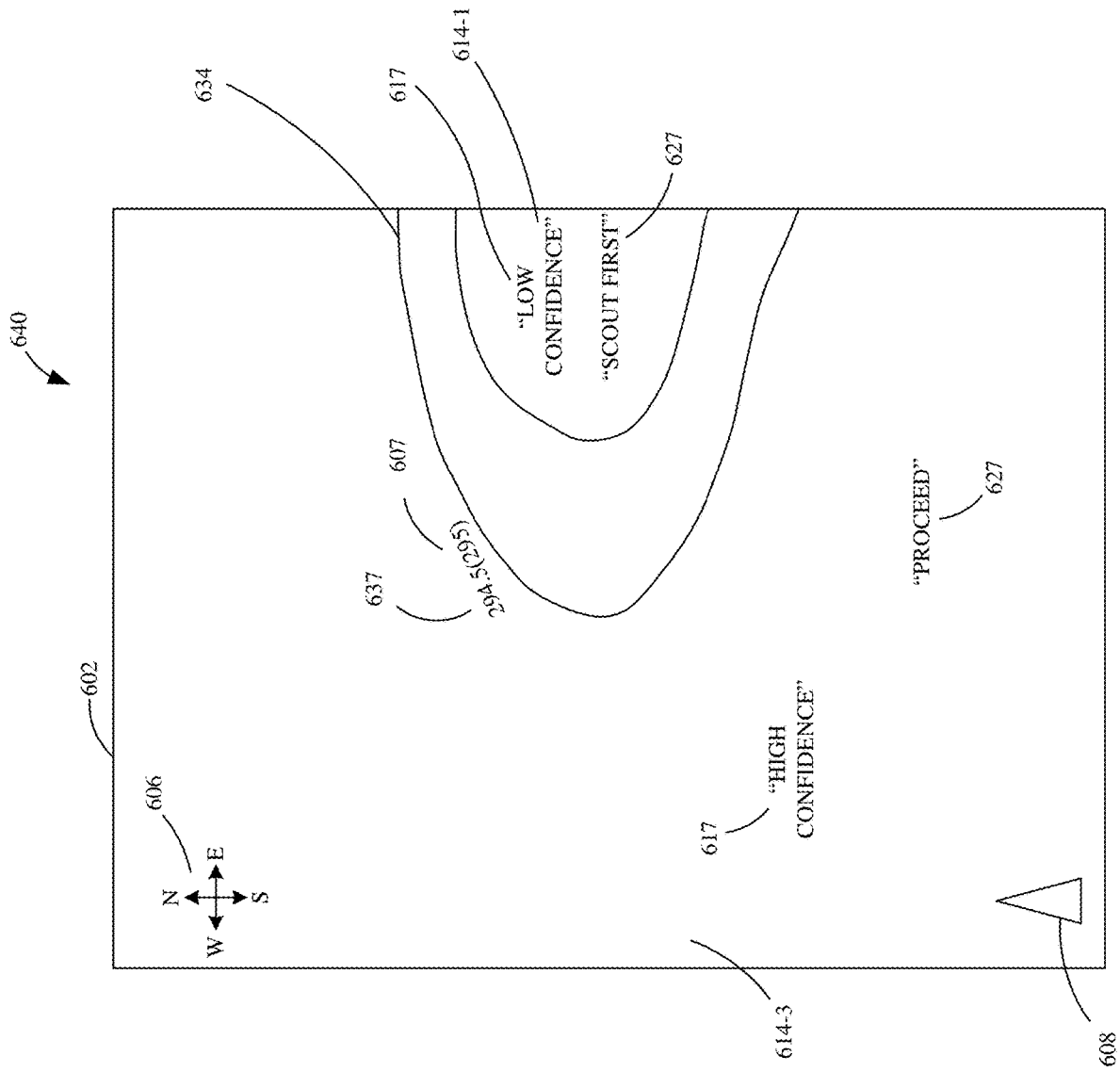

FIG. 19 is one example of a mixed topographic map 640 of a worksite that can be generated by topographic confidence system 330, based on a prior topographic map, such as map 600 and supplemental data relative to worksite 602 or the environment of worksite 602. In some examples, supplemental data can, for at least some areas of the worksite, provide indications of topographic characteristics of worksite 602 that are of a sufficient level of certainty or accuracy such that corrected topographic characteristics can be generated, while some of the supplemental data can, for other areas of the worksite, be used to determine a confidence level in the topographic characteristics as indicated by the prior topographic map. For instance, in some areas of worksite 602, a surface of worksite 602 may be detectable such that the elevation of the surface relative to a reference (e.g., sea level) can be determined, while for other areas, the surface of the worksite may not be detectable. For example, vegetation (as well as other obscurants) may prevent detection in some areas, while not preventing detection in other areas.

In such examples, a mixed topographic map 640 can be generated that includes both representations of corrected topographic characteristics (as indicated by corrected contour lines 634 and corrected topographic representations 637) as well as representations of topographic confidence levels (as represented by confidence zones 614 and confidence level representations 617 and 627). In this way, the operator or user can be provided with a map the indicates, for areas of the field where the topographic characteristics are known to a certain level of accuracy or certainty (which can be based on a threshold as described above), the corrected topographic characteristics. For areas of the field where the topographic characteristics are not known to a certain level of accuracy or certainty map 640 can show the confidence level in the topographic characteristics indicated by the prior topographic map.

Figure 20:
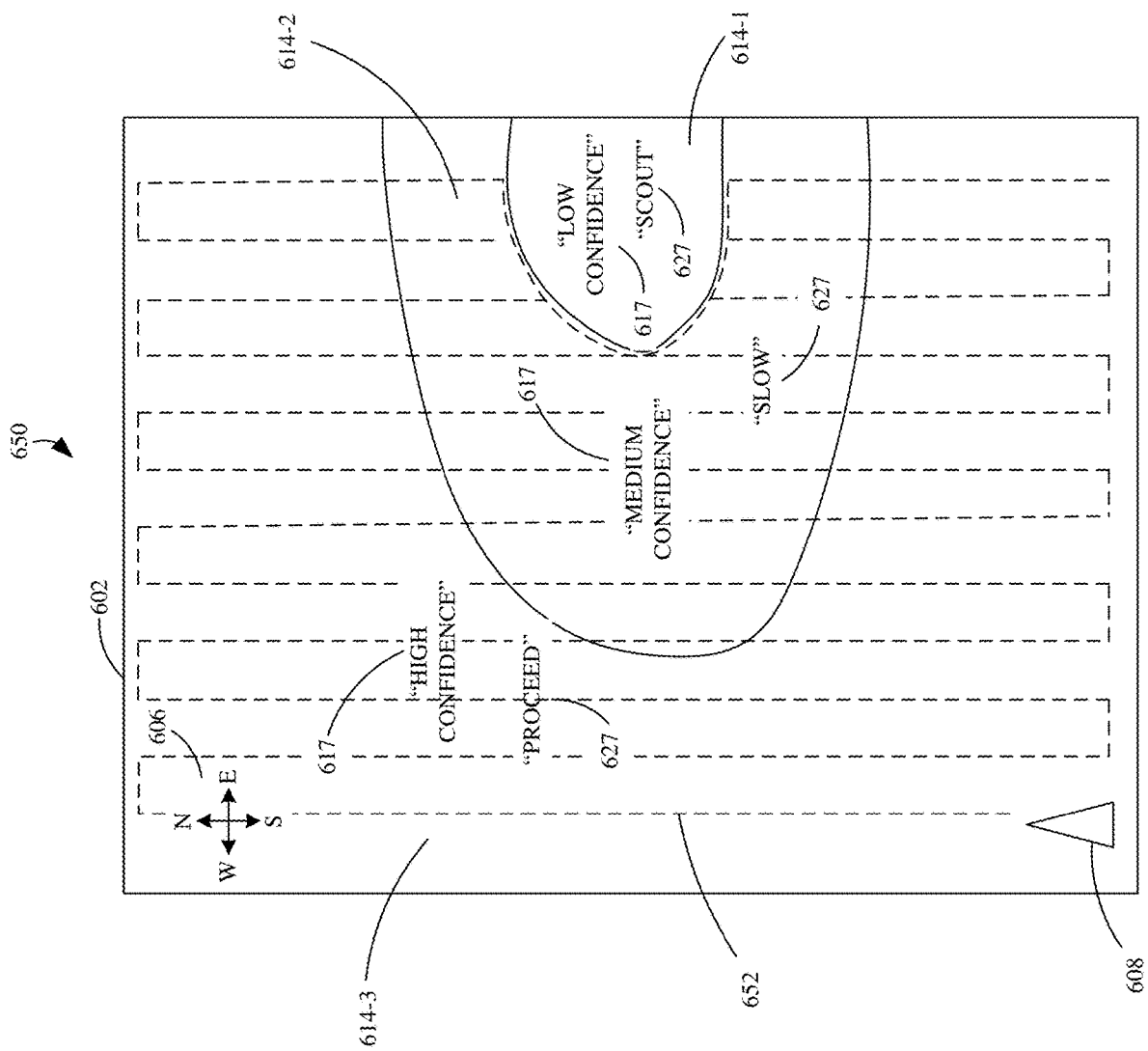

FIG. 20 is one example of a topographic confidence map 650 that can be generated by topographic confidence system 330, based on a prior topographic map, such as map 600 and supplemental data relative to worksite 602 or the environment of worksite 602. As illustrated, topographic confidence map 650 also includes an indication of a route 652 generated by topographic confidence system 330 for a machine (e.g., mobile machine 100) to travel along. Route 652 can be used by control system 304 to automatically control the operation of mobile machine 100 as it travels across worksite 602. For instance, route 652 can be used by control system 304 to generate an action signal to control one or more controllable subsystems 302 of mobile machine 100, such as steering subsystem 316 to control a heading of mobile machine 100.

Additionally, the control of mobile machine 100 can be varied as it operates across worksite 602, based on its position within or proximity to confidence zones 614. For example, in confidence zone 614-3, mobile machine 100 can be controlled based on the topographic characteristics indicated by a prior topographic map, such as map 600, because the topographic confidence level representation 617 is "high" and the advisory representation 627 is "proceed". Whereas, in zone 614-2, mobile machine 100 can be controlled to adjust speed (e.g., travel slower) because the topographic confidence level representation 617 is "medium" and the advisory representation 627 is "slow". As can further be seen, route 652 can direct mobile machine 100 to travel around the perimeter, or the edge of, but avoid travel into, zone 614-1 as the topographic confidence level representation 617 is "low" and the advisory representation 627 is "scout. It should also be noted that route 652 can be generated and displayed to an operator or a user, while the operation of the machine (e.g., the heading) is still controlled by the operator or user. In other examples, route 652 may be used directly by a mobile machine operating in semi-autonomous or autonomous modes. Indicator 608 can provide an indication of the position of the machine, and, in the case of operator or user control, can provide an indication of deviation from the recommended travel path (such as a line showing where the machine has actually traveled).

It will be noted that the various maps shown in FIGS. 15-20 do not comprise an exhaustive list and that topographic confidence system 330 can generate any number of maps that indicated or other display any number of characteristics, conditions, and or items on or relative to a worksite. It will also be understood that any and all of the maps described above in FIGS. 15-20 can comprise map layers that can be generated by topographic confidence system 330 and can be displayed over other map layers (e.g., as an overlay) and/or individually selectable or toggleable by an operator or user, such as by an input on an actuatable input mechanism on a display screen (e.g., touch screen) on an interface mechanism. For instance, operator 362 of mobile machine 100 may desire to switch between a display of the prior topographic map 600, the topographic confidence map 610, and the topographic confidence map 620 during operation. In this way, operator 362 can be provided with an indication of what the last known topographic characteristics were (e.g., via map 600), what the topographic confidence level across the worksite is (e.g., via map 610), and what the advised operation of mobile machine 100 is across the worksite (e.g., via map 620).

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

It will also be that the various agricultural characteristic confidence outputs can be output to the cloud.

Figure 21:
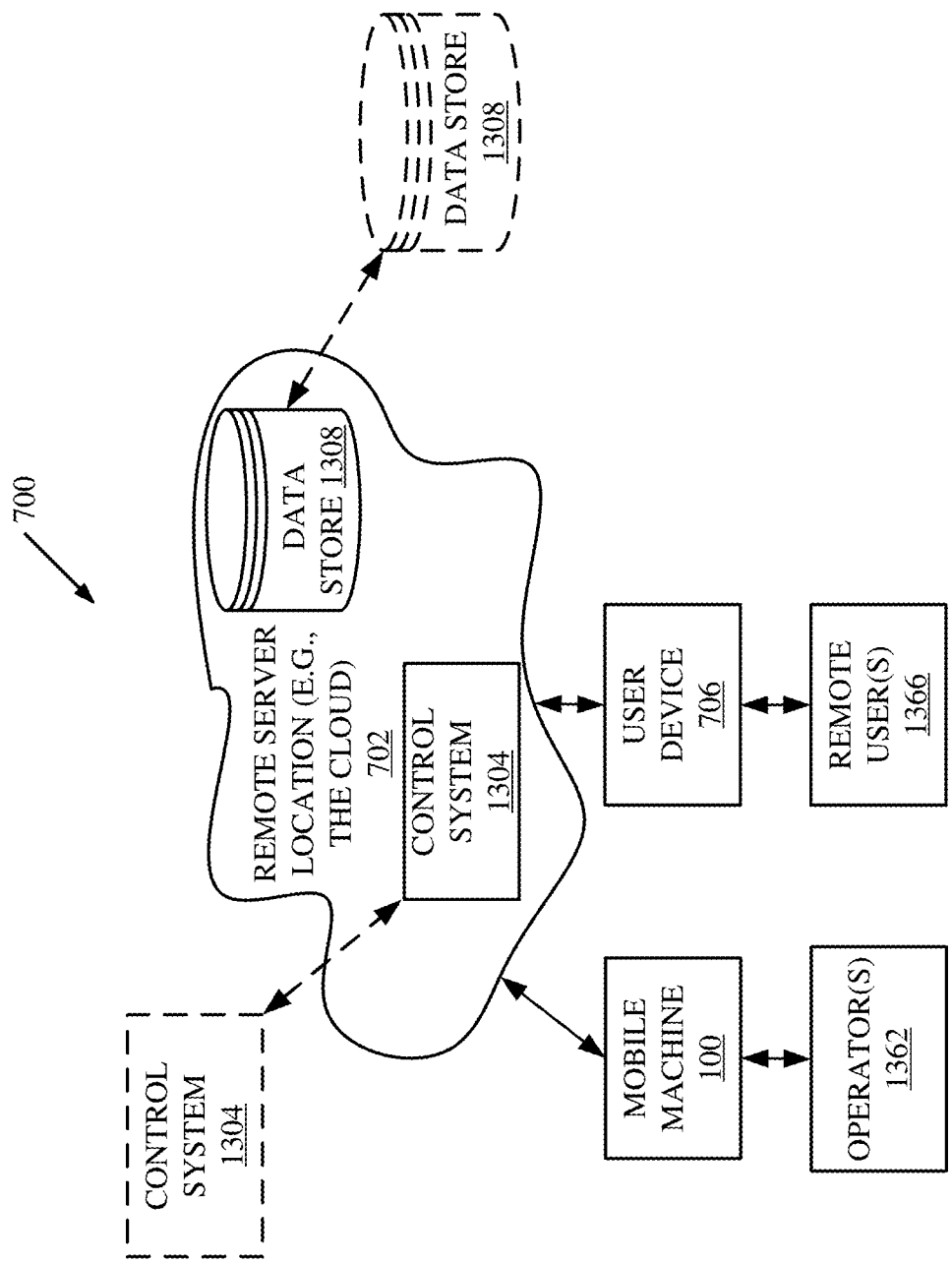
FIG. 21 is a block diagram showing one example of the architecture illustrated in FIG. 3 deployed in a remote server architecture.

FIG. 21 is a block diagram of a remote server architecture, which shows that components of computing architecture 1300 can communicate with elements in a remote server architecture, or that components of computing architecture 1300 can be located at a remote server location and can be accessed at the remote server location by other components of computing architecture 1300. In an example embodiment, remote server architecture 700 can provide computation, software, data access, and storage services that do not require end-user knowledge of the physical location or configuration of the system that delivers the services. In various embodiments, remote servers can deliver the services over a wide area network, such as the internet, using appropriate protocols. For instance, remote servers can deliver applications over a wide area network and they can be accessed through a web browser or any other computing component. Software or components shown in FIG. 21 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the embodiment shown in FIG. 21, some items are similar to those shown in FIG. 3 and they are similarly numbered. FIG. 21 specifically shows that control system 1304 can be located at a remote server location 702. Therefore, mobile machine 100, operator(s) 1362, and/or remote user(s) 1366 access those systems through remote server location 702.

FIG. 21 also depicts another embodiment of a remote server architecture. FIG. 21 shows that it is also contemplated that some elements of FIG. 3 are disposed at remote server location 702 while others are not. By way of example, data store 1308 or control system 1308 can be disposed at a location separate from location 702, and accessed through the remote server at location 702. Regardless of where they are located, they can be accessed directly by mobile machine 100 and/or operator(s) 362, as well as one or more remote users 1366 (via user device 706), through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an embodiment, where cell coverage is poor or nonexistent, another mobile machine (such as a fuel truck) can have an automated information collection system. As the mobile machine comes close to the fuel truck for fueling, the system automatically collects the information from the mobile machine using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the mobile machine until the mobile machine enters a covered location. The harvester, itself, can then send the information to the main network.

It will also be noted that the elements of FIG. 3 or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 22:
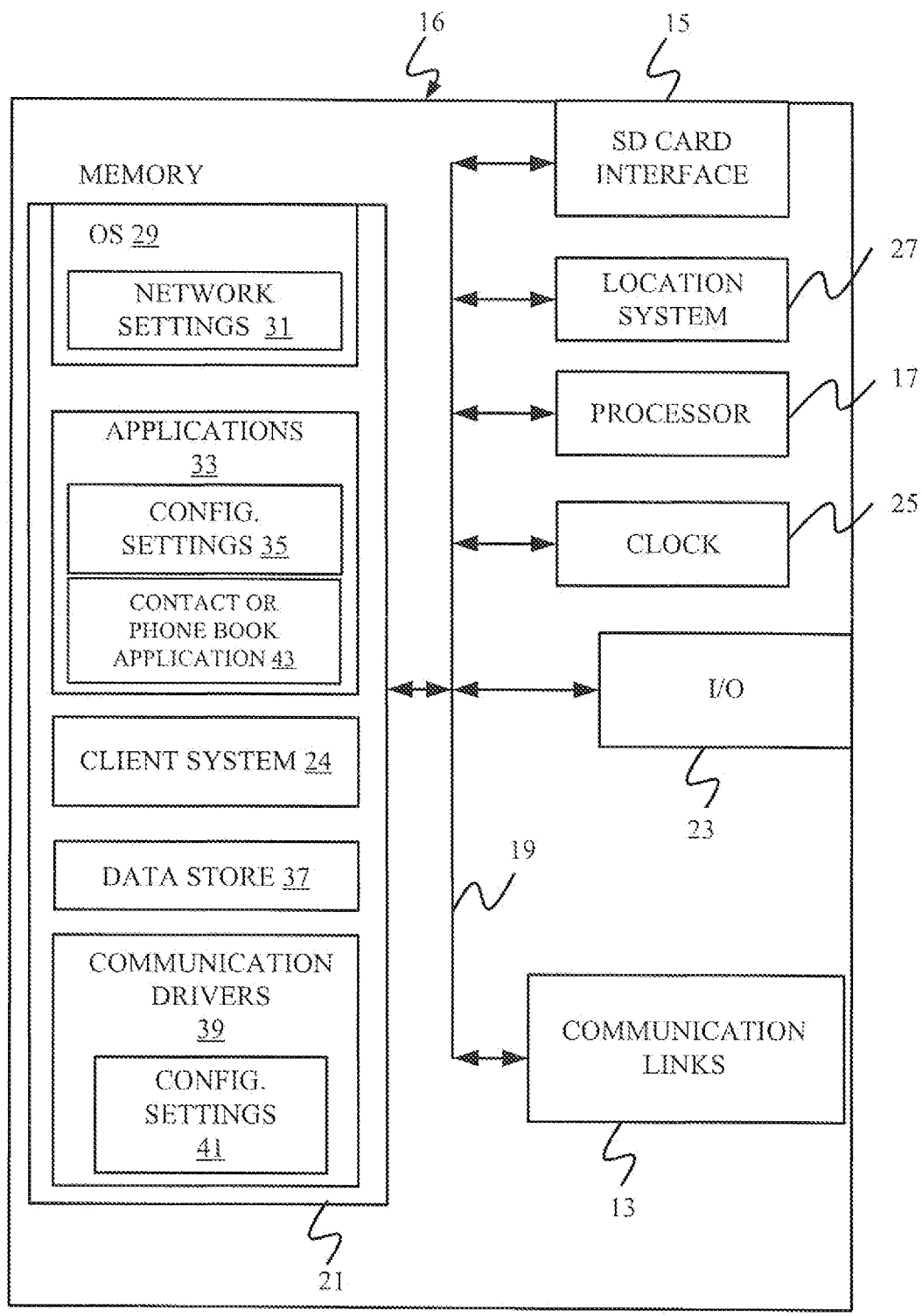
FIG. 22-24 show examples of mobile devices that can be used in the architecture(s) shown in the previous figure(s).
Figure 23:
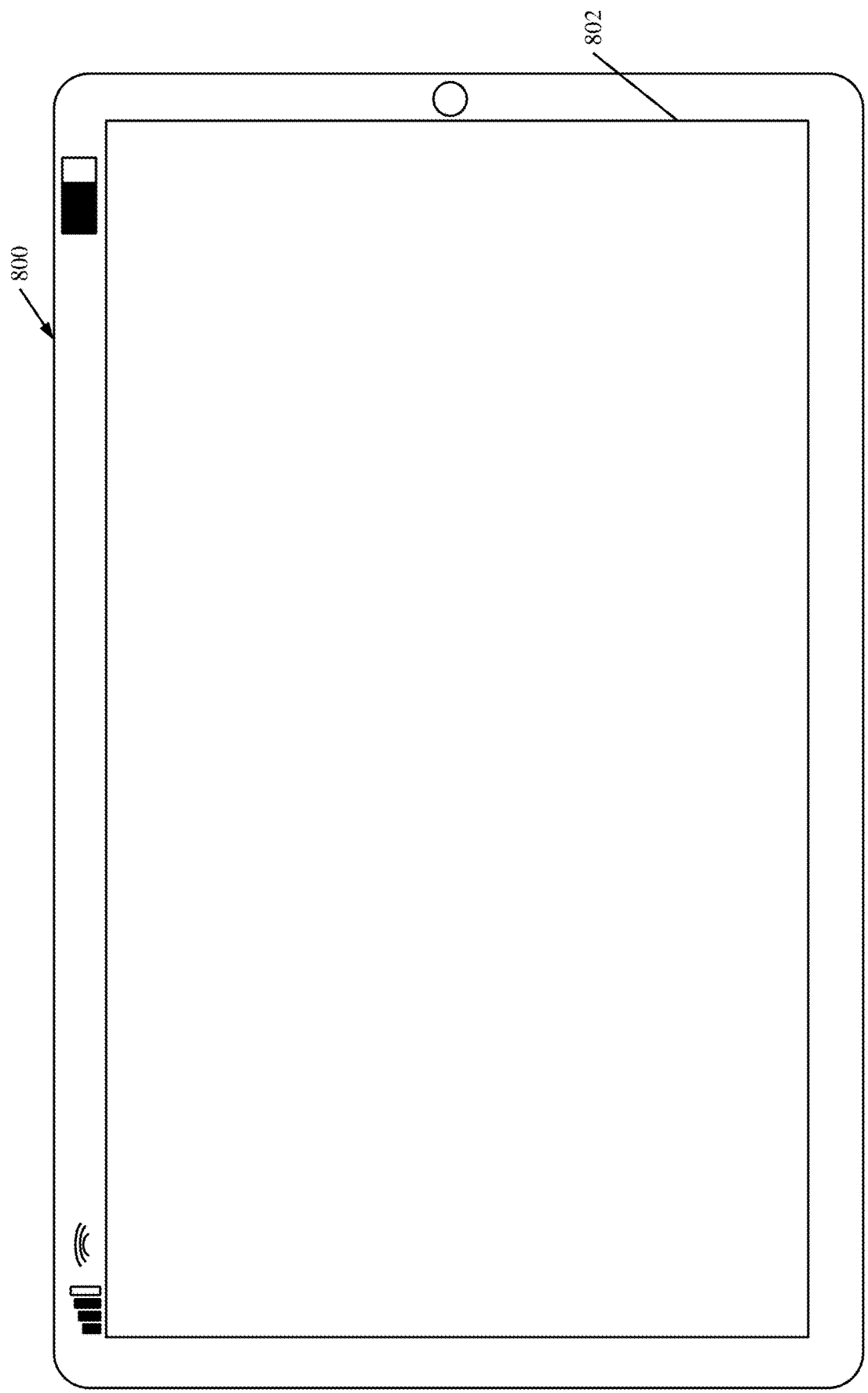
Figure 24:
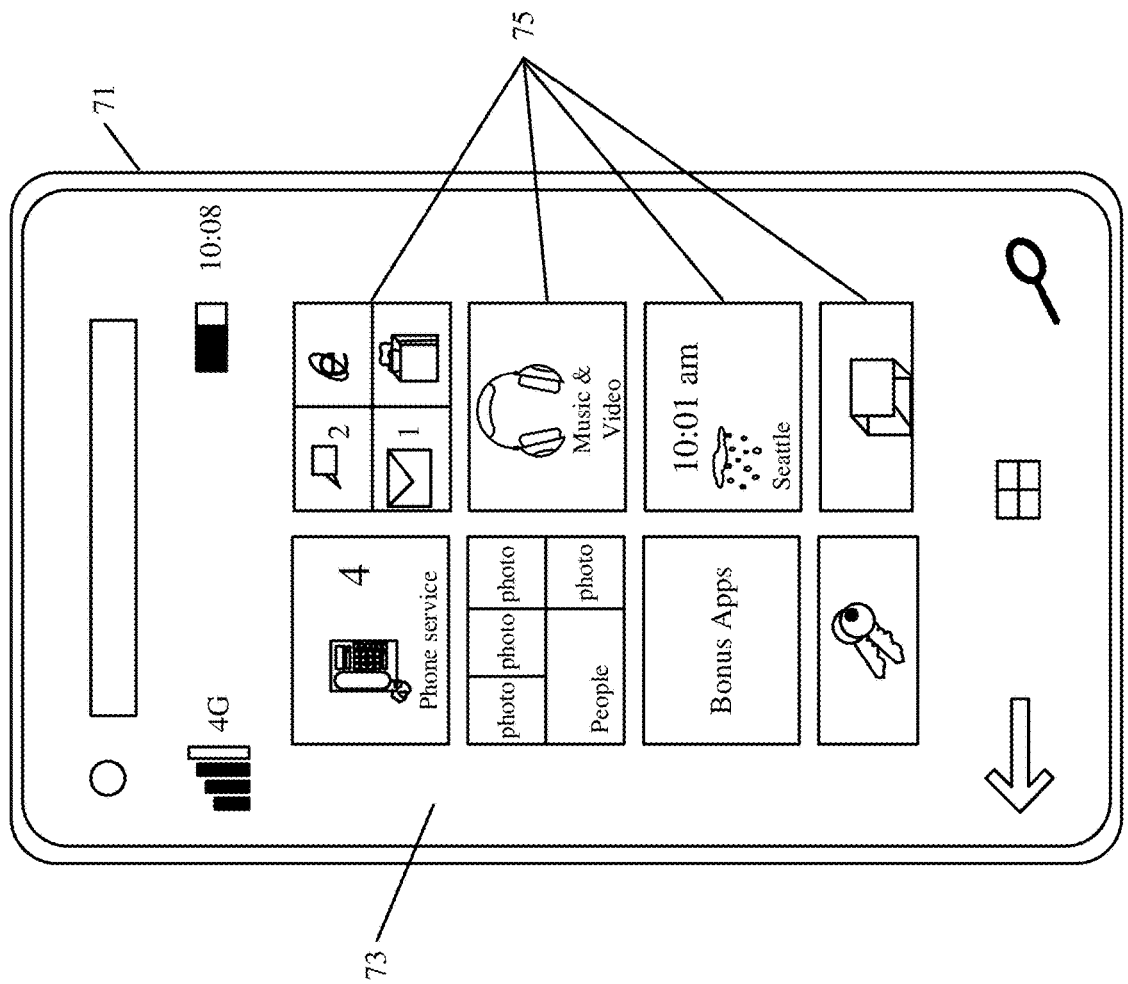

FIG. 22 is a simplified block diagram of one illustrative embodiment of a handheld or mobile computing device that can be used as a user's or client's hand held device 16, in which the present system (or parts of it) can be deployed. For instance, a mobile device can be deployed in the operator compartment of mobile machine 100 for use in generating, processing, or displaying the agricultural characteristics, agricultural characteristic confidence outputs, as well as various other information. FIGS. 22-24 are examples of handheld or mobile devices.

FIG. 22 provides a general block diagram of the components of a client device 16 that can run some components shown in FIG. 3, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

Under other embodiments, applications can be received on a removable Secure Digital (SD) card that is connected to an interface 15. Interface 15 and communication links 13 communicate with a processor 17 (which can also embody processor(s) 1312, 1374, and/or 1384 from FIG. 3) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 23 shows one embodiment in which device 16 is a tablet computer 800. In FIG. 23, computer 800 is shown with user interface display screen 802. Screen 802 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 800 can also illustratively receive voice inputs as well.

FIG. 24 is similar to FIG. 23 except that the device is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 25:
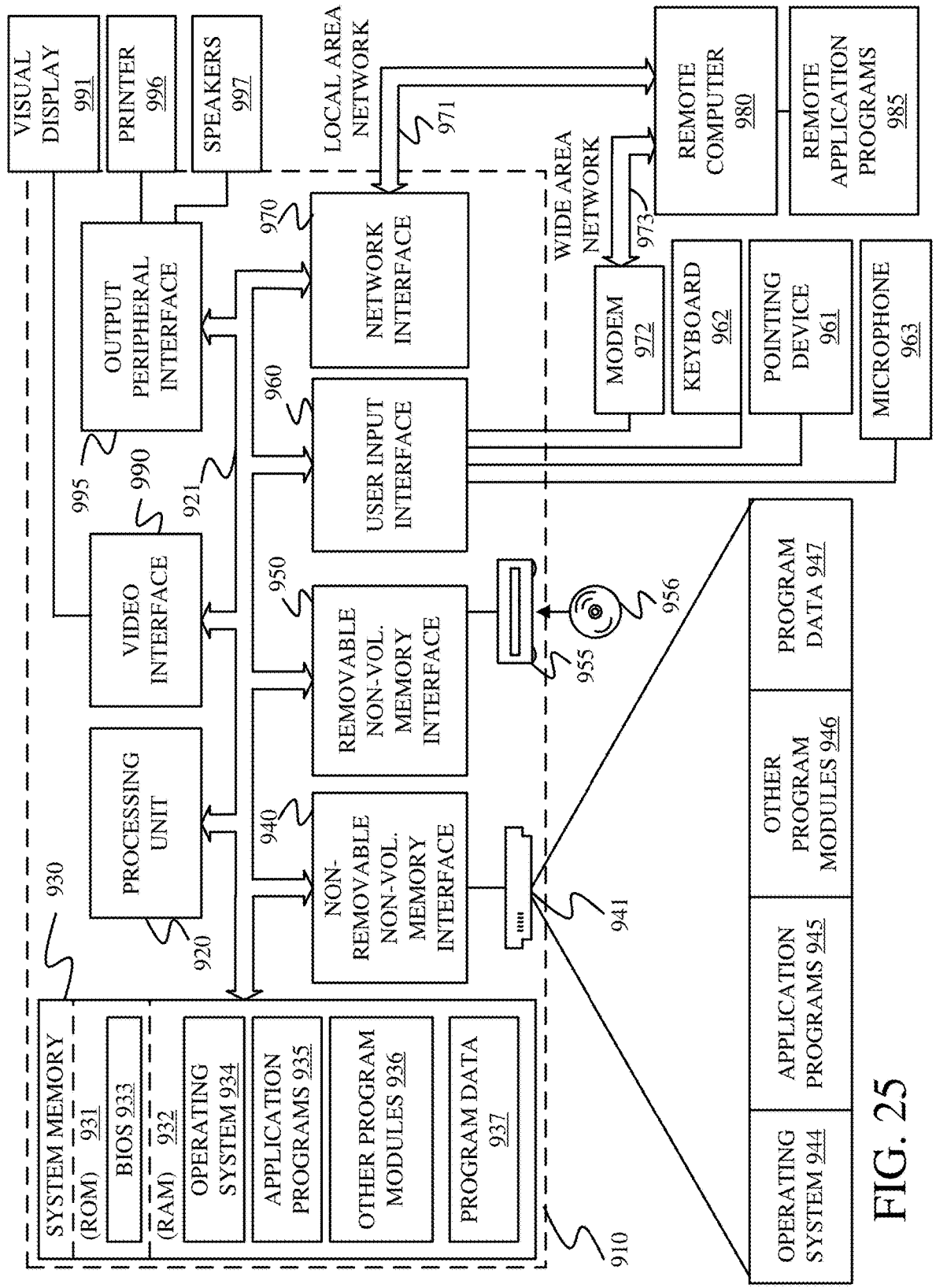
FIG. 25 is a block diagram showing one example of a computing environment that can be used in the architecture(s) shown in the previous figure(s).

FIG. 25 is one embodiment of a computing environment in which elements of FIG. 3, or parts of it, (for example) can be deployed. With reference to FIG. 25, an exemplary system for implementing some embodiments includes a general-purpose computing device in the form of a computer 910. Components of computer 910 may include, but are not limited to, a processing unit 920 (which can comprise processor(s) 1312, 1374, and/or 1384), a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. Memory and programs described with respect to FIG. 3 can be deployed in corresponding portions of FIG. 25.

Computer 910 typically includes a variety of computer readable media. Computer readable media can be any available media that can be accessed by computer 910 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 910. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 25 illustrates operating system 934, application programs 935, other program modules 936, and program data 937.

The computer 910 may also include other removable/non-removable volatile/nonvolatile computer storage media. By way of example only, FIG. 25 illustrates a hard disk drive 941 that reads from or writes to non-removable, nonvolatile magnetic media, a magnetic disk drive 951, nonvolatile magnetic disk 952, an optical disk drive 955, and nonvolatile optical disk 956. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

Alternatively, or in addition, the functionality described herein can be performed, at least in part, by one or more hardware logic components. For example, and without limitation, illustrative types of hardware logic components that can be used include Field-programmable Gate Arrays (FP-GAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 25, provide storage of computer readable instructions, data structures, program modules and other data for the computer 910. In FIG. 25, for example, hard disk drive 941 is illustrated as storing operating system 944, application programs 945, other program modules 946, and program data 947. Note that these components can either be the same as or different from operating system 934, application programs 935, other program modules 936, and program data 937.

A user may enter commands and information into the computer 910 through input devices such as a keyboard 962, a microphone 963, and a pointing device 961, such as a mouse, trackball or touch pad. Other input devices (not shown) may include a joystick, game pad, satellite dish, scanner, or the like. These and other input devices are often connected to the processing unit 920 through a user input interface 960 that is coupled to the system bus, but may be connected by other interface and bus structures. A visual display 991 or other type of display device is also connected to the system bus 921 via an interface, such as a video interface 990. In addition to the monitor, computers may also include other peripheral output devices such as speakers 997 and printer 996, which may be connected through an output peripheral interface 995.

The computer 910 is operated in a networked environment using logical connections (such as a local area network—LAN, or wide area network WAN) to one or more remote computers, such as a remote computer 980.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. In a networked environment, program modules may be stored in a remote memory storage device. FIG. 25 illustrates, for example, that remote application programs 985 can reside on remote computer 980.

Further, example implementations of the invention(s) described herein may use one or more processors. If the implementation comprises multiple processors, they may be local or remote or a mixture, share information via wired, wireless, or utilizes a mixture of communication techniques, and/or fixedly or dynamically assign portions of computation to processors.

Processors may carry out their tasks with varying degrees of human supervision or intervention. Humans may be located at any appropriate process or communications node of the distributed system. Humans may be physically located on a work machine or at some other location. Example human interaction devices without limitation include screens, touch screens, wearable displays, audio or speech output such as ear buds or speakers, microphones, haptic output such as vibration or thermal devices, brain wave sensors, eye trackers, heart rate and other physiological sensors, or cameras for facial, gesture, or other body monitoring.

In some examples, processors can include systems-on-a-chip, embedded processors, servers, desktop computers, tablet computer, or cell phones.

In some embodiments, unauthorized monitoring, altering, or substitution of data communications are mitigated. Without limitation, example embodiments may partially or fully implement authentication of nodes sending or receiving data, wherein the authentication techniques may include, without limitation, physical unclonable functions (PUFs), encryption of data sent between nodes, and/or use of a distributed, immutable ledger of data updates (e.g., Blockchain), as well as various other authentication techniques, or combinations thereof.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of controlling a mobile agricultural machine, comprising:
    obtaining an agricultural characteristic map of a worksite indicative of an agricultural characteristic of the worksite, wherein the agricultural characteristic map is based on data collected at or prior to a first time;
    obtaining supplemental data indicative of a characteristic relative to the worksite, the supplemental data collected after the first time, wherein the characteristic relative to the worksite is of a different type than the agricultural characteristic;
    generating an agricultural characteristic confidence output indicative of a confidence level in the agricultural characteristic of the worksite as indicated by the agricultural characteristic map, based on the agricultural characteristic map and the supplemental data; and
    generating an action signal to control the mobile agricultural machine based on the agricultural characteristic confidence output.

2. The method of claim 1, wherein generating the agricultural characteristic confidence output further comprises:
    determining the confidence level, wherein the confidence level is indicative of a likelihood that the agricultural characteristic of the worksite, as indicated by the agricultural characteristic map, has changed; and
    generating a representation of the confidence level.

3. The method of claim 1, wherein generating the agricultural characteristic confidence output comprises:
    generating a map of the worksite that includes an indication of the confidence level.

4. The method of claim 1, wherein generating the agricultural characteristic confidence output comprises:
    determining a plurality of confidence levels, wherein each one of the plurality of confidence levels is indicative of a likelihood that the agricultural characteristic of a corresponding one of a plurality of geographic locations within the worksite, as indicated by the agricultural characteristic map, has changed.

5. The method of claim 4, and further comprising:
    determining a plurality of confidence zones, each one of the plurality of confidence zones corresponding to a respective one of the plurality of confidence levels, wherein an operation of the mobile agricultural machine is based on a presence of the mobile agricultural machine in one of the plurality of confidence zones.

6. The method of claim 1, wherein generating the action signal to control the mobile agricultural machine comprises:
    generating the action signal to control the mobile agricultural machine to collect additional data corresponding to the worksite.

7. The method of claim 1, wherein generating the action signal to control the mobile agricultural machine comprises:
    generating the action signal to control an actuator of the mobile agricultural machine to drive movement of a component of the mobile agricultural machine to change a position of the component relative to a surface of the worksite.

8. The method of claim 1, wherein generating the action signal to control the mobile agricultural machine comprises:
    generating the action signal to control a propulsion subsystem of the mobile agricultural machine to control a speed at which the mobile agricultural machine travels over the worksite.

9. The method of claim 1, wherein generating the action signal to control the mobile agricultural machine comprises:
    generating the action signal to control a steering subsystem of the mobile agricultural machine to control a heading of the mobile agricultural machine as it travels over the worksite.

10. The method of claim 1, wherein generating the action signal to control the mobile agricultural machine comprises:
    generating the action signal to control an interface mechanism of the mobile agricultural machine to provide an indication of the agricultural characteristic confidence output.

11. The method of claim 1, wherein obtaining supplemental data indicative of the characteristic relative to the worksite, comprises obtaining supplemental data indicative of, as the characteristic relative to the worksite, one of:
    a weather characteristic;
    an environmental characteristic;
    an event characteristic;
    an activity characteristic;
    a vegetation characteristic;
    a soil characteristic; or
    a topographic characteristic; and
    wherein obtaining the agricultural characteristic map of the worksite indicative of the agricultural characteristic of the worksite comprises obtaining one of:
    a yield map of the worksite indicative of, as the agricultural characteristic of the worksite, yield of the worksite;
    a biomass map of the worksite indicative of, as the agricultural characteristic of the worksite, biomass of the worksite;
    a nutrient map of the worksite indicative of, as the agricultural characteristic of the worksite, a nutrient of the worksite;
    a crop height map of the worksite indicative of, as the agricultural characteristic of the worksite, crop height of the worksite;
    a trafficability map of the worksite indicative of, as the agricultural characteristic of the worksite, trafficability of the worksite; or
    a compaction susceptibility map of the worksite indicative of, as the agricultural characteristic of the worksite, compaction susceptibility of the worksite.

12. A mobile agricultural machine comprising:
    a control system comprising:
        an agricultural characteristic confidence system configured to:

obtain an agricultural characteristic map of a worksite that indicates an agricultural characteristic of the worksite, wherein the agricultural characteristic map is based on data collected at or prior to a first time;

obtain supplemental data indicative of characteristics relative to the worksite, the supplemental data collected after the first time and prior to a time at which the mobile agricultural machine is to perform an operation at the worksite; and generate an agricultural characteristic confidence output indicative of a confidence level in the agricultural characteristic of the worksite as indicated by the agricultural characteristic map, based on the agricultural characteristic map and the supplemental data; and an action signal generator configured to generate an action signal based on the agricultural characteristic confidence output.

13. The mobile agricultural machine of claim 12, wherein the characteristics of the worksite are of a different type than the agricultural characteristic and wherein the agricultural characteristic confidence system is further configured to:

determine a likelihood that the agricultural characteristic of the worksite, as indicated by the agricultural characteristic map, has changed based on the supplemental data; and generate the agricultural characteristic confidence output based on the determined likelihood that the agricultural characteristic of the worksite, as indicated by the map, has changed.

14. The mobile agricultural machine of claim 12, wherein the agricultural characteristic confidence output includes a representation of the agricultural characteristic confidence level.

15. The mobile agricultural machine of claim 12, wherein the agricultural characteristic confidence system further comprises:

a map generator that generates a map of the worksite that includes an indication of the agricultural characteristic confidence level.

16. The mobile agricultural machine of claim 12, wherein the action signal is provided to an actuator of the mobile agricultural machine to drive movement of a component of the mobile agricultural machine to change a position of the component relative to a surface of the worksite.

17. The mobile agricultural machine of claim 12, wherein the action signal is provided to a propulsion subsystem of the mobile agricultural machine to control a speed at which the mobile agricultural machine travels over the worksite.

18. The mobile agricultural machine of claim 12, wherein the action signal is provided to a steering subsystem of the mobile agricultural machine to control a heading of the mobile agricultural machine as the mobile agricultural machine travels over the worksite.

19. The mobile agricultural machine of claim 12, wherein the action signal is provided to an interface mechanism communicably coupled to the mobile agricultural machine to generate an interface display indicative of the agricultural characteristic confidence output.

20. A method of controlling a mobile agricultural machine comprising:

obtaining an agricultural characteristic map of a worksite indicative of values of an agricultural characteristic of the worksite, wherein the agricultural characteristic map is based on data collected at or prior to a first time;

obtaining supplemental data indicative of characteristics relative to the worksite, the supplemental data collected after the first time;

generating an agricultural characteristic confidence level for each of a plurality of geographic locations within the worksite, the agricultural characteristic confidence level indicative of a likelihood that one or more of the values of the agricultural characteristic at each of the plurality of geographic locations within the worksite, as indicated by the agricultural characteristic map, have changed, based on the supplemental data;

generating an agricultural characteristic confidence map of the worksite that indicates the corresponding agricultural characteristic confidence level at each of the plurality of geographic locations within the worksite; and controlling one or more controllable subsystems of the mobile agricultural machine based on a location of the mobile agricultural machine relative to one of the plurality of geographic locations indicated on the agricultural characteristic confidence map, wherein the one or more controllable subsystems comprise one or more of: a propulsion subsystem configured to control a travel speed of the mobile agricultural machine; a steering subsystem configured to control a travel direction of the mobile agricultural machine; or an actuator configured to controllably move a component of the mobile agricultural machine.

21. The method of claim 20, wherein the agricultural characteristic confidence map of the worksite simultaneously indicates the corresponding agricultural characteristic confidence level at each of the plurality of geographic locations within the worksite.

* * * * *